(12) United States Patent
Shehata et al.

(10) Patent No.: US 12,471,702 B2
(45) Date of Patent: Nov. 18, 2025

(54) CLOSET ORGANIZATION SYSTEMS

(71) Applicant: Lowe's Companies, Inc., Mooresville, NC (US)

(72) Inventors: Yussif Shehata, Mooresville, NC (US); Ashley Imsand, Huntersville, NC (US); Alex Soriano, Troutman, NC (US); Jessica Casavecchia, Davidson, NC (US)

(73) Assignee: Lowe's Companies, Inc., Mooresville, NC (US)

( * ) Notice: Subject to any disclaimer, the term of this patent is extended or adjusted under 35 U.S.C. 154(b) by 191 days.

(21) Appl. No.: 18/174,331

(22) Filed: Feb. 24, 2023

(65) Prior Publication Data

US 2024/0285073 A1  Aug. 29, 2024

(51) Int. Cl.
*A47B 61/00* (2006.01)
*A47B 57/40* (2006.01)
(Continued)

(52) U.S. Cl.
CPC ............ *A47B 61/00* (2013.01); *A47B 57/402* (2013.01); *A47B 96/1416* (2013.01);
(Continued)

(58) Field of Classification Search
CPC ... A47B 61/00; A47B 57/402; A47B 96/1416; A47B 96/1441; A47B 96/061;
(Continued)

(56) References Cited

U.S. PATENT DOCUMENTS 2,191,701 A * 2/1940 Wood ................... A47F 5/0838
248/245
2,270,796 A  1/1942 Hauser
(Continued)

FOREIGN PATENT DOCUMENTS

CA  2510204 C  9/2012
CN  208909396 U  5/2019
(Continued)

OTHER PUBLICATIONS

"48 In. White Super Duty Dual Track Wall Standard", homedepot.com, Oct. 23, 2017.
(Continued)

*Primary Examiner* — Devin K Barnett
(74) *Attorney, Agent, or Firm* — Kilpatrick Townsend & Stockton LLP

(57) ABSTRACT

A customizable closet organization system includes support elements that can be selectively combined and arranged. A closet organization system includes a support track, a support rail, and a shelf support bracket. The support track includes apertures for mounting the support track horizontally to a wall. The support rail includes bracket mounting slots and is configured to hang from the support track so that the bracket mounting slots face the wall. The shelf support bracket includes a support arm and a mounting hook. The mounting hook is configured for insertion into one of the bracket mounting slots to secure the shelf support bracket to the support rail so that the support arm extends transversely from the support rail and away from the wall in a mounted configuration of the shelf support bracket.

37 Claims, 50 Drawing Sheets

(51) Int. Cl.
*A47B 96/14* (2006.01)
*A47B 47/02* (2006.01)
*A47B 57/06* (2006.01)
*A47B 57/30* (2006.01)
*A47B 57/34* (2006.01)
*A47B 96/02* (2006.01)

(52) U.S. Cl.
CPC ........ *A47B 96/1441* (2013.01); *A47B 47/022* (2013.01); *A47B 57/06* (2013.01); *A47B 57/30* (2013.01); *A47B 57/34* (2013.01); *A47B 96/027* (2013.01)

(58) Field of Classification Search
CPC ....... A47B 57/42; A47B 47/00; A47B 47/021; A47B 47/022; A47B 57/06; A47B 57/08; A47B 57/10; A47B 57/16; A47B 57/20; A47B 57/30; A47B 57/32; A47B 57/34; A47B 57/40; A47B 57/48; A47B 96/027
See application file for complete search history.

(56) References Cited

U.S. PATENT DOCUMENTS

| | | | | |
|---|---|---|---|---|
| 2,772,846 | A * | 12/1956 | Skar | A47B 57/42 248/243 |
| 2,925,916 | A | 2/1960 | Pollock | |
| 3,018,900 | A | 1/1962 | Huet | |
| 3,127,146 | A | 3/1964 | Fisher | |
| 3,136,520 | A * | 6/1964 | Reiss | A47B 57/42 248/243 |
| 3,341,026 | A | 9/1967 | Spitler | |
| 3,603,274 | A | 9/1971 | Ferdinand et al. | |
| 3,788,490 | A | 1/1974 | Featherman | |
| 3,817,394 | A | 6/1974 | Saiki | |
| 3,848,844 | A | 11/1974 | Barrett | |
| 3,918,670 | A | 11/1975 | Doherty | |
| 3,993,002 | A * | 11/1976 | Stroh | A47F 5/13 211/90.03 |
| 4,205,815 | A | 6/1980 | Sauer et al. | |
| 4,342,397 | A | 8/1982 | Halstrick | |
| 4,537,379 | A | 8/1985 | Rhoades | |
| 4,674,723 | A | 6/1987 | Bayuk | |
| 4,846,430 | A | 7/1989 | Ke | |
| 4,901,965 | A | 2/1990 | Bowman | |
| 4,966,343 | A | 10/1990 | Bessinger et al. | |
| 5,004,201 | A | 4/1991 | Bessinger | |
| 5,069,408 | A | 12/1991 | Bessinger | |
| 5,088,607 | A | 2/1992 | Risafi et al. | |
| 5,099,993 | A | 3/1992 | Lewington et al. | |
| 5,110,080 | A * | 5/1992 | Rieman | A47B 96/1408 248/225.11 |
| 5,135,194 | A * | 8/1992 | Laughon | A47B 95/008 248/243 |
| 5,158,186 | A | 10/1992 | Krut | |
| 5,215,200 | A | 6/1993 | Rosenthal | |
| D342,015 | S * | 12/1993 | Andrejew | D8/373 |
| 5,277,393 | A * | 1/1994 | Nicholson | A47B 95/008 248/223.41 |
| 5,297,486 | A | 3/1994 | Herrmann et al. | |
| 5,332,108 | A | 7/1994 | Blass | |
| 5,377,851 | A * | 1/1995 | Asano | A47B 57/402 211/192 |
| 5,415,301 | A | 5/1995 | Bruton et al. | |
| 5,460,279 | A | 10/1995 | Emery et al. | |
| 5,472,103 | A * | 12/1995 | Merl | A47B 47/022 211/187 |
| 5,477,967 | A | 12/1995 | Voorhees et al. | |
| 5,592,886 | A | 1/1997 | Williams et al. | |
| 5,695,073 | A | 12/1997 | Klein et al. | |
| 5,697,507 | A | 12/1997 | Blass | |
| 5,788,093 | A | 8/1998 | Krut | |
| 5,871,188 | A * | 2/1999 | Lyle | B66D 1/28 248/223.41 |
| 5,875,902 | A | 3/1999 | Emery et al. | |
| 5,918,432 | A | 7/1999 | Mahone et al. | |
| 5,979,336 | A | 11/1999 | Nottingham et al. | |
| 5,988,409 | A | 11/1999 | Gusdorf et al. | |
| 6,138,841 | A | 10/2000 | Klein et al. | |
| 6,464,086 | B1 | 10/2002 | Klein et al. | |
| 6,464,087 | B1 | 10/2002 | Klein et al. | |
| D476,220 | S * | 6/2003 | McCoy | D8/376 |
| 6,644,609 | B1 | 11/2003 | Scott | |
| 6,663,201 | B2 | 12/2003 | Herron, III et al. | |
| 6,726,035 | B2 | 4/2004 | Zadak | |
| D490,697 | S * | 6/2004 | Runnalls | D8/380 |
| 6,877,614 | B2 | 4/2005 | Hu | |
| 6,932,225 | B2 | 8/2005 | Rowe | |
| 6,953,176 | B2 | 10/2005 | Remmers | |
| 7,086,544 | B1 * | 8/2006 | Doench | A47B 96/028 248/222.51 |
| 7,097,048 | B2 | 8/2006 | Rimback et al. | |
| 7,121,417 | B2 | 10/2006 | Magnusson et al. | |
| 7,178,769 | B2 | 2/2007 | Magnusson et al. | |
| 7,255,237 | B2 * | 8/2007 | Stitchick | A47B 96/028 403/392 |
| 7,293,662 | B2 | 11/2007 | Klein et al. | |
| 7,296,697 | B2 | 11/2007 | Costa et al. | |
| 7,337,730 | B2 | 3/2008 | Bienick et al. | |
| 7,387,212 | B2 * | 6/2008 | Costa | A47B 47/022 211/90.03 |
| 7,506,772 | B2 | 3/2009 | Chen | |
| 7,571,882 | B2 | 8/2009 | Walter | |
| 7,810,655 | B2 | 10/2010 | Wang | |
| 7,866,493 | B1 | 1/2011 | Hurt et al. | |
| D640,674 | S * | 6/2011 | van Alphen | D14/239 |
| 8,128,182 | B2 | 3/2012 | DeWeerd | |
| 8,210,368 | B2 | 7/2012 | Schwartzkopf et al. | |
| 8,297,575 | B2 | 10/2012 | Kluge | |
| 8,333,158 | B2 | 12/2012 | Wise | |
| 8,365,928 | B1 | 2/2013 | Lauro | |
| 8,434,629 | B2 | 5/2013 | Fernandez | |
| 8,534,627 | B2 | 9/2013 | Kressin | |
| 8,636,156 | B2 | 1/2014 | Malik | |
| 8,646,624 | B2 * | 2/2014 | Fernandez | A47B 57/42 211/90.03 |
| 8,684,195 | B1 * | 4/2014 | Caruso | A47B 95/008 211/94.01 |
| 9,173,506 | B2 * | 11/2015 | Andersson | A47F 5/0807 |
| 9,220,357 | B1 | 12/2015 | Raggs | |
| 9,289,064 | B2 | 3/2016 | LaMontagne et al. | |
| 9,398,819 | B2 | 7/2016 | Tsai et al. | |
| D766,634 | S * | 9/2016 | Nilsson | D6/705 |
| 9,526,357 | B2 | 12/2016 | Howard et al. | |
| 9,549,611 | B1 | 1/2017 | Bocanegra | |
| 9,603,468 | B2 | 3/2017 | Nilsson | |
| 9,622,600 | B2 | 4/2017 | Kressin et al. | |
| 9,756,939 | B1 | 9/2017 | Ruiz et al. | |
| 9,770,122 | B2 | 9/2017 | Gonzalez et al. | |
| 9,867,464 | B1 | 1/2018 | Kokenge | |
| 9,901,497 | B2 | 2/2018 | Colvin, Sr. et al. | |
| 10,051,958 | B2 | 8/2018 | Andersson et al. | |
| 10,207,172 | B2 | 2/2019 | Hillson | |
| 10,334,973 | B2 | 7/2019 | Slevin-giesler | |
| 10,517,416 | B1 | 12/2019 | Petren | |
| 10,610,016 | B2 | 4/2020 | Nilsson et al. | |
| 10,634,279 | B2 | 4/2020 | Lu et al. | |
| 10,653,239 | B2 * | 5/2020 | Nilsson | A47B 96/028 |
| 10,709,237 | B2 | 7/2020 | Robinson et al. | |
| 10,758,065 | B2 | 9/2020 | Penalver, Jr. | |
| 10,786,077 | B2 | 9/2020 | Dudley | |
| 10,835,061 | B2 | 11/2020 | Kressin | |
| 11,109,678 | B2 | 9/2021 | Zhu | |
| 12,022,947 | B2 | 7/2024 | Cheng | |
| 2003/0085188 | A1 | 5/2003 | Klein et al. | |
| 2003/0226944 | A1 | 12/2003 | Sode | |
| 2003/0233965 | A1 | 12/2003 | Brazier | |
| 2003/0234231 | A1 * | 12/2003 | Rowe | A47F 5/103 211/94.01 |
| 2004/0007549 | A1 | 1/2004 | Klein et al. | |
| 2005/0150436 | A1 * | 7/2005 | Marchetta | A47B 96/028 108/108 |

(56) References Cited

U.S. PATENT DOCUMENTS

| | | | |
|---|---|---|---|
| 2005/0247651 A1* | 11/2005 | Craft | A47B 96/00 211/59.3 |
| 2006/0049124 A1 | 3/2006 | Wang | |
| 2006/0207956 A1 | 9/2006 | Sivers | |
| 2007/0221595 A1* | 9/2007 | Chen | A47B 95/008 211/207 |
| 2007/0221597 A1* | 9/2007 | Chen | A47B 57/40 211/192 |
| 2007/0262220 A1 | 11/2007 | Kluge | |
| 2008/0067139 A1 | 3/2008 | Claypool et al. | |
| 2008/0237426 A1* | 10/2008 | Walters | H04N 5/64 248/304 |
| 2008/0272076 A1* | 11/2008 | Davenport | A47B 57/42 211/90.01 |
| 2009/0139943 A1* | 6/2009 | Fernandez | A47F 5/0869 211/94.01 |
| 2010/0032394 A1 | 2/2010 | Wang | |
| 2010/0213334 A1 | 8/2010 | Davenport | |
| 2010/0270246 A1 | 10/2010 | Rodriguez | |
| 2011/0210087 A1* | 9/2011 | Berg | A47B 96/067 211/94.01 |
| 2011/0284707 A1 | 11/2011 | Adams et al. | |
| 2012/0255925 A1* | 10/2012 | Fernandez | A47B 96/067 211/134 |
| 2014/0353267 A1 | 12/2014 | Knutson | |
| 2016/0128477 A1 | 5/2016 | Jensen | |
| 2017/0112282 A1 | 4/2017 | Will et al. | |
| 2018/0132611 A1* | 5/2018 | Lu | A47B 61/003 |
| 2018/0352953 A1* | 12/2018 | Nilsson | A47B 95/04 |
| 2020/0054127 A1 | 2/2020 | Weber et al. | |
| 2020/0187675 A1* | 6/2020 | Obitts | A47B 96/021 |
| 2020/0260867 A1 | 8/2020 | Bishop et al. | |
| 2020/0397196 A1 | 12/2020 | Nie | |
| 2021/0337966 A1* | 11/2021 | Nilsson | A47B 95/008 |
| 2021/0337967 A1* | 11/2021 | Nilsson | A47B 96/1441 |
| 2022/0248848 A1* | 8/2022 | Li | A47B 96/028 |

FOREIGN PATENT DOCUMENTS

| | | |
|---|---|---|
| DE | 202016106447 U1 | 2/2018 |
| EP | 0430660 A1 | 6/1991 |
| EP | 1696766 B1 | 6/2007 |
| FR | 2632502 B3 | 9/1990 |
| GB | 956117 A | 4/1964 |
| GB | 1099515 A | 1/1968 |
| GB | 2453012 B | 6/2012 |
| JP | 3121150 U | 4/2006 |
| JP | 6491731 B1 | 3/2019 |
| KR | 20090010876 A | 1/2009 |
| WO | 9427474 A1 | 12/1994 |
| WO | 9529613 A1 | 11/1995 |
| WO | 9610936 A1 | 4/1996 |
| WO | 9701975 A1 | 1/1997 |
| WO | 0027250 A1 | 5/2000 |
| WO | 2011073478 A1 | 6/2011 |
| WO | 2021112752 A1 | 6/2021 |
| WO | 2024027174 A1 | 2/2024 |
| WO | 2024213298 A1 | 10/2024 |

OTHER PUBLICATIONS

"Closet Culture Modular Closet System", Available Online at: knapeandvogt.com, Nov. 11, 2016, 2 pages.

* cited by examiner

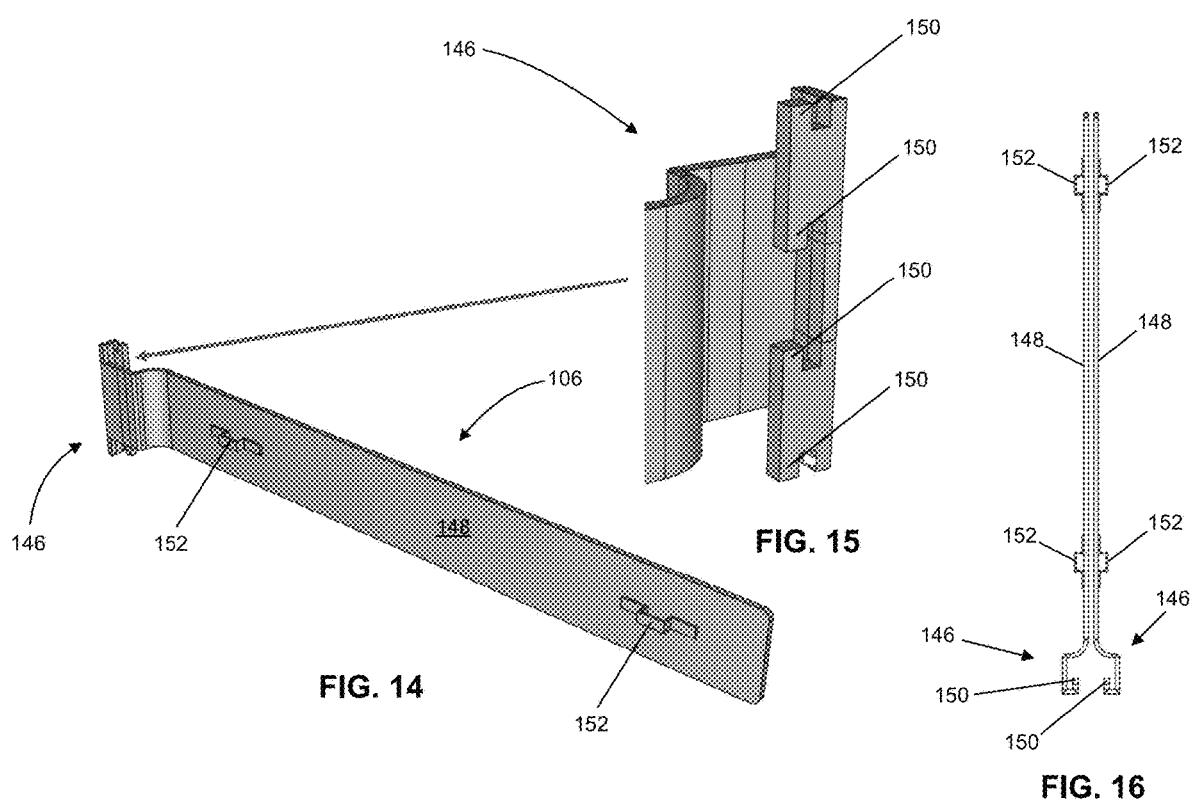

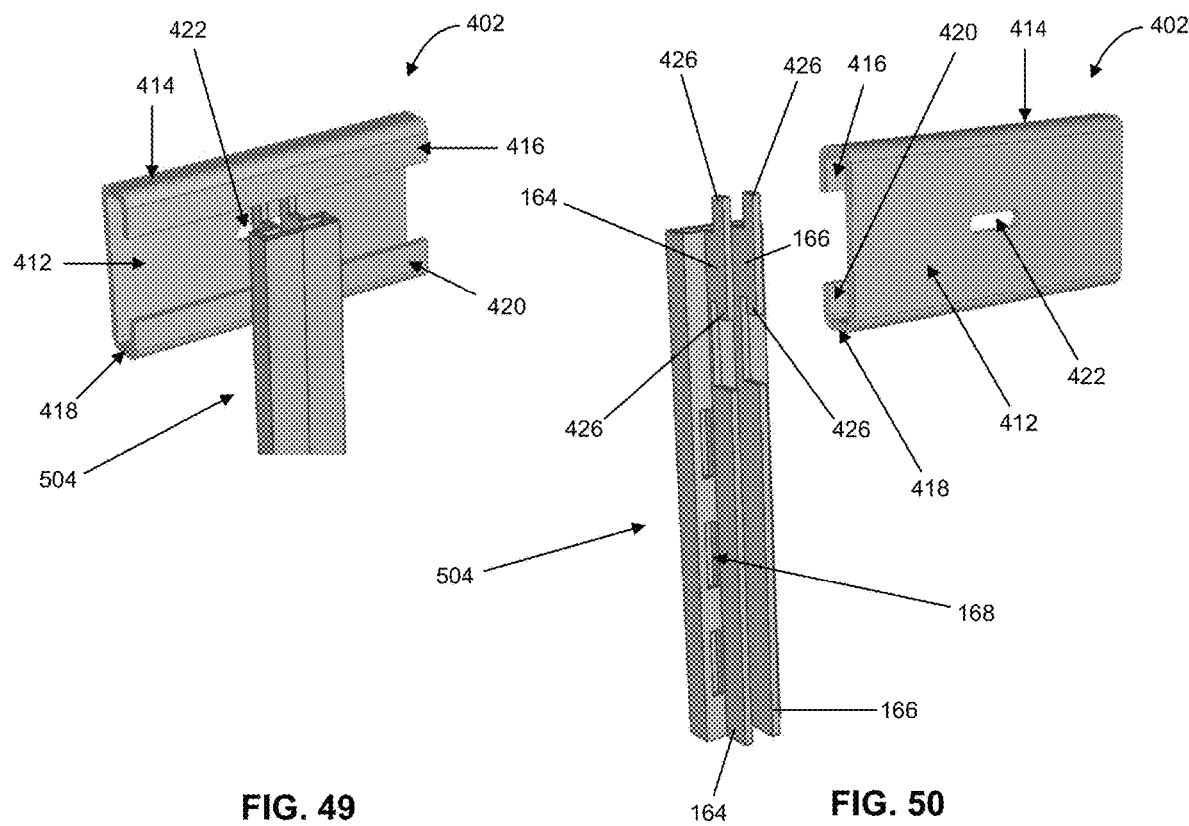

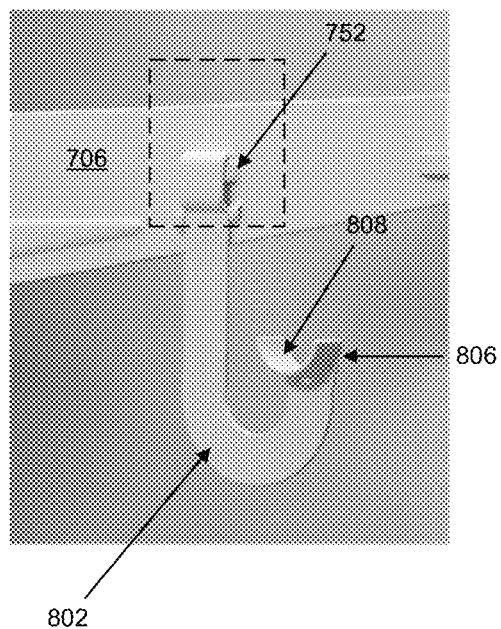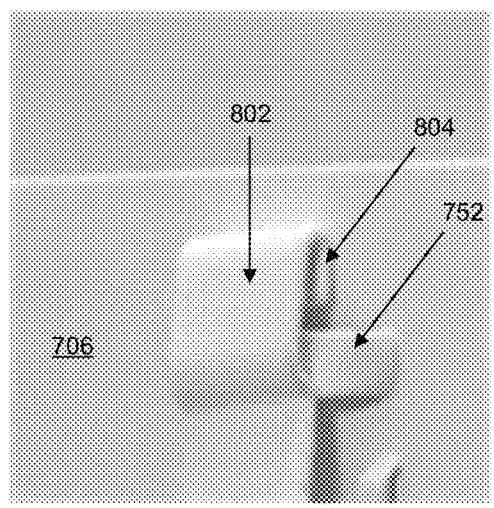
FIG. 61                                    FIG. 62

CLOSET ORGANIZATION SYSTEMS

BACKGROUND

Closet organization systems can be used to increase closet storage and/or organization. Many closet organization systems are configured for installation by anyone having a sufficient level of relevant construction skills, such as, for example, locating underlying studs, ensuring horizontal or vertical orientation of support member, and installing mounting fasteners. While there are existing closet organization systems, improvements in closet storage capacity, closet organization, closet esthetics, closet customization, and ease of installation remain of interest.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments described herein are directed to closet organization systems that include components that can be selectively employed and arranged to produce improvements in storage capacity, organization, esthetics, customization, and ease of installation. In many embodiments, a closet organization system includes: 1) a support track that is mounted to a wall in a horizontal orientation, 2) support rails suspended from the support track, and 3) shelf support brackets mountable to the support rails. The support track can include a series of apertures for mounting fasteners used to secure the support track to underlying studs of the wall. The support track and the support rails are configured to accommodate fast and secure suspension of the support rails from the support track. The support rails include mounting slots for engagement by one or more mounting hooks of each of the shelf support brackets. In many embodiments, the mounting slots are disposed in side surfaces or rear surfaces of the support rails so as to at least partially conceal the mounting slots, thereby enhancing esthetics of the closet organization system. The closet organization systems described herein can include many different types of components (support tracks, support rails, shelf support brackets, shelfs, shoe racks, pant racks, tie/belt racks, drawers, shoe rack drawers, closet rods, utility hooks, shelf dividers, etc.) that can be selectively employed and arranged to produce many different custom configurations.

Thus, in one aspect a closet organization system includes a support track, a support rail, and a shelf support bracket. The support track includes apertures. Each of the apertures is configured to accommodate a mounting fastener for securing the support track to a wall in a mounted configuration of the support track in which the support track is horizontal. The support rail includes bracket mounting slots. The support rail is configured for interfacing with the support track to hang the support rail vertically from the support track with the support rail interfaced with the wall and the bracket mounting slots facing the wall or extending through the support rail in a direction that is parallel to the wall in a mounted configuration of the support rail. The shelf support bracket includes a support arm and a mounting hook. The mounting hook is configured for insertion into one of the bracket mounting slots to secure the shelf support bracket to the support rail so that the support arm extends transversely from the support rail and away from the wall in a mounted configuration of the shelf support bracket.

In some embodiments, each of the bracket mounting slots extends through the support rail in a direction that is parallel to the wall in the mounted configuration of the support rail. The shelf support bracket can include a second mounting hook configured for insertion into one of the bracket mounting slots to secure the shelf support bracket to the support rail so that the support arm extends transversely from the support rail and away from the wall in the mounted configuration of the shelf support bracket.

The closet organization system can include wall anchor brackets. Each of the wall anchor brackets can include two wall anchor bracket mounting hooks, a wall attachment flange, and a fastener hole in the wall attachment flange. The wall anchor bracket mounting hooks can be configured for insertion into the bracket mounting slots to secure the wall anchor bracket to the support rail in a mounted configuration of the wall anchor bracket so that the wall attachment flange extends parallel to the wall. The fastener hole in the wall attachment flange can be configured to accommodate an anchor fastener for securing the wall attachment flange to the wall in the mounted configuration of the wall anchor bracket. Each of the wall anchor bracket mounting hooks can have a symmetrical configuration that enables the wall anchor bracket to be secured to the support rail via movement of the wall anchor bracket relative to the support rail in either of a first direction and a second direction that is opposite to the first direction.

In some embodiments of the closet organization system, the shelf support bracket includes a second mounting hook. The second mounting hook can be configured for insertion into one of the bracket mounting slots to secure the shelf support bracket to the support rail so that the support arm extends transversely from the support rail and away from the wall in the mounted configuration of the shelf support bracket.

In some embodiments, the support rail is configured to hang from an upper flange of the support track. For example, the support track can include a back panel, an upper flange, and a lower flange. Each of the apertures can be disposed in the back panel. The upper flange can extend transversely from the back panel so as to extend, in the mounted configuration of the support track, upwardly from the back panel and outwardly from the wall. The support rail can include a contoured cut-out shaped to accommodate the support track in the mounted configuration of the support track and interface with the upper flange to hang the support rail vertically from the support track with the support rail interfaced with the wall. The lower flange can extend transversely from the back panel. The support track can be formed from an extrusion, such as a near net-shape extrusion. In some embodiments, the upper flange extends at an upper flange angle from the back panel in a range from 35 degrees to 55 degrees.

In some embodiments, the closet organization system includes a support track cover detachably mounted to the support track to conceal the apertures. In some embodiments, the support track is configured to enhance retention of the support track cover. For example, the lower flange of the support track can include a lower flange base and a lower flange lip. The lower flange base can extend forward from the back panel in the mounted configuration of the support track. The lower flange lip can extend up from the lower flange base in the mounted configuration of the support track. The support track cover can include a lower portion shaped to interface with the back panel, the lower flange base, and the lower flange lip to secure the support track cover to the support track.

In some embodiments, the support rail includes aft-facing bracket mounting slots. For example, the support rail can include a support rail first side aft-facing panel, a support rail second side aft-facing panel, a support rail first side aft flange, and a support rail second side aft flange. The bracket mounting slots can include a first series of the bracket mounting slots in the support rail first side aft-facing panel and a second series of the bracket mounting slots in the support rail second side aft-facing panel. The support rail first side aft flange can extend aft from the support rail first side aft-facing panel. The support rail second side aft flange can extend aft from the support rail second side aft-facing panel. The support rail first side aft flange and the support rail second side aft flange can interface with the wall in the mounted configuration of the support rail.

In some embodiments, the support rail includes side-facing bracket mounting slots. For example, the support rail can include a support rail first side aft flange and a support rail second side aft flange. The support rail second side aft flange can be offset from and parallel to the support rail first side aft flange are parallel. The bracket mounting slots can include a first series of the bracket mounting slots in the support rail first side aft flange and a second series of the bracket mounting slots in the support rail second side aft flange. The support rail first side aft flange and the support rail second side aft flange can interface with the wall in the mounted configuration of the support rail. The closet organization system can further include a second shelf support bracket that includes a second shelf support bracket support arm, a second shelf support bracket mounting hook, and a second shelf support bracket aft portion connecting the second shelf support bracket support arm to the second shelf support bracket mounting hook. The shelf support bracket can include a shelf support bracket aft portion connecting the support arm of the shelf support bracket to the mounting hook of the shelf support bracket. The mounting hook of the shelf support bracket can be configured for insertion into one of the first series of the bracket mounting slots to secure the shelf support bracket to the support rail so that the shelf support bracket aft portion extends transversely from the support rail and the support arm of the shelf support bracket extends away from the wall in a mounted configuration of the shelf support bracket. The second shelf support bracket mounting hook can be configured for insertion into one of the second series of the bracket mounting slots to secure the second shelf support bracket to the support rail so that the second shelf support bracket aft portion extends transversely from the support rail and the second shelf support bracket support arm extends away from the wall in a mounted configuration of the second shelf support bracket. The shelf support bracket and second shelf support bracket can be configured so that, when the shelf support bracket is in the mounted configuration of the shelf support bracket and the second shelf support bracket is in the mounted configuration of the second shelf support bracket, the second shelf support bracket aft portion extends transversely in a first direction and the shelf support bracket aft portion extends in a different direction that is substantially opposite to the first direction. The second shelf support bracket aft portion and the shelf support bracket aft portion can be configured to include a joggle adapted to accommodate opposite side panels of the support rail. The support rail can include a support rail first side aft panel, a support rail second side aft panel, a support rail first side side panel, a support rail second side side panel and a support rail front panel. The support rail first side aft panel can connect the support rail first side side panel to the support rail first side aft flange. The support rail second side aft panel can connect the support rail second side side panel to the support rail second side aft flange. The support rail front panel can connect the support rail first side side panel to the support rail second side side panel. The support rail first side aft flange can be offset from the support rail first side side panel towards the support rail second side aft flange by an offset distance of equal to or greater than 0.20 inches. The first series of the bracket mounting slots can be hidden from view for view directions equal to or greater than 60 degrees from the wall in a plane perpendicular to each of the wall and the support rail first side aft flange. The support rail second side aft flange can be offset from the support rail second side side panel towards the support rail first side aft flange by an offset distance of equal to or greater than 0.20 inches. The second series of the bracket mounting slots can be hidden from view for view directions equal to or greater than 60 degrees from the wall in a plane perpendicular to each of the wall and the support rail second side aft flange.

The closet organization system can include a second support rail a second shelf support bracket. The second support rail can include second bracket mounting slots. The second support rail can be configured to interface with the support track to hang the second support rail vertically from the support track with the second support rail interfaced with the wall and the second bracket mounting slots facing the wall in a mounted configuration of the second support rail. The second shelf support bracket can include a second shelf support bracket support arm and second shelf support bracket mounting hooks. Each of the second shelf support bracket mounting hooks can be configured for insertion into one of the second bracket mounting slots to secure the second shelf support bracket to the second support rail so that the second shelf support bracket support arm extends transversely from the second support rail and away from the wall in a mounted configuration of the second shelf support bracket. The shelf support bracket can include a shelf support bracket aft portion connecting the support arm of the shelf support bracket to the mounting hook of the shelf support bracket. The second shelf support bracket can include a second shelf support bracket aft portion connecting the support arm of the second shelf support bracket to the mounting hook of the second shelf support bracket. The mounting hook of the second shelf support bracket can be configured for insertion into one of the second bracket mounting slots to secure the second shelf support bracket to the second support rail so that the second shelf support bracket aft portion extends transversely from the second support rail and the second shelf support bracket support arm extends away from the wall in a mounted configuration of the second shelf support bracket. The mounting hook of the shelf support bracket can be configured for insertion into one of the bracket mounting slots to secure the shelf support bracket to the support rail so that the shelf support bracket aft portion extends transversely from the support rail and the support arm of the shelf support bracket extends away from the wall in a mounted configuration of the shelf support bracket. The second support rail can include a second support rail first side aft-facing panel, a second support rail second side aft-facing panel, a second support rail first side aft flange, and a second support rail second side aft flange. The second bracket mounting slots can include a first series of the second bracket mounting slots in the second support rail first side aft-facing panel and a second series of the second bracket mounting slots in the second support rail second side aft-facing panel. The second support rail first side aft flange can extend aft from the second support rail first side aft-facing panel. The second support rail second side aft flange can extend aft from the second support rail second side aft-facing panel. The second support rail first side aft flange and the second support rail second side aft flange can interface with the wall in the mounted configuration of the second support rail.

The closet organization system can include a third support rail, a third shelf support bracket, and a fourth shelf support bracket. The third support rail can include third bracket mounting slots. The third support rail can be configured to be interfaced with the support track to hang the third support rail vertically from the support track with the third support rail interfaced with the wall and the third bracket mounting slots facing the wall in a mounted configuration of the third support rail. The third shelf support bracket can include a support arm and a mounting hook. The mounting hook of the third shelf support bracket can be configured for insertion into one of the third bracket mounting slots to secure the third shelf support bracket to the third support rail so that the support arm extends transversely from the third support rail and away from the wall in a mounted configuration of the third shelf support bracket. The fourth shelf support bracket can include a support arm and a mounting hook. The mounting hook of the fourth shelf support bracket can be configured for insertion into one of the bracket mounting slots to secure the fourth shelf support bracket to the support rail so that the support arm extends transversely from the support rail and away from the wall in a mounted configuration of the fourth shelf support bracket. The third shelf support bracket can include four mounting hooks. Two of the four mounting hooks of the third shelf support bracket can be configured to engage two of the bracket mounting slots of the third support rail. The fourth shelf support bracket can include four mounting hooks. Two of the four mounting hooks of the fourth shelf support bracket can be configured to engage two of the bracket mounting slots of the support rail.

The closet organization system can include a shelf and a second shelf. The shelf can be mounted to and supported by each of the support arm of the shelf support bracket and the support arm of the second shelf support bracket. The second shelf can be mounted to and supported by each of the support arm of the third shelf support bracket and the support arm of the fourth shelf support bracket. The support arm of the shelf support bracket and the support arm of the fourth shelf support bracket can be disposed between the shelf and the second shelf.

Each of the apertures of the support track can have a width longer than a height of the apertures to accommodate horizontal repositioning of the mounting fastener relative to the support track, when the support track extends horizontally in the mounted configuration against a vertical wall. Each of the apertures has a chamfered edge to accommodate a beveled head of a mounting fastener.

The support track can include a back panel, an upper panel, an upper return flange, a lower panel, and a lower return flange. The back panel can include the apertures. The upper panel can extend forward from the back panel, away from the wall when the support track is in the mounted configuration of the support track. The upper return flange can extend down from the upper panel in the mounted configuration of the support track. The lower panel can extend forward from the back panel, away from the wall when the support track is in a mounted configuration of the support track. The lower return flange can extend up from the lower panel in the mounted configuration of the support track. The support rail can include support track hooks configured for engagement with the support track to hang the support rail from the support track. The support track can be formed from an extrusion.

In another aspect, a closet organization system includes support rails and support brackets. Each of the support rails is mountable to a wall in a mounted configuration in which the support rail is vertical. Each of the support rails includes bracket mounting slots. A first series of the bracket mounting slots is distributed in a first half of the support rail. A second series of the bracket mounting slots is distributed in a second half of the support rail opposite to the first half. Each of the support brackets includes a support arm and mounting hooks. Each of the mounting hooks is configured for insertion into one of the bracket mounting slots to mount the support bracket to the one of the support rails. Each of the support brackets is configured to be mounted to one of the support rails in a first orientation via the first series of the bracket mounting slots. Each of the support brackets is configured to be mounted to one of the support rails in a second orientation via the second series of the bracket mounting slots. The second orientation is opposite to the first orientation.

The bracket mounting slots can face any suitable direction. In some embodiments, the bracket mounting slots of each of the support rails face the wall in the mounted configuration of the support rail. In some embodiments, the bracket mounting slots of each of the support rails extend through the support rail in a direction parallel to the wall in the mounted configuration of the support rail. In some embodiments, the bracket mounting slots of each of the support rails extend through the support rail in a direction perpendicular to and are spaced away from the wall in the mounted configuration of the support rail.

In many embodiments, the closet organization system includes a shelf mounted to and supported by two of the support brackets. Each of the support brackets can include shelf support mounting features and the shelf can include shelf mounting features. Each of the shelf mounting features is configured to mate with one of the shelf support mounting features to couple the shelf with the support bracket. Each of the shelf support mounting features can include a receptacle. Each of the shelf mounting features can be configured to be inserted into a respective one of the receptacles. In some embodiments, each of the shelf support mounting features includes a joggled strap attached to a side surface of the support arm so that the joggled strap and the side surface define the receptacle.

In another aspect, a closet organization system includes a support rail and support brackets. The support brackets have a common configuration. The support rail is mountable to a wall in a mounted configuration in which the support rail is vertical. The support rail includes bracket mounting slots that face the wall or extend through the support rail in a direction that is parallel to the wall in the mounted configuration. A first series of the bracket mounting slots is distributed in a first half of the support rail. A second series of the bracket mounting slots is distributed in a second half of the support rail opposite to the first half. Each of the support brackets includes a support arm and mounting hooks. Each of the mounting hooks is configured for insertion into one of the bracket mounting slots to mount the support bracket to the support rail. The support brackets are configured so that a first support bracket of the support brackets can be mounted to the support rail in a first position and a first orientation via the first series of the bracket mounting slots. The support brackets are configured so that a second support bracket of the support brackets can be mounted to the support rail in a second position and a second orientation via the second series of the bracket mounting slots. The support arm of the first support bracket in the first position and the first orientation can be aligned and disposed side-by-side with the support arm of the second support bracket in the second position and the second orientation. In many embodiments, the closet organization system includes a first shelf mounted to and supported by the first support bracket and a second shelf mounted to and supported by the second support bracket.

The bracket mounting slots can face any suitable direction. In some embodiments, the bracket mounting slots face the wall in the mounted configuration of the support rail. In some embodiments, the bracket mounting slots extend through the support rail in a direction that is parallel to the wall in the mounted configuration of the support rail.

In some embodiments, the each of the first support bracket and the second support bracket include shelf support mounting features and each of the first shelf and the second shelf includes shelf mounting features. Each of the shelf mounting features is configured to mate with one of the shelf support mounting features. In some embodiments, each of the shelf support mounting features includes a receptacle and each of the shelf mounting features is configured to be inserted into a respective one of the receptacles. In some embodiments, each of the shelf support mounting features includes a joggled strap attached to a side surface of the support arm so that the joggled strap and the side surface define the receptacle.

In another aspect, a closet organization system includes a support track, a support rail, and a shelf support bracket. The support track includes apertures. Each of the apertures is configured to accommodate a mounting fastener for securing the support track to a wall in a mounted configuration of the support track in which the support track is horizontal. The support rail includes bracket mounting slots. The support rail is configured for interfacing with the support track to hang the support rail vertically from the support track with the support rail interfaced with the wall and the bracket mounting slots extending through the support rail in a horizontal direction that is parallel to the wall in a mounted configuration of the support rail. The shelf support bracket includes a support arm, a mounting hook, and a shelf support bracket aft portion connecting the mounting hook to the support arm. The mounting hook is configured for insertion into one of the bracket mounting slots via translation of the shelf support bracket away from the wall to secure the shelf support bracket to the support rail so that the shelf support bracket aft portion extends transversely from the support rail and the support arm extends from the shelf support bracket aft portion in a direction away from the wall in a mounted configuration of the shelf support bracket.

In some embodiments, the support rail hangs from an upper flange of the support track. For example, in some embodiments, the support track includes a back panel, an upper flange, and a lower flange. Each of the apertures can be disposed in the back panel. The upper flange extends transversely from the back panel so as to extend, in the mounted configuration of the support track, upwardly from the back panel and outwardly from the wall. The support rail includes a contoured cut-out shaped to accommodate the support track in the mounted configuration of the support track and interface with the upper flange to hang the support rail vertically from the support track with the support rail interfaced with the wall. The lower flange extends transversely from the back panel.

In some embodiments, the support track includes a back panel, an upper panel, an upper return flange, a lower panel, and a lower return flange. The back panel includes the apertures. The upper panel extends forward from the back panel in the mounted configuration of the support track. The upper return flange extends down from the upper panel in the mounted configuration of the support track. The lower panel extends forward from the back panel in a mounted configuration of the support track. The lower return flange extends up from the lower panel in the mounted configuration of the support track. The support rail includes support track hooks configured for engagement with the support track to hang the support rail from the support track. The support track can be formed from an extrusion (e.g., a near net-shape extrusion).

In some embodiments, the support rail is formed from an extrusion (e.g., a near net-shape extrusion). For example, the support rail can include a support rail first side aft-facing panel, a support rail second side aft-facing panel, a support rail first side aft flange, and a support rail second side aft flange. The bracket mounting slots include a first series of the bracket mounting slots in the support rail first side aft-facing panel and a second series of the bracket mounting slots in the support rail second side aft-facing panel. The support rail first side aft flange extends aft from the support rail first side aft-facing panel. The support rail second side aft flange extends aft from the support rail second side aft-facing panel. The support rail first side aft flange and the support rail second side aft flange interface with the wall in the mounted configuration of the support rail.

In another aspect, a closet organization system includes a support track, a support rail, and a shelf support bracket. The support track includes apertures. Each of the apertures is configured to accommodate a mounting fastener for securing the support track to a wall in a mounted configuration of the support track in which the support track is horizontal. The support rail includes a central slot and bracket mounting slots. The support rail is configured to interface with the support track to hang the support rail vertically from the support track with the support rail interfaced with the wall and the bracket mounting slots facing the central slot in a mounted configuration of the support rail in which the support rail is vertical. The shelf support bracket includes a support arm, a mounting hook, and a shelf support bracket aft portion connecting the mounting hook to the support arm. The mounting hook is configured for insertion into one of the bracket mounting slots to secure the shelf support bracket to the support rail so that the shelf support bracket aft portion extends transversely from the support rail and the support arm extends from the shelf support bracket aft portion in a direction away from the wall in a mounted configuration of the shelf support bracket.

In some embodiments, the support rail is configured to hang from an upper flange of the support track. For example, the support track can include a back panel, an upper flange, and a lower flange. Each of the apertures is disposed in the back panel. The upper flange extends transversely from the back panel so as to extend, in the mounted configuration of the support track, upwardly from the back panel and outwardly from the wall. The support rail includes a contoured cut-out shaped to accommodate the support track in the mounted configuration of the support track and interface with the upper flange to hang the support rail vertically from the support track with the support rail interfaced with the wall.

In some embodiments, the support track includes a back panel, an upper panel, an upper return flange, a lower panel, and a lower return flange. The back panel includes the apertures. The upper panel extends forward from the back panel in the mounted configuration of the support track. The upper return flange extends down from the upper panel in the mounted configuration of the support track. The lower panel extends forward from the back panel in a mounted configuration of the support track. The lower return flange extends up from the lower panel in the mounted configuration of the support track. The support rail includes support track hooks configured for engagement with the support track to hang the support rail from the support track. The support track can be formed from an extrusion (e.g., a near net-shape extrusion).

In many embodiments, the support rail is formed from an extrusion (e.g., a near net-shape extrusion). For example, in some embodiments the support rail includes a support rail back panel, a support rail first side center slot panel, a support rail first side front panel, a support rail first side flange, a support rail second side center slot panel, a support rail second side front panel, and a support rail second side flange. The bracket mounting slots include a first series of the bracket mounting slots in the support rail first side center slot panel and a second series of the bracket mounting slots in the support rail second side center slot panel. The support rail first side center slot panel extends forward from a first side of the support rail back panel in the mounted configuration of the support rail. The support rail first side front panel extends perpendicularly from a front end of the support rail first side center slot panel in the mounted configuration of the support rail. The support rail first side flange extends from the support rail first side front panel towards the wall in the mounted configuration of the support rail. The support rail second side center slot panel extends forward from a second side of the support rail back panel in the mounted configuration of the support rail. The support rail second side front panel extends perpendicularly from a front end of the support rail second side center slot panel in the mounted configuration of the support rail. The support rail second side flange extends from the support rail second side front panel towards the wall in the mounted configuration of the support rail. The support rail back panel, the support rail first side flange, and the support rail second side flange interface with the wall in the mounted configuration of the support rail.

The support rail can include fastener apertures. For example, in many embodiments the support rail back panel includes apertures. Each of the apertures is configured to accommodate a mounting fastener for securing the support rail to the wall in a mounted configuration of the support rail.

For a fuller understanding of the nature and advantages of the present invention, reference should be made to the ensuing detailed description and accompanying drawings.

BRIEF DESCRIPTION OF THE DRAWINGS

FIG. 14 shows a symmetrical shelf support bracket of the closet organization system of FIG. 1 and FIG. 2.

FIG. 15 illustrates an aft portion of the symmetrical shelf support bracket of FIG. 14.

FIG. 16 is a plan view of a pair of symmetrical shelf support brackets of the closet organization system of FIG. 1 and FIG. 2.

FIG. 49 and FIG. 50 illustrate alternate embodiments of a support rail that can be employed in an alternate embodiment of the closet organization system of FIG. 1 and FIG. 2.

FIG. 61 and FIG. 62 shows views of the support arm of FIG. 57 and a closet rod support member mountable to the support arm.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
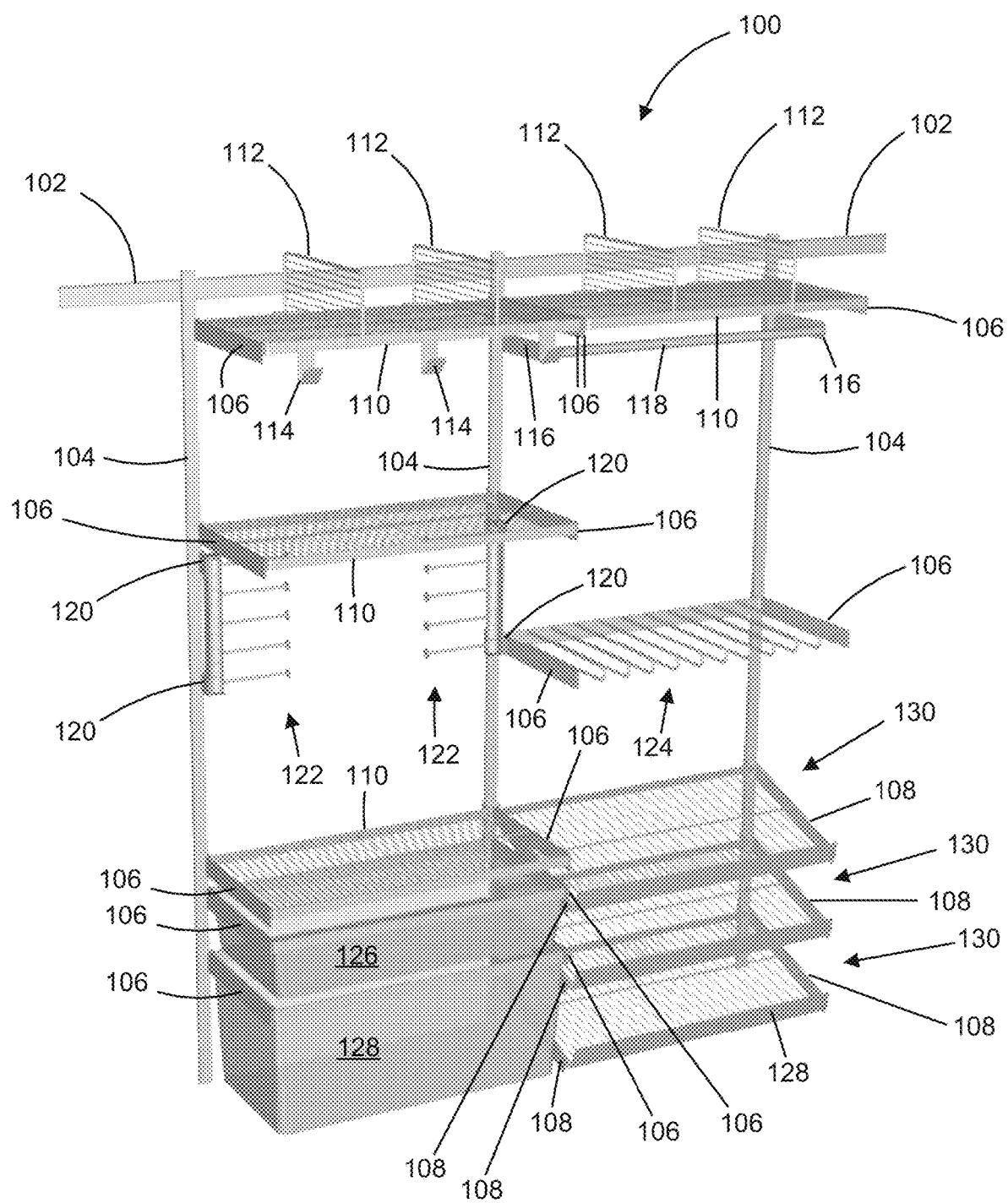
FIG. 1 shows an example configuration of a closet organization system, in accordance with embodiments.

Turning now to the drawing figures, in which the same or similar reference identifiers refer to the same or similar features, FIG. 1 shows an example configuration of a closet organization system 100, in accordance with embodiments. The closet organization system 100 is attachable to a wall via suitable fasteners. The example configuration of the closet organization system 100 shown in FIG. 1 includes support track(s) 102, support rails 104, shelf support brackets 106, angled support brackets 108, wire shelves 110, wire shelf dividers 112, wire shelf utility hooks 114, closet rod support brackets 116, a closet rod 118, pivoting tie/belt rack support brackets 120, pivoting tie/belt racks 122, a pants rack 124, mesh drawers 126, 128, and angled wire shoe racks 130. The components of the example configuration of the closet organization system 100 shown in FIG. 1 are discussed in more detail herein.

Figure 2:
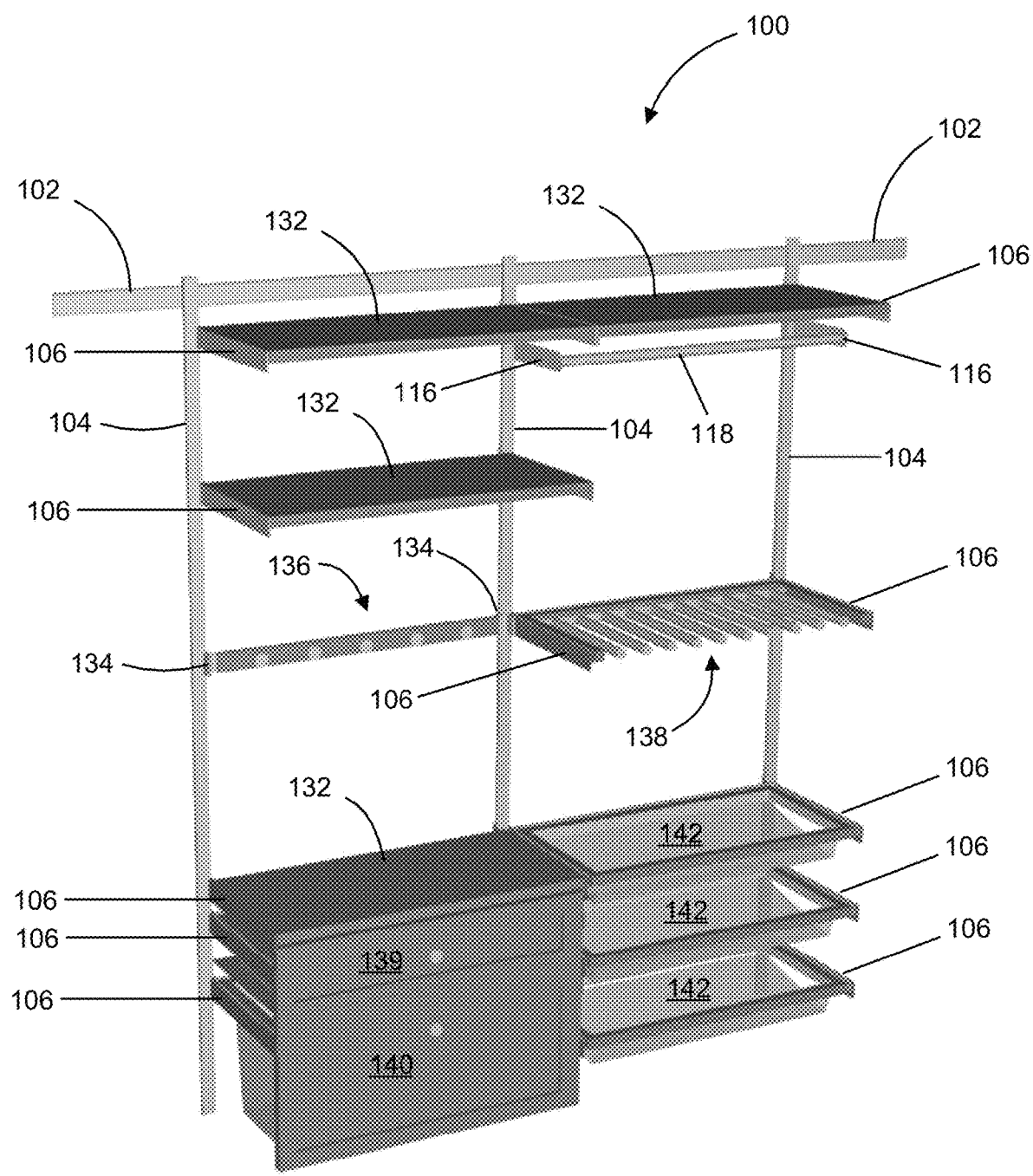
FIG. 2 shows another example configuration of the closet organization system of FIG. 1.

FIG. 2 shows another example configuration of a closet organization system 100, in accordance with embodiments. The example configuration of the closet organization system 100 shown in FIG. 2 includes support track(s) 102, support rails 104, shelf support brackets 106, closet rod support brackets 116, a closet rod 118, wood shelves 132, hook rack support brackets 134, a hook rack 136, a pant rack drawer 138, solid front panel mesh drawers 139, 140, and mesh shoe rack drawers 142. The components of the example configuration of the closet organization system 100 shown in FIG. 2 are discussed in more detail herein. The components of closet organization system 100 can be selectively employed and arranged in any suitable configuration including, but not limited to, the example configurations shown in FIG. 1 and FIG. 2.

Figure 3:
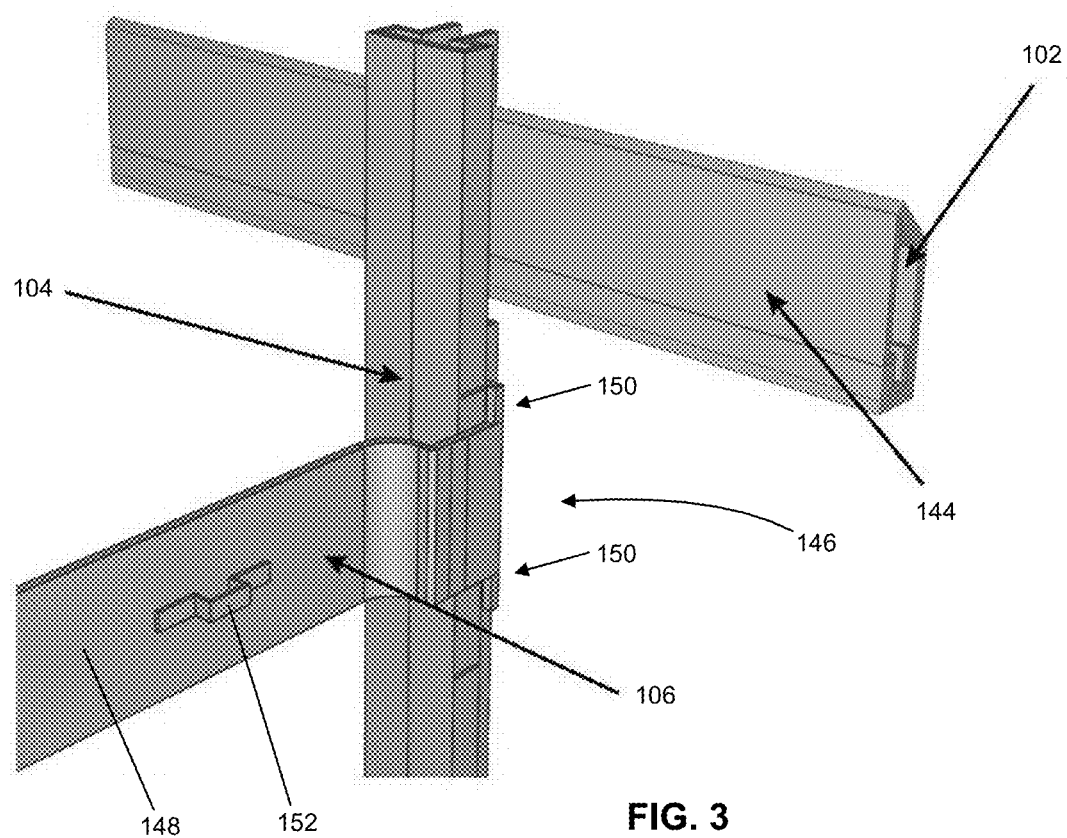
FIG. 3 illustrates a support track, a support track cover, a support rail, and a shelf support bracket of the closet organization system of FIG. 1 and FIG. 2.

FIG. 3 illustrates details of the support track 102, a support track cover 144, a support rail 104, and the shelf support bracket 106 of the closet organization system 100. The support track 102 is configured to be mounted horizontally to a wall (e.g., a closet wall) via mounting fasteners as described herein. The track cover 144 is detachably mountable to the support track 102 to present a more esthetic appearance. As described herein, the support rail 104 is configured to be suspended vertically from the support track 102. The shelf support bracket 106 is detachably mountable to the support rail 104 in any desired one of many possible vertical locations enabled by sequences of vertically distributed mounting slots of the support rail 104. The shelf support bracket 106 includes a shelf support bracket aft portion 146, a shelf support bracket support arm 148, and forward-facing mounting hooks 150. The shelf support bracket aft portion 146 of the shelf support bracket 106 is joggled to wrap around the rail 104 between the mounting hooks 150 to the support arm 148 to position the support arm 148 closely adjacent to a center plane of symmetry of the support rail 104. The shelf support bracket 106 includes shelf support mounting features 152 (one of two of which is shown in FIG. 3).

Figure 4:
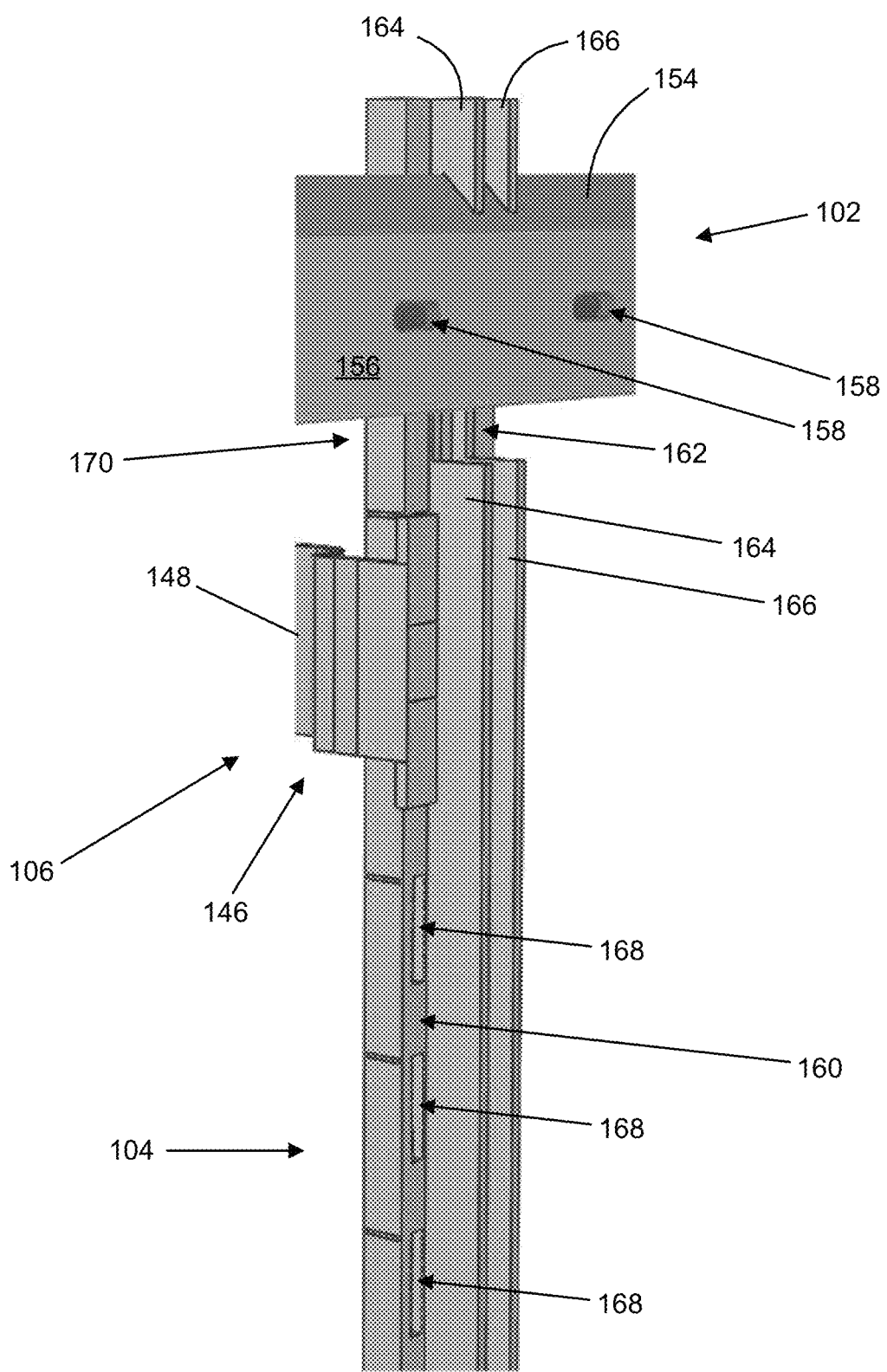
FIG. 4 illustrates aft portions of the support track, the support rail, and the shelf support bracket of FIG. 3.

FIG. 4 illustrates aft portions of the support track 102, the support rail 104, and the shelf support bracket 106. The support track 102 includes an upper flange 154 and a back panel 156. The back panel 156 includes mounting fastener apertures 158 that accommodate the installation of mounting fasteners to secure the support track 102 to underlying studs in the wall. The upper flange 154 extends upward and outward from the back panel 156 when the support track 102 is in a mounted configuration in which the support track 102 is horizontal. The support rail 104 includes a support rail first side aft-facing panel 160, a support rail second side aft-facing panel 162, a support rail first side aft flange 164, and a support rail second side aft flange 166, and bracket mounting slots 168. The bracket mounting slots 168 include a first series of the bracket mounting slots 168 in the support rail first side aft-facing panel 160 and a second series of the bracket mounting slots 168 in the support rail second side aft-facing panel 162. The support rail first side aft flange 164 extends aft from the support rail first side aft-facing panel 160. The support rail second side aft flange 166 extends aft from the support rail second side aft-facing panel 162. The support rail first side aft flange 164 and the support rail second side aft flange 166 interface with the wall in the mounted configuration of the support rail 104. The support rail 104 includes a contoured cut-out 170 shaped to accommodate the support track 102 and interface with a top surface of the upper flange 154 to suspend the support rail 104 from the support track 102.

Figure 5:
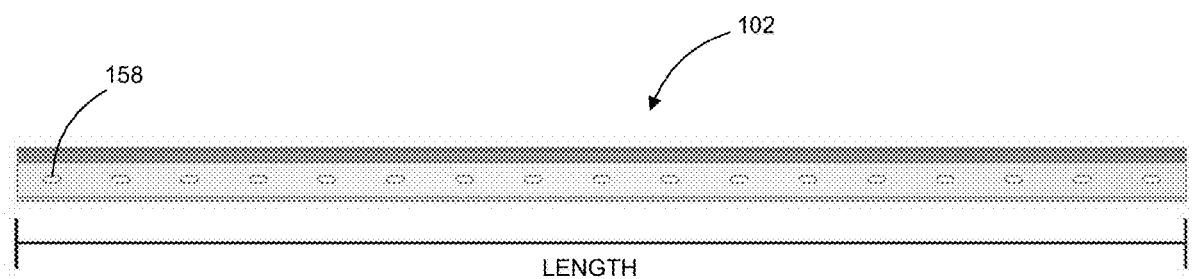
FIG. 5 is a front view illustration of a support track of the closet organization system of FIG. 1 and FIG. 2.
Figure 6:
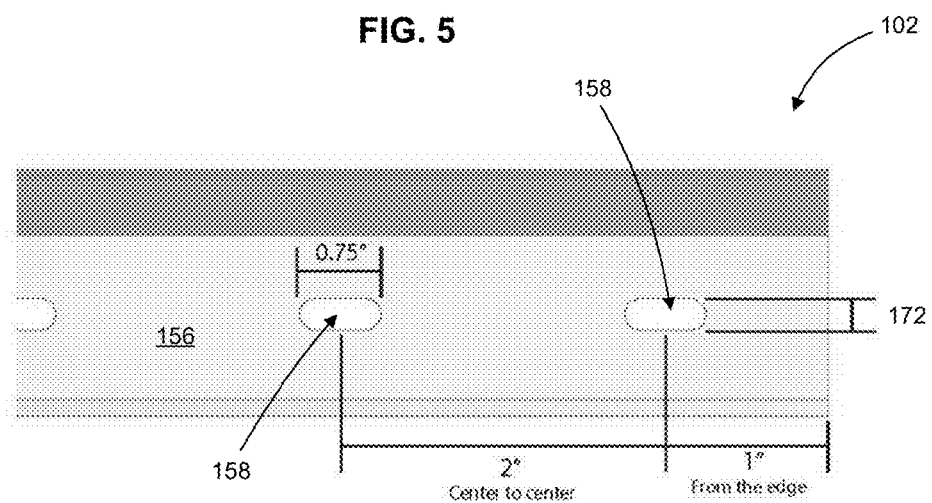
FIG. 6 is a close-up front view illustration of an end portion of the support track of FIG. 5.

FIG. 5 is a front view illustration of the support track 102. FIG. 6 is a close-up front view illustration of an end portion of the support track 102. While one support track 102 is shown, configurations of the closet organization system 100 can employ any suitable number of the support track 102 to extend along the length of the corresponding wall covered by the closet organization system 100. The support track 102 can have any suitable length. For example, in the illustrated embodiment, the support track 102 has an overall length of 34 inches. In the illustrated embodiment, the mounting fastener apertures 158 are slotted with a length of 0.75 inches and a width 172 that can be selected based on the diameter of the mounting fasteners used to secure the support track 102 to the wall. In the illustrated embodiment, the support track 102 includes seventeen of the mounting fastener apertures 158 distributed every two inches with each of the two end mounting fastener apertures 158 centered one inch from each end of the support track 102.

Figure 7:
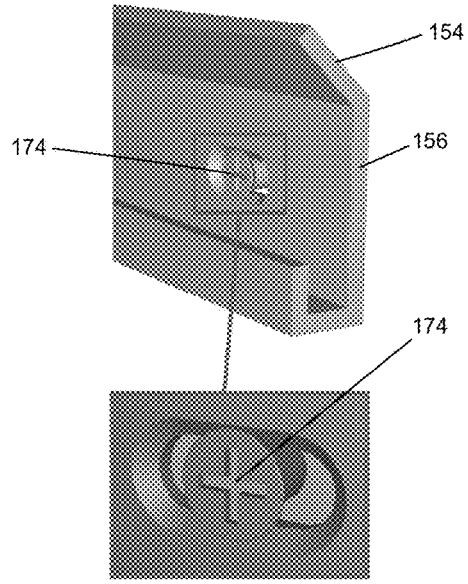
FIG. 7 illustrates an end portion of the support track of FIG. 5 showing a mounting fastener installed through a slotted aperture of the support track.
Figure 8:
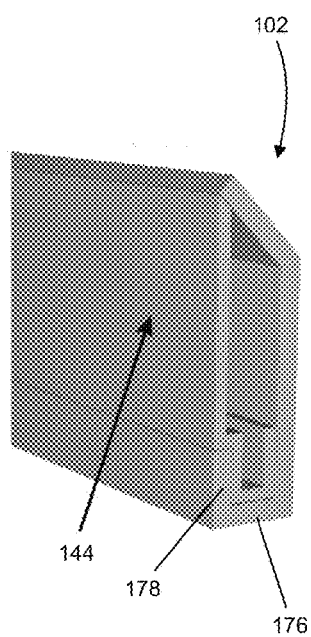
FIG. 8 illustrates an end portion of the support track of FIG. 5 showing a plastic cover mounted to the support track.
Figure 9:
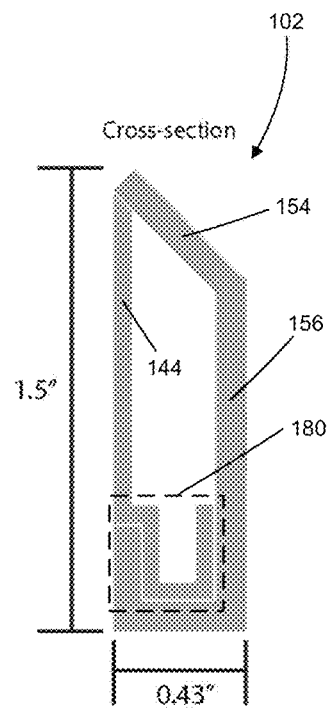
FIG. 9 is a cross-sectional view of the support track of FIG. 5 showing the plastic cover of FIG. 8 mounted to the support track.

FIG. 7 illustrates an end portion of the support track 102 and shows a mounting fastener 174 installed through one of the mounting fastener apertures 158. In the illustrated embodiment, the mounting fastener apertures 158 have a recessed edge to accommodate a beveled head of the mounting fastener 174, so that the head can be recessed into the support track 102. FIG. 8 illustrates the end portion of the support track 102 of FIG. 5 showing the track cover 144 mounted to the support track 102. FIG. 9 is a cross-sectional view of the support track 102 that shows the track cover 144 mounted to the support track 102. In the illustrated embodiment, the support track 102 includes a lower flange base 176 and a lower flange lip 178. The lower flange base 176 extends forward from the back panel 156 in the mounted configuration of the support track 102. The lower flange lip 178 extends up from the lower flange base 176 in the mounted configuration of the support track 102. The track cover 144 includes a lower portion 180 configured to interface with the back panel 156, the lower flange base 176, and the lower flange lip 178 to secure the track cover 144 to the support track 102.

Figure 10:
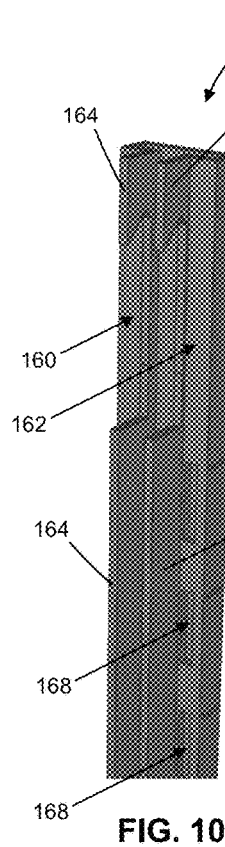
FIG. 10 and FIG. 11 illustrate aft portions of the support rail of FIG. 3.
Figure 11:
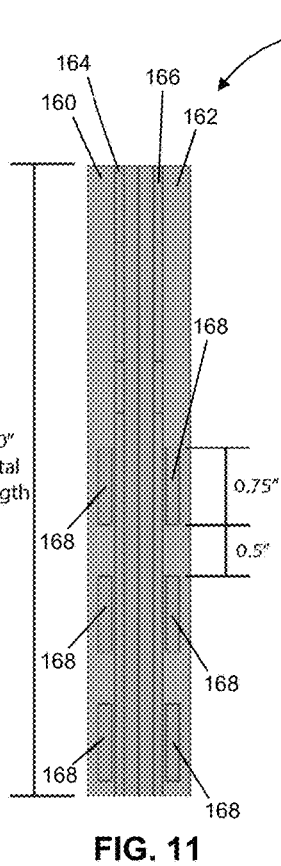
Figure 12:
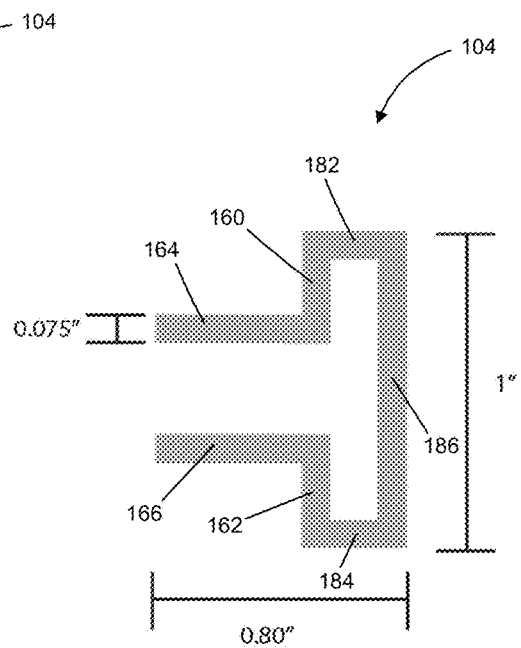
FIG. 12 is a cross-sectional view of the support rail of FIG. 3.

FIG. 10 and FIG. 11 illustrate aft portions of the support rail 104. FIG. 12 shows a cross-sectional view of the support rail 104. In addition to the support rail first side aft-facing panel 160, the support rail second side aft-facing panel 162, the support rail first side aft flange 164, and the support rail second side aft flange 166, and the bracket mounting slots 168, the support rail 104 includes a support rail first side panel 182, a support rail second side panel 184, and a support rail front panel 186. The support rail first side panel 182 connects the support rail front panel 186 to the support rail first side aft-facing panel 160. The support rail second side panel 184 connects the support rail front panel 186 to the support rail second side aft-facing panel 162. The support rail 104 can have any suitable width, depth, and length. For example, in the illustrated embodiment, the support rail 104 is 1.0 inch wide, 0.8 inch deep, 60 inches long, and each of the panels 160, 162, 182, 184, 186 and flanges 164, 166 is 0.075 inch thick.

Figure 13:
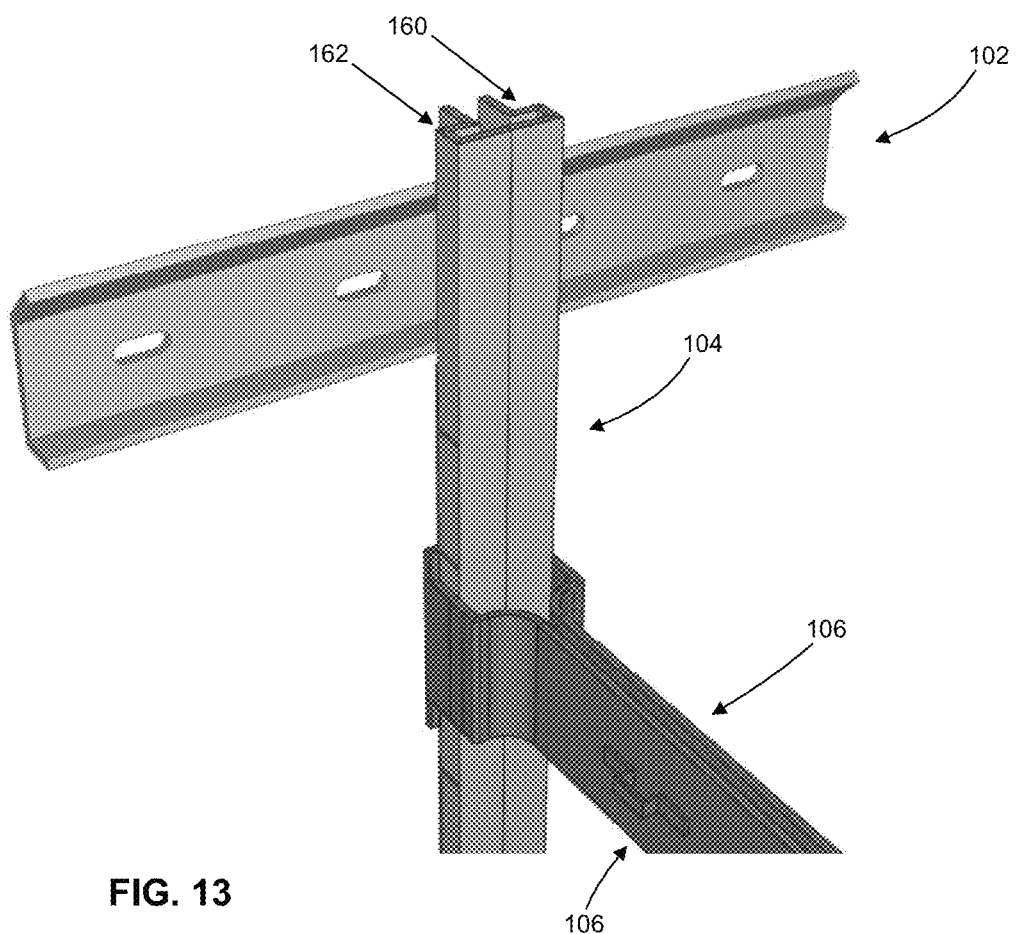
FIG. 13 illustrates a support track, a support rail, and a pair of shelf support brackets of the closet organization system of FIG. 1 and FIG. 2.

FIG. 13 illustrates an example assembly, of the closet organization system 100, that includes an instance of the support track 102, an instance of the support rail 104, and two instances of the shelf support bracket 106 mounted back-to-back to the support rail 104. The mounting hooks 150 of one of the shelf support brackets 106 is engaged with the support rail 104 via two of the mounting slots 168 disposed in the support rail first side aft-facing panel 160. The mounting hooks 150 of the other of the shelf support brackets 106 are engaged with the support rail 104 via two of the mounting slots 168 disposed in the support rail second side aft-facing panel 162.

FIG. 14 shows a symmetrical embodiment of the shelf support bracket 106. FIG. 15 illustrates the shelf support bracket aft portion 146 of the symmetrical embodiment of the shelf support bracket 106. The shelf support bracket 106 includes two of the shelf support mounting features 152 mounted to the support arm 148. The shelf support bracket aft portion 146 includes four of the forward-facing mounting hooks 150.

FIG. 16 is a plan view of a pair of symmetrical shelf support brackets 106 in the back-to-back mounted configuration shown in FIG. 13. One pair of the four mounting hooks 150 secure one of the shelf support brackets 106 to two of the slots 168 in the support rail first side aft-facing panel 160. The other pair of the four mounting hooks 150 secure one of the shelf support brackets 106 to two of the slots 168 in the support rail second side aft-facing panel 162.

Figures 17, 18:
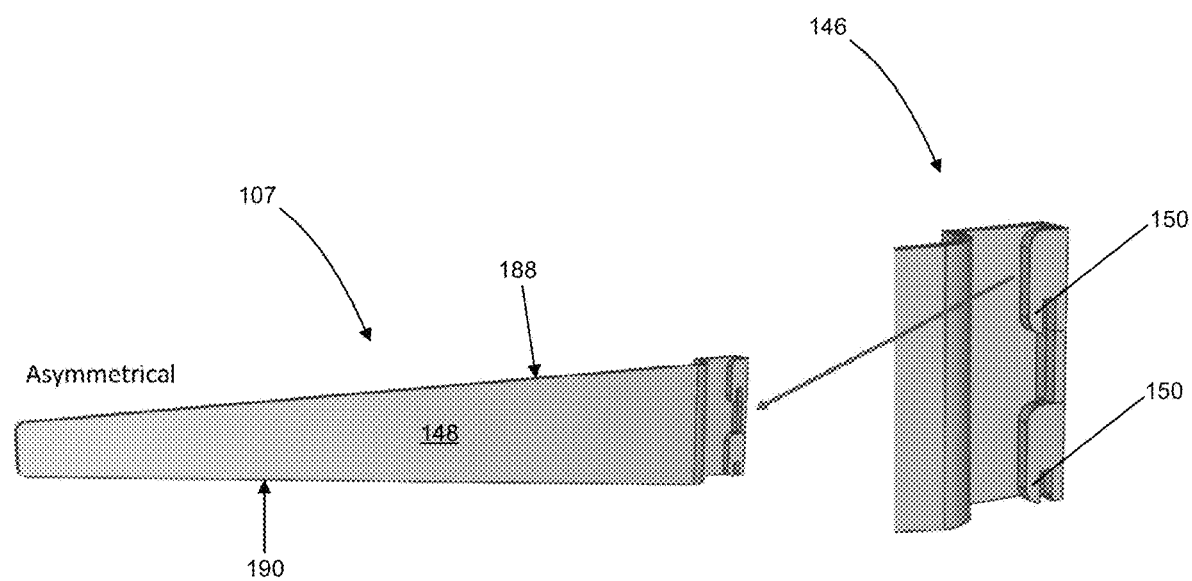
FIG. 17 shows an asymmetrical shelf support bracket of the closet organization system of FIG. 1 and FIG. 2.
FIG. 18 illustrates an aft portion of the asymmetrical shelf support bracket of FIG. 17.

FIG. 17 shows an asymmetrical embodiment of the shelf support bracket 106. FIG. 18 illustrates the shelf support bracket aft portion 146 of the asymmetrical embodiment of the shelf support bracket 106. The shelf support bracket aft portion 146 of the asymmetrical embodiment of the shelf support bracket 106 includes two of the forward-facing mounting hooks 150. The support arm 148 of the asymmetrical embodiment of the shelf support bracket 106 has a top edge 188 and a bottom edge 190. The asymmetrical embodiment of the shelf support bracket 106 is configured to be mounted to two of the mounting slots 168 located in one of the support rail first side aft-facing panel 160 or the support rail second side aft-facing panel 162 so that the top edge 188 faces up and the bottom edge 190 faces down.

Figure 19:
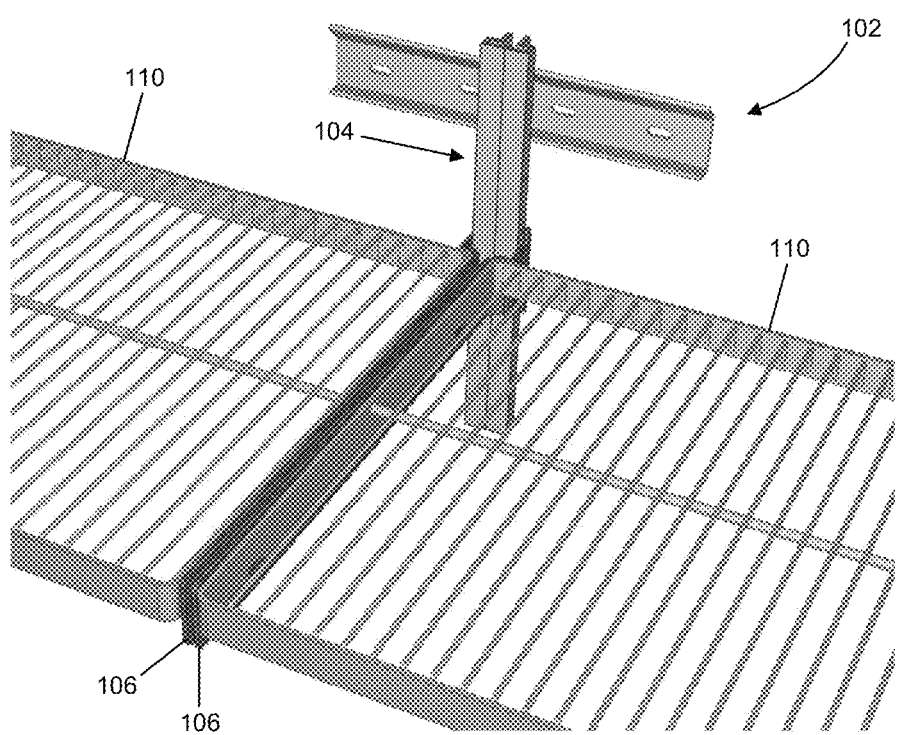
FIG. 19 illustrates a support track, a support rail, a pair of shelf support brackets, and a pair of side by side shelves of the closet organization system of FIG. 1 and FIG. 2.

FIG. 19 illustrates an example assembly, of the closet organization system 100, that includes an instance of the support track 102, an instance of the support rail 104, a pair of the shelf support brackets 106 in the back-to-back mounted configuration shown in FIG. 13, and two wire shelves 110 in a side-by-side mounted configuration (shown also in FIG. 1). The back-to-back mounted configuration of the two shelf support brackets 106, in combination with the two wire shelves 110 in the side-by-side mounted configuration, avoids any substantial un-filled gap between the two wire shelves 110 while employing only one instance of the support rail 104 to support the two shelf support brackets 106.

Figures 20, 21:
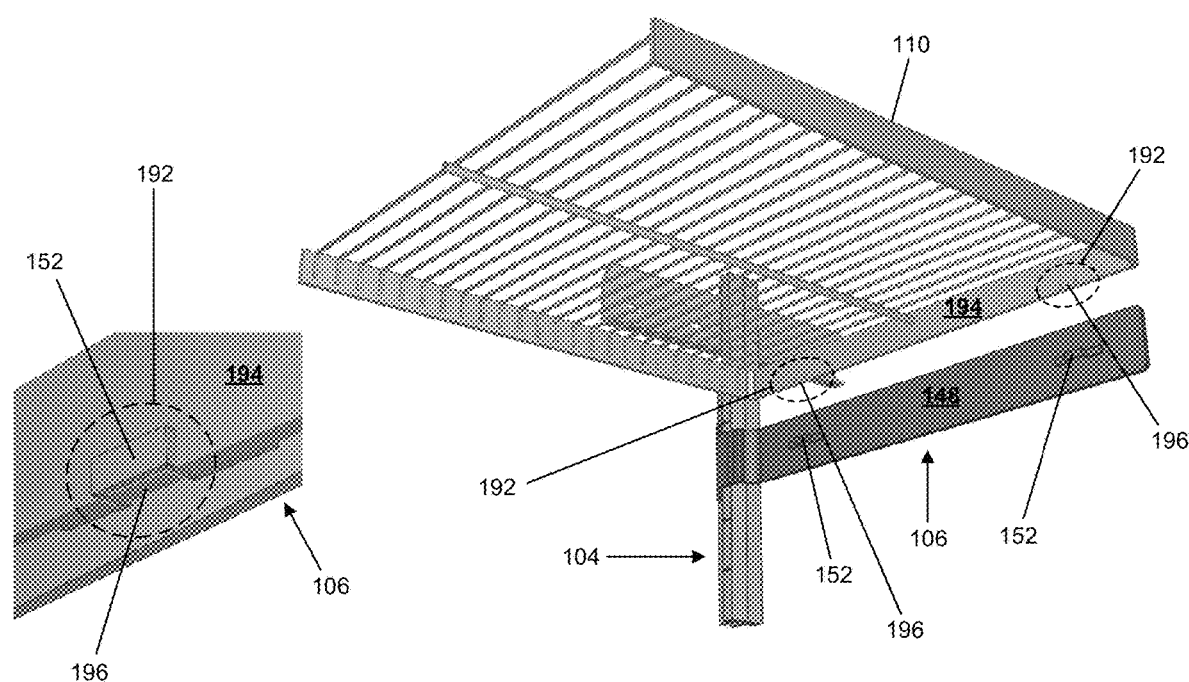
FIG. 20 and FIG. 21 illustrate shelf to shelf support bracket mounting features of the closet organization system of FIG. 1 and FIG. 2.

FIG. 20 and FIG. 21 illustrate shelf to shelf support mounting features of the closet organization system 100. The shelf support mounting features include two of the shelf support mounting features 152, which are attached to the support arm 148. The shelf support mounting features also include two pairs of mounting slots 192 in an end member 194 of the wire shelf 110. Each pair of mounting slots 192 forms a mounting tab 196 in the end member 194. Each pair of mounting slots 192 is positioned and configured to accommodate segments of the shelf support mounting features 152. Each mounting feature 152, in combination with the support arm 148, define a receptacle positioned and configured to accommodate one of the mounting tabs 196.

Figure 22:
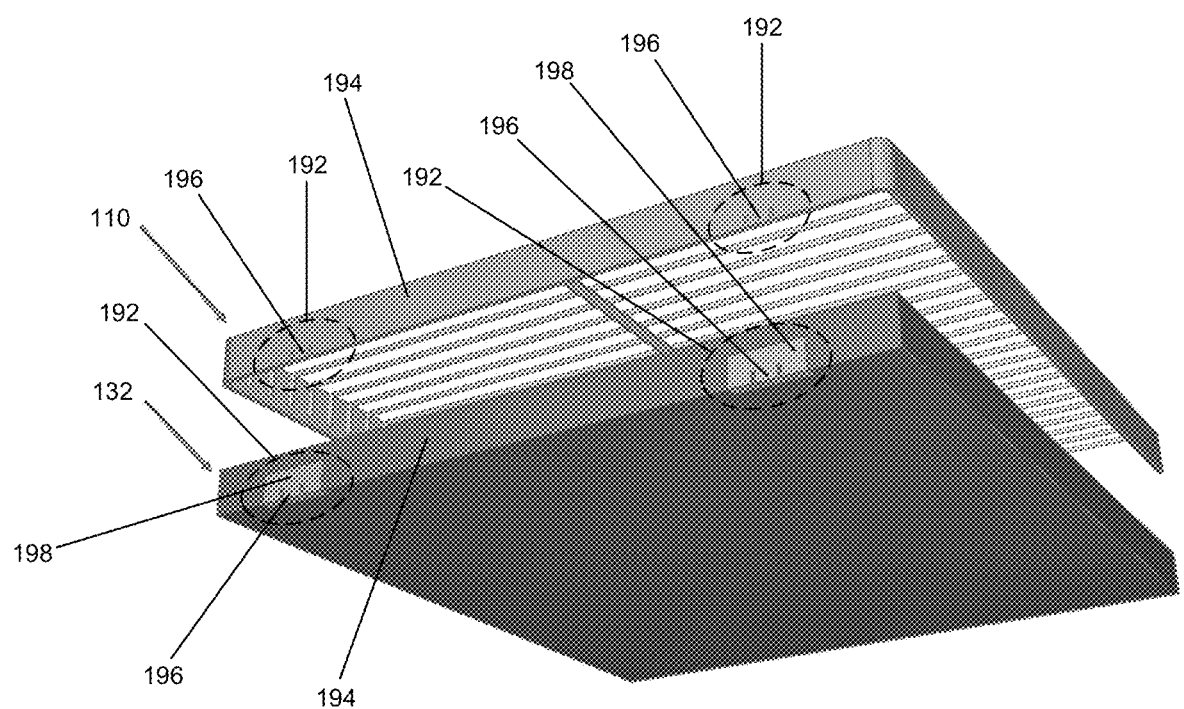
FIG. 22 illustrates a wire shelf and a wood shelf of the closet organization system of FIG. 1 and FIG. 2.

FIG. 22 illustrates an instance of the wire shelf 110 and an instance of the wood shelf 132 of the closet organization system 110. Similar to the wire shelf 110, the wood shelf 132 includes two pairs of mounting slots 192. In many embodiments, the end member 194 of the wire shelf 110 is made from a suitable metal panel, which has sufficient hardness and bearing strength so that the mounting slots 192 can be formed directly in the end member 194. In the illustrated embodiment, an end member 194 of the wood shelf 132 is made from a suitable wood species and/or construction, which may not have sufficient hardness and bearing strength so that the mounting slots 192 can be formed directly in the end member 194. Accordingly, in the illustrated embodiment, the wood shelf 132 includes inserts 198, which have sufficient hardness and bearing strength so that the mounting slots 192 can be formed in the inserts 198. In the illustrated embodiment, each of the inserts 198 has a rectangular perimeter and is accommodated with a complementarily-shaped cut-out in the end member 194. Each of the inserts 198 is secured to the end member 194 using any suitable approach (e.g., adhesive and/or fastening).

Figure 23:
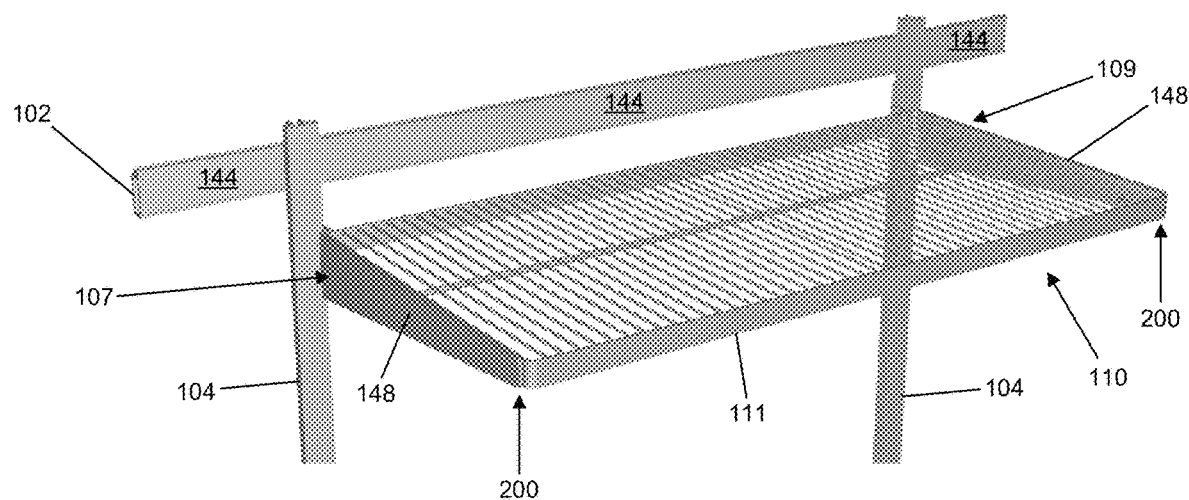
FIG. 23 illustrates a support track, support rails, asymmetrical shelf support brackets, and a wire shelf of the closet organization system of FIG. 1 and FIG. 2.

FIG. 23 illustrates an example assembly, of the closet organization system 100, that includes an instance of the support track 102, an instance of the track cover 144, two instances of the support rail 104, an instance of the left-side asymmetrical shelf support bracket 107, an instance of the right-side asymmetrical shelf support bracket 109, and an instance of the wire shelf 110. The support arm 148 of each of the left-side asymmetrical shelf support bracket 107 and the right-side asymmetrical shelf support bracket 109 is tapered down in height from the distal end of the support arm 148 adjacent to the support rail 104 to the proximal end 200 of the support arm 148 so that the proximal end 200 does not protrude below the edge member 111 of the wire shelf 110, thereby improving both esthetics and safety.

Figure 24:
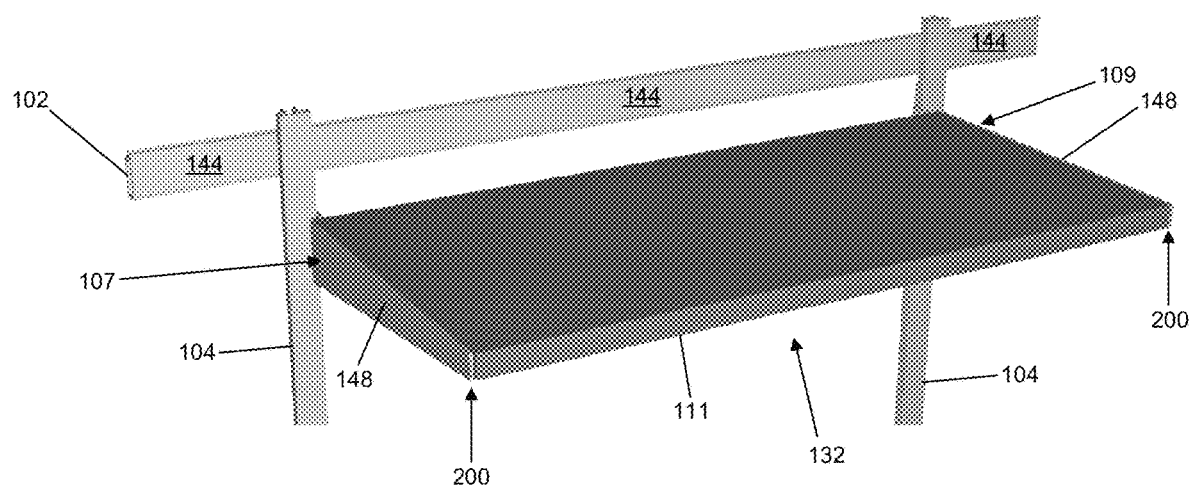
FIG. 24 illustrates a support track, support rails, asymmetrical shelf support brackets, and a wood shelf of the closet organization system of FIG. 1 and FIG. 2.

FIG. 24 illustrates an example assembly, of the closet organization system 100, that includes an instance of the support track 102, an instance of the track cover 144, two instances of the support rail 104, an instance of the left-side asymmetrical shelf support bracket 107, an instance of the right-side asymmetrical shelf support bracket 109, and an instance of the wood shelf 132. The support arm 148 of each of the left-side asymmetrical shelf support bracket 107 and the right-side asymmetrical shelf support bracket 109 is tapered down in height from the distal end of the support arm 148 adjacent to the support rail 104 to the proximal end 200 of the support arm 148 so that the proximal end 200 does not protrude below the edge 111 of the wood shelf 132.

Figure 25:
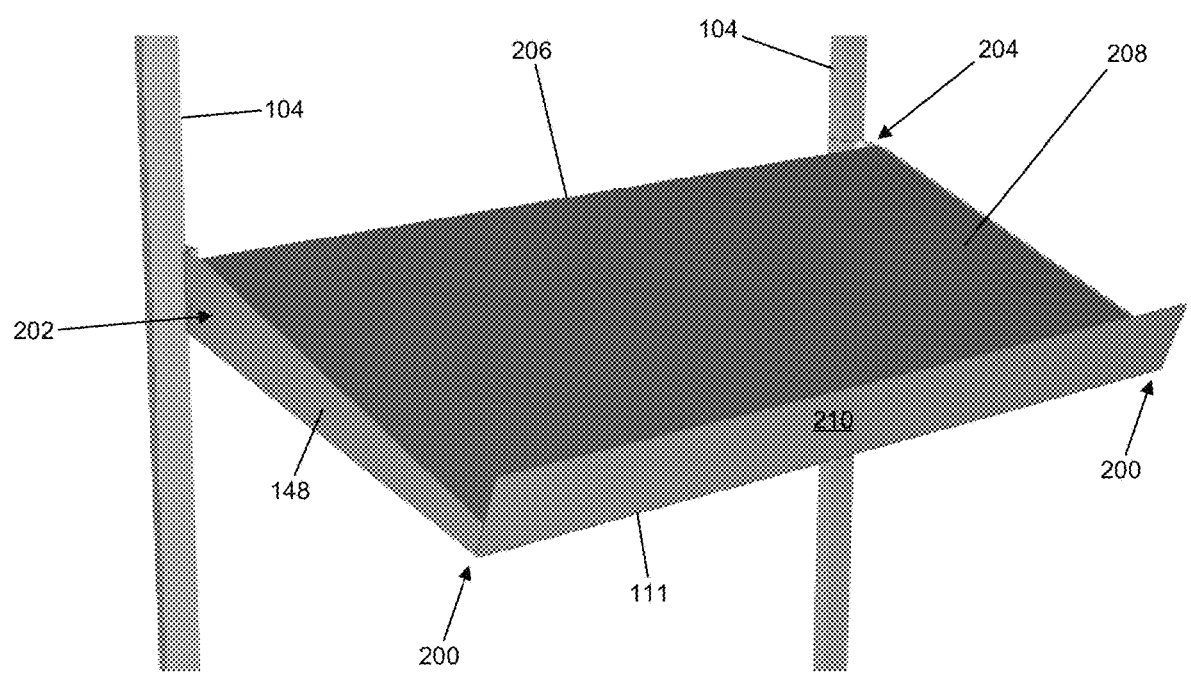
FIG. 25 illustrates support rails, sloped shelf support brackets, and an angled shoe rack of the closet organization system of FIG. 1 and FIG. 2.

FIG. 25 illustrates an example assembly, of the closet organization system 100, that includes two instances of the support rail 104, an instance of a sloped left-side asymmetrical shelf support bracket 202, an instance of a sloped right-side asymmetrical shelf support bracket 204, and an instance of a flat steel angled shoe rack 206. The support arm 148 of each of the sloped left-side asymmetrical shelf support bracket 202 and the sloped right-side asymmetrical shelf support bracket 204 is sloped downwardly and tapered down in height from the distal end of the support arm 148 adjacent to the support rail 104 to the proximal end 200 of the support arm 148 so that the proximal end 200 does not protrude below the edge member 111 of the flat steel angled shoe rack 206. The shoe rack 206 includes a flat steel top panel 208 and a proximal end panel 210 that extends above the top panel 208 by an amount suitable to block footwear from sliding off of the shoe rack 206. The angled wire shoe racks 130 shown in FIG. 1 can be mounted to the support rails 104 in the same manner as the flat steel angled shoe rack 206.

Figure 26:
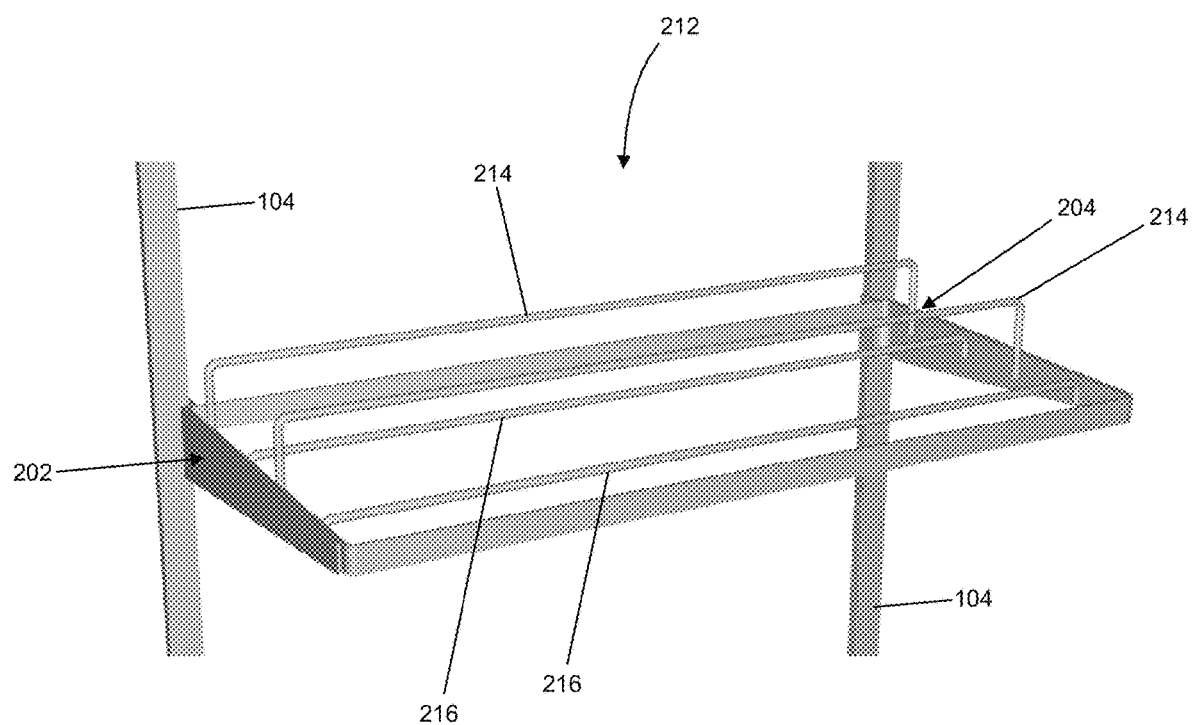
FIG. 26 illustrates support rails, shelf support brackets, and a high heal shoe rack of the closet organization system of FIG. 1 and FIG. 2.

FIG. 26 illustrates an example assembly, of the closet organization system 100, that includes two instances of the support rail 104, an instance of a sloped left-side asymmetrical shelf support bracket 202, an instance of a sloped right-side asymmetrical shelf support bracket 204, and an instance of a high-heeled shoe rack 212. The high-heeled shoe rack 212 includes high support rod members 214 and low support rod members 216 that extend the length of the high-heeled shoe rack 212. In use, high-heeled shoes can be placed in the shoe rack 212 facing upwards so that sole of the shoe adjacent to the high heel rests on one of the high support rod members 214, the sole of the shoe adjacent to the front of the shoe rests on one of the low support rod members 216, and the heel of the shoe is disposed aft of the high support rod member 214. The high-heel shoe rack 212 can be mounted to the support rails 104 in the same manner as the flat steel angled shoe rack 206 and the angled wire shoe racks 130 shown in FIG. 1.

Figure 27:
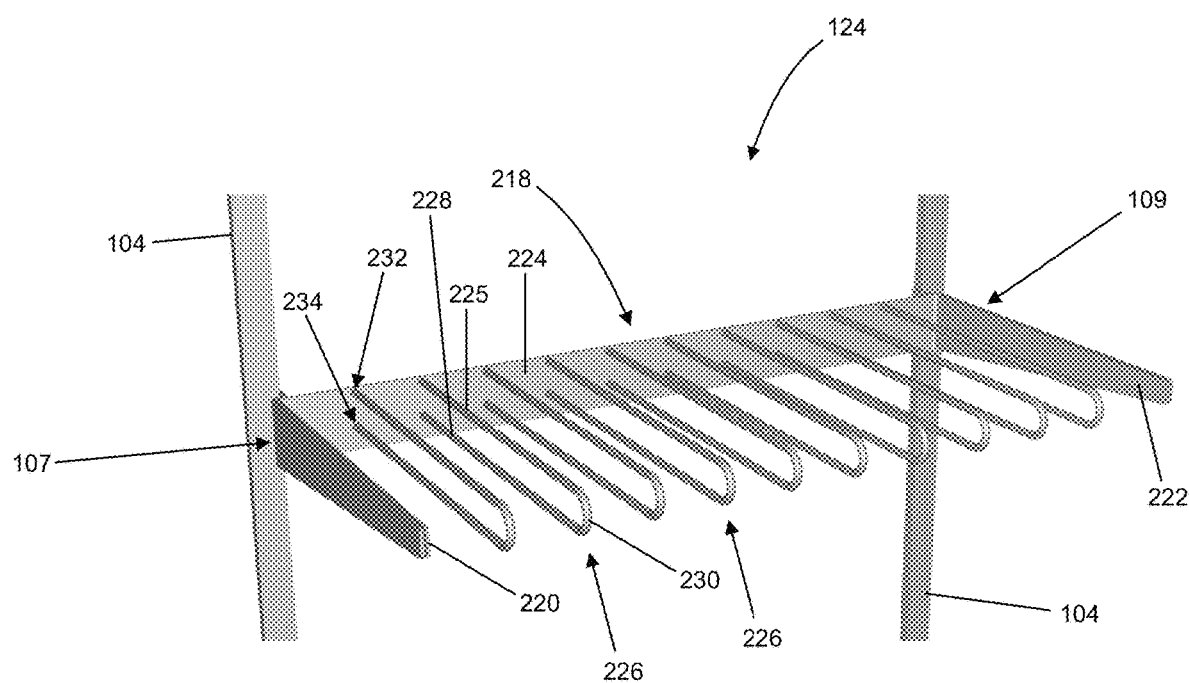
FIG. 27 illustrates support rails, shelf support brackets, and a pants rack of the closet organization system of FIG. 1 and FIG. 2.

FIG. 27 illustrates an example assembly, of the closet organization system 100, that includes two instances of the support rail 104, an instance of the left-side asymmetrical shelf support bracket 107, an instance of the right-side asymmetrical shelf support bracket 109, and an instance of a pants rack 124. The pants rack 124 includes a support frame 218 formed of a left-end panel 220, a right-end panel 222, and a back panel 224. The left-end panel 220 is attached to and extends forward of a left end of the back panel 224. The right-end panel 222 is attached to and extends forward of a right end of the back panel 224. The support frame 218 can be formed using any suitable approach (e.g., forming a metal flat pattern). The pants rack 124 further includes pant support rods 226. Each of the pant support rods 226 is attached to and cantilevered from the back panel 224. In the illustrated embodiment, each of the pant support rods 226 is formed from a rod to have an upper straight portion 225, a lower straight portion 228, a curved portion 230, and ends 232, 234. Each of the ends 232, 234 is fixed to the back panel 224 so that the straight portions 225, 228 extend horizontal forward of the back panel 224. Each upper straight portion 225 is offset above the corresponding lower straight portion 228 by a suitable distance to accommodate a suitable thickness of one or more pants draped over the lower straight portion 228. In many embodiments, each of the left-end panel 220 and the right-end panel 222 include two pairs of the mounting slots 192 (shown in FIG. 20) for mounting the pants rack 124 to the shelf support mounting features 152 of the shelf support brackets 107, 109.

Figure 28:
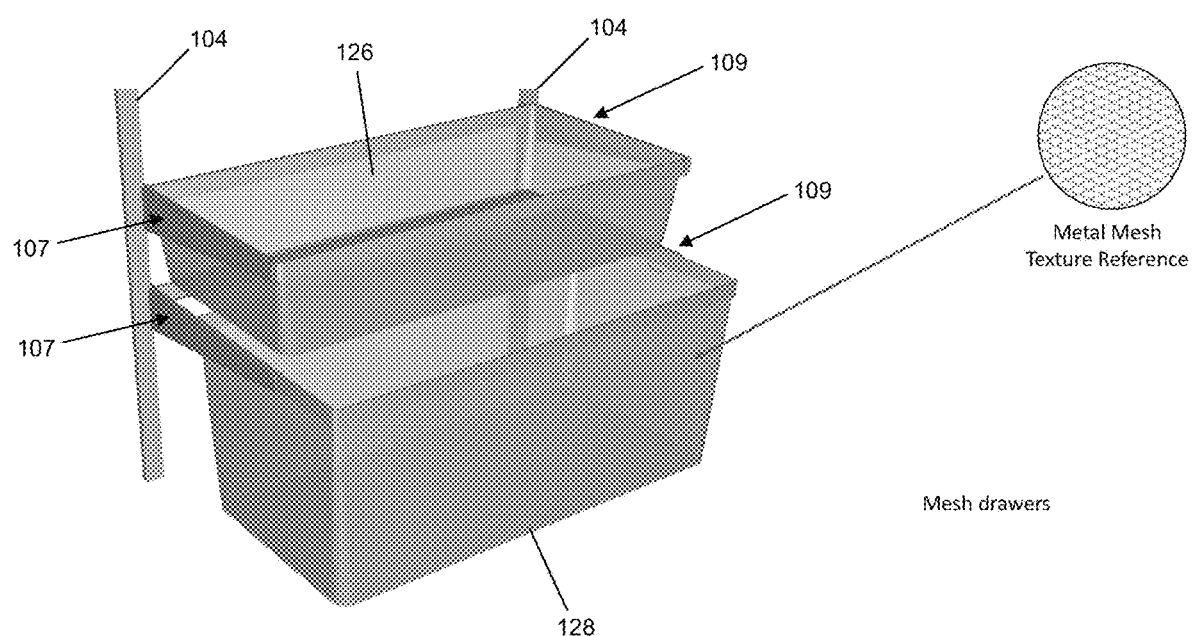
FIG. 28 illustrates support rails, shelf support brackets, and mesh drawers of the closet organization system of FIG. 1 and FIG. 2.
Figure 29:
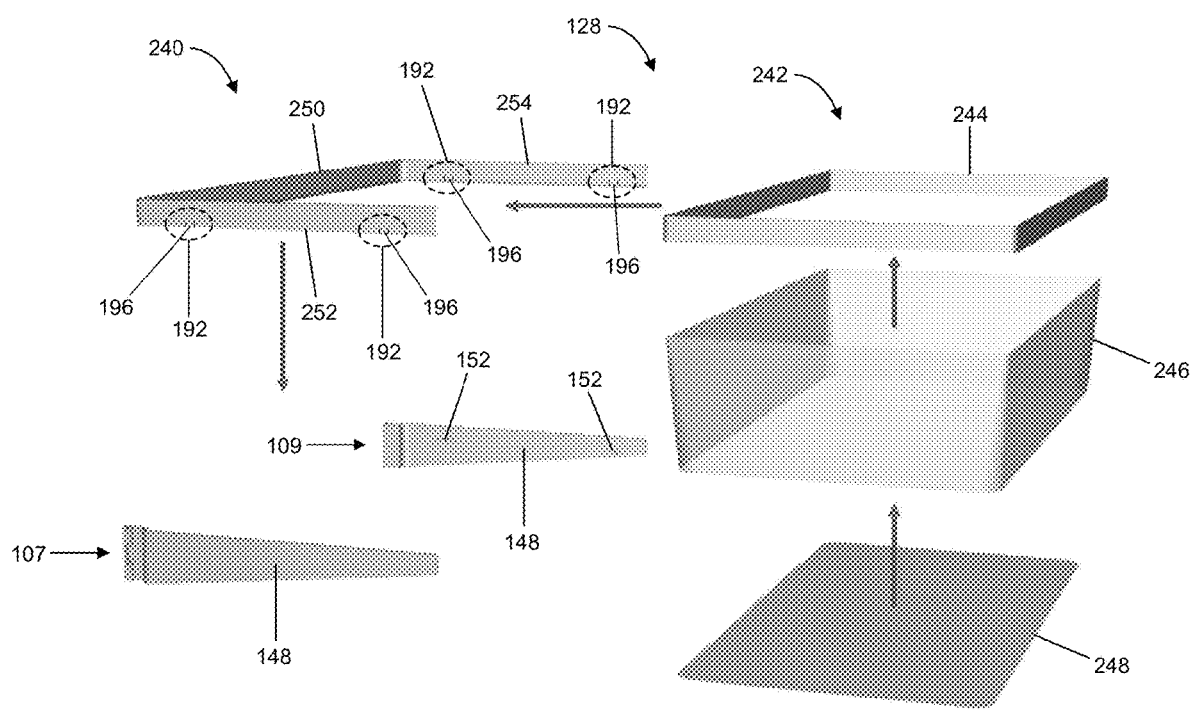
FIG. 29 is an exploded view illustration of the shelf support brackets and the mesh drawers of FIG. 28.

FIG. 28 illustrates an example assembly, of the closet organization system 100, that includes two instances of the support rail 104, two instances of the left-side asymmetrical shelf support bracket 107, two instances of the right-side asymmetrical shelf support bracket 109, and two instances of metal mesh drawer assemblies 126, 128. FIG. 29 shows an exploded view illustration of the metal mesh drawer assembly 128 and associated shelf support brackets 107, 109. The mesh drawer assembly 128 includes a drawer assembly mounting frame 240 and a drawer 242. The drawer 242 is formed of a drawer support frame 244, drawer mesh sidewalls 246, and a drawer bottom panel 248. The drawer mesh sidewalls 246 can be formed from a suitable metal mesh material flat pattern. A top perimeter portion of the sidewalls 246 is attached to the drawer support frame 244. The bottom panel 248 is attached to a bottom perimeter portion of the sidewalls 246. In many embodiments, the support frame 244 is slidably mounted to the drawer assembly mounting frame 240 via conventional draw slides, which are well known in the art. The drawer assembly mounting frame 240 includes a back member 250, a left-side member 252, and a right-side member 254. The left-side member 252 includes two pairs of the mounting slots 192. Each pair of mounting slots 192 in the left-side member 252 forms a mounting tab 196 in the left-side member 252. Likewise, the right-side member 254 includes two pairs of the mounting slots 192. Each pair of mounting slots 192 in the right-side member 254 forms a mounting tab 196 in the right-side member 254. Each pair of mounting slots 192 is positioned and configured to accommodate segments of the shelf support mounting features 152 of the shelf support brackets 107, 109. Each mounting feature 152, in combination with the support arm 148 of the respective shelf support bracket 107, 109, define a receptacle positioned and configured to accommodate one of the mounting tabs 196. Since the drawer 242 is slidably mounted to the mounting frame 240, which is mounted to the shelf support brackets 107, 109, the drawer 242 is slidable between an open and closed configuration relative to the wall. In many embodiments, except for dimensional differences, the mesh drawer assembly 126 is configured the same as the mesh drawer assembly 128.

Figure 30:
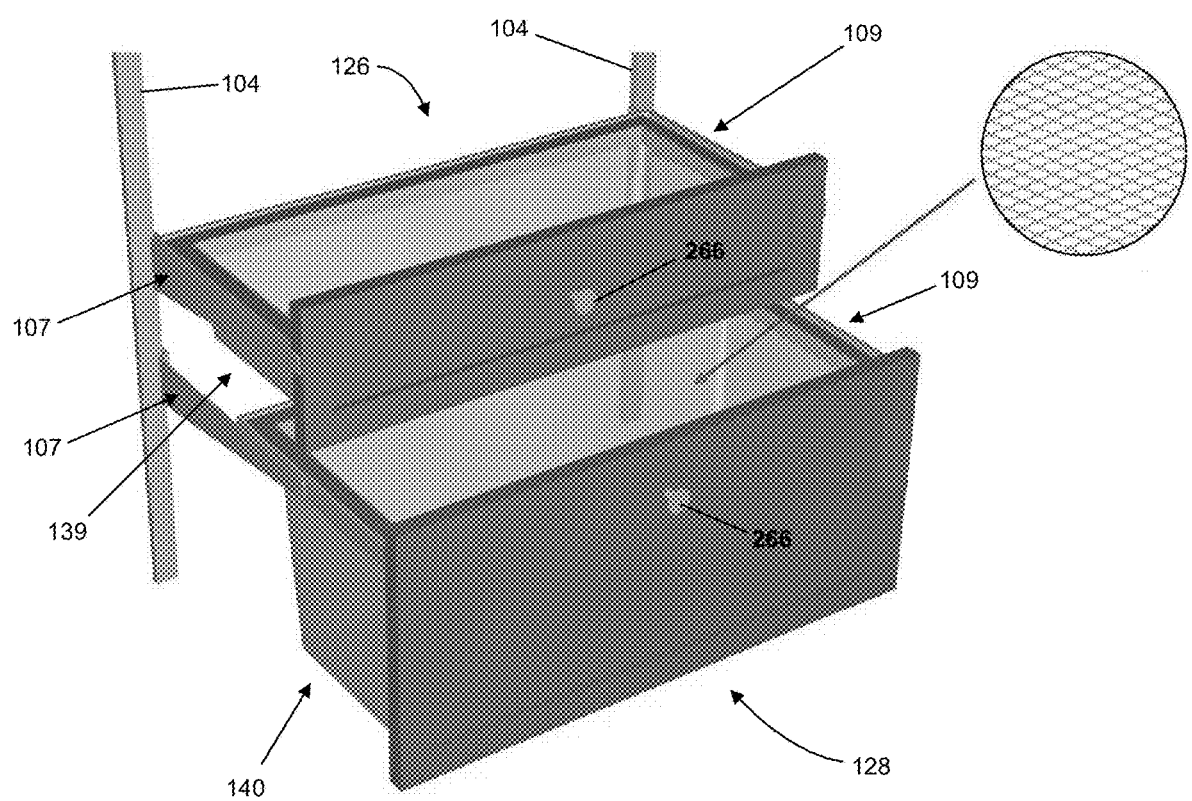
FIG. 30 illustrates support rails, shelf support brackets, and solid front panel mesh drawers of the closet organization system of FIG. 1 and FIG. 2.

FIG. 30 illustrates an example assembly, of the closet organization system 100, that includes two instances of the support rail 104, two instances of the left-side asymmetrical shelf support bracket 107, two instances of the right-side asymmetrical shelf support bracket 109, and instances of solid front panel metal mesh drawer assemblies 139, 140 (shown in FIG. 2). The solid front panel metal mesh drawer assemblies 139, 140 are configured similarly to the metal mesh drawer assemblies 126, 128. The solid front panel metal mesh drawer assemblies 139, 140 are mounted to the shelf support brackets 107, 109 in the same manner as the drawer assemblies 126, 128 are mounted to the shelf support brackets 107, 109.

Figure 31:
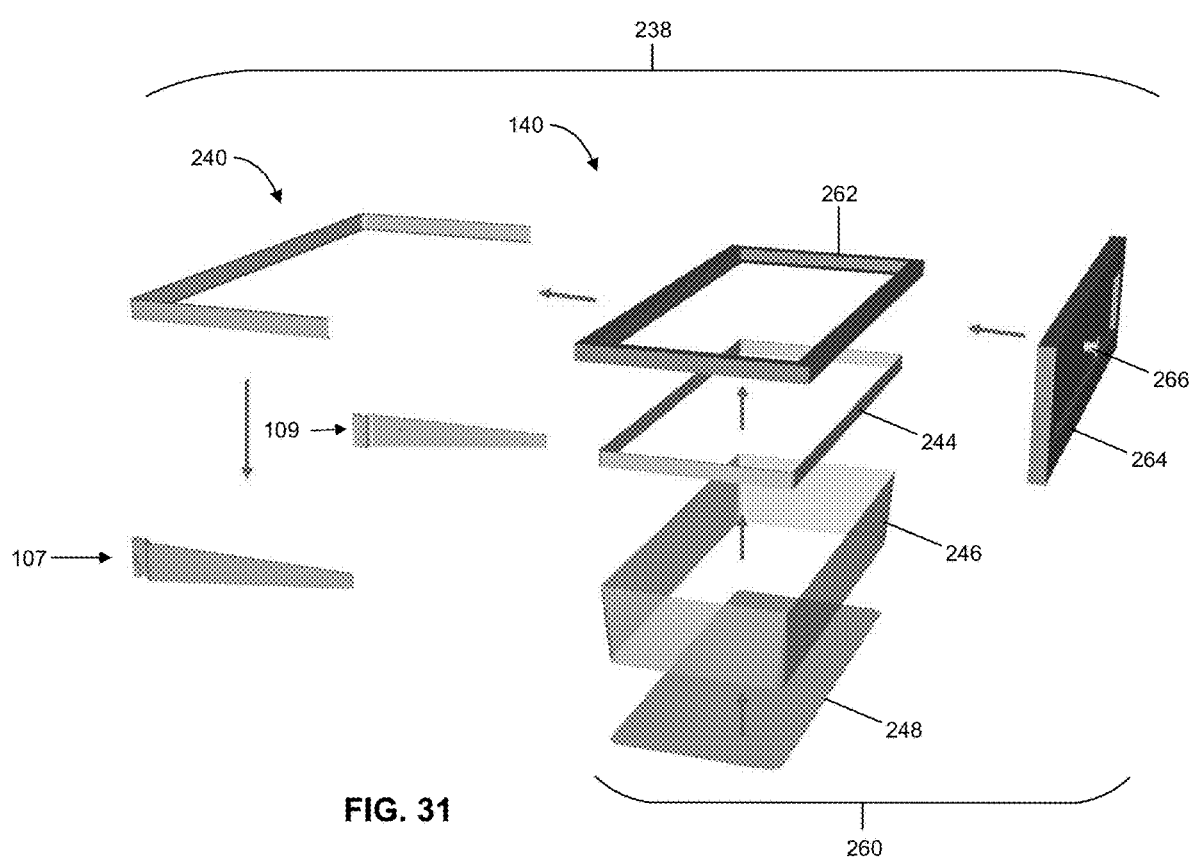
FIG. 31 is an exploded view illustration of the shelf support brackets and the solid front panel mesh drawers of FIG. 30.

FIG. 31 shows an exploded view illustration of the drawer assembly 140 and associated shelf support brackets 107, 109. The mesh drawer assembly 238 includes the drawer assembly mounting frame 240 and a drawer 260. The drawer 260 is formed of the drawer support frame 244, the drawer mesh sidewalls 246, and the drawer bottom panel 248. The drawer 260 further includes a wood top perimeter frame 262 and a wood front panel 264. The wood top perimeter frame 262 and the wood front panel 264 enhance the appearance of the drawer assemblies 139, 140, increase the stiffness of the drawer 260 relative to the drawer 242 shown in FIG. 29, and can include one or more drawer pulls 266, which may enhance the ease by which a person can open and close the drawer 260. In many embodiments, except for dimensional differences, the drawer assembly 139 is configured the same as the drawer assembly 140.

Figure 32:
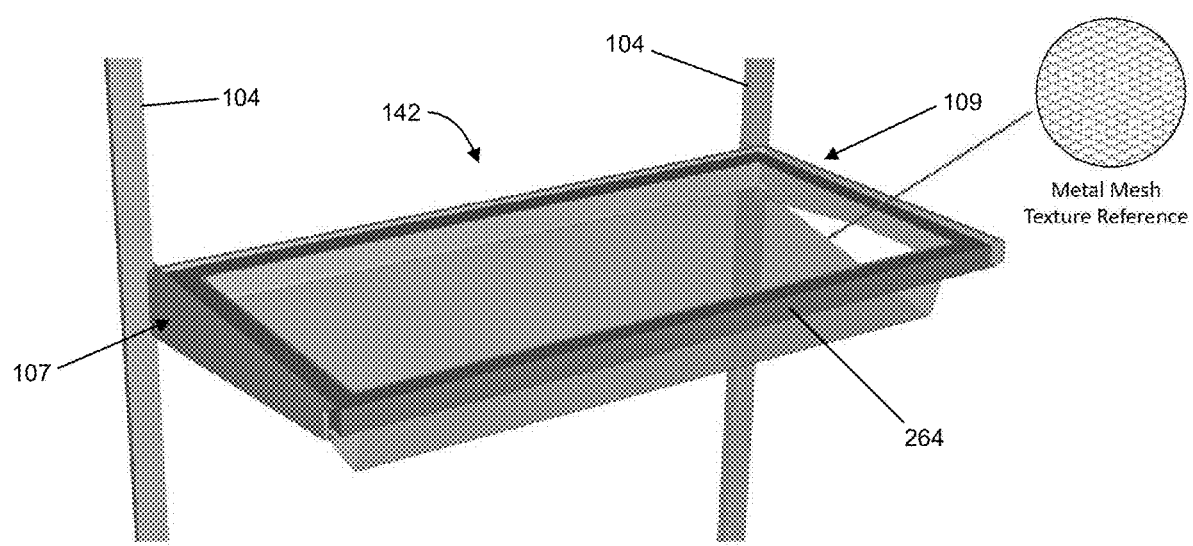
FIG. 32 illustrates support rails, shelf support brackets, and a mesh shoe rack drawer of the closet organization system of FIG. 1 and FIG. 2.

FIG. 32 illustrates an example assembly, of the closet organization system 100, that includes two instances of the support rail 104, one instance of the left-side asymmetrical shelf support bracket 107, one instance of the right-side asymmetrical shelf support bracket 109, and an instance of a mesh shoe rack drawer assembly 142. The shoe rack drawer assembly 142 is configured similar to the drawer assemblies 126, 128, 139, 140 with respect to including the mounting assembly 240 (shown, for example, in FIGS. 29 & 31) and a shoe rack drawer 264 that is slidably mounted to the mounting assembly 240 via conventional drawer slides. In the illustrated embodiment, the shoe rack drawer 264 has metal mesh sidewalls and a sloped metal mesh bottom panel.

Figure 33:
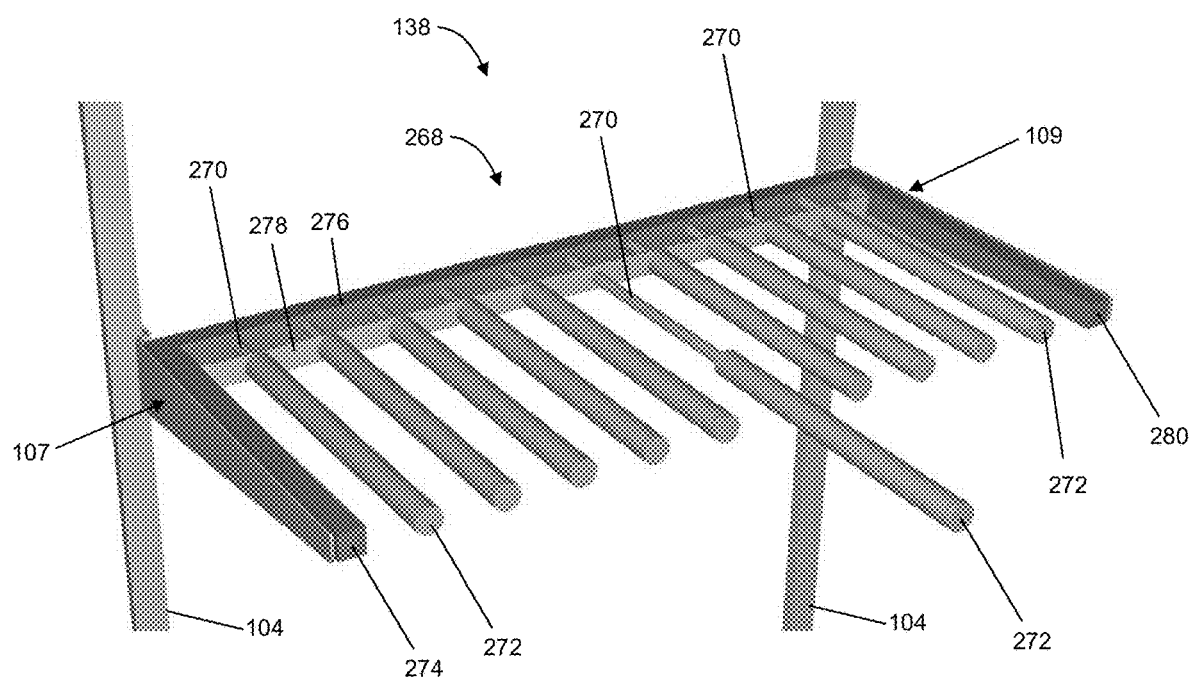
FIG. 33 illustrates support rails, shelf support brackets, and a pant rack drawer of the closet organization system of FIG. 1 and FIG. 2.

FIG. 33 illustrates an example assembly, of the closet organization system 100, that includes two instances of the support rail 104, an instance of the left-side asymmetrical shelf support bracket 107, an instance of the right-side asymmetrical shelf support bracket 109, and an instance of a pant rack drawer assembly 138. The pant rack drawer assembly 138 includes a support frame 268, support rods 270, and pant support members 272. Each of the pant support members 272 includes a central lumen shaped to accommodate and interface with one of the support rods 270 so that the pant support member 272 is selectively slidable along the support rod 270 between a stowed configuration and an extended configuration. Nine of the pant support members 272 are shown in the stowed configuration in FIG. 33. One of the pant support members 272 is shown in the extended configuration in FIG. 33. In some embodiments, each of the pant support members 272 is coupled with the corresponding support rod 270 so as to prevent rotation of the pant support member 272 around the support rod 270. For example, the interface between the pant support member 272 and the support rod 270 can have a cross-sectional shape that is at least partially non-circular to prevent rotation of the pant support member 272 around the support rod 270. The support frame 268 includes a left-side support member 274, a back-side support member 276, a supplemental rod support member 278, and a right-side support member 280. The left-side support member 274 is attached to and extends forward of a left end of the back-side support member 276. The right-side support member 280 is attached to and extends forward of a right end of the back-side support member 276. The supplemental rod support member 278 is attached to and extends between the left-side support member 274 and the right-side support member 280. The supplemental rod support member 278 is offset from the back-side support member 276 by a suitable distance so the moment generated via weight supported by each of the pant support members 272 is reacted by an suitable download applied to the support member 278 by the support rod 270 and a suitable upload applied to the back-side support member 276 by the support rod 270. The left-side support member 274 includes two pairs of the mounting slots 192 (examples of which are shown in FIG. 22). Each pair of mounting slots 192 in the left-side support member 274 forms a mounting tab 196 (examples of which are shown in FIG. 22) in the left-side support member 274. Likewise, the right-side support member 280 includes two pairs of the mounting slots 192. Each pair of mounting slots 192 in the right-side support member 280 forms a mounting tab 196 in the right-side support member 280. Each pair of mounting slots 192 is positioned and configured to accommodate segments of the shelf support mounting features 152 (examples of which are shown in FIG. 14) of the shelf support brackets 107, 109. Each mounting feature 152, in combination with the support arm 148 of the respective shelf support bracket 107, 109, define a receptacle positioned and configured to accommodate one of the mounting tabs 196.

Figure 34:
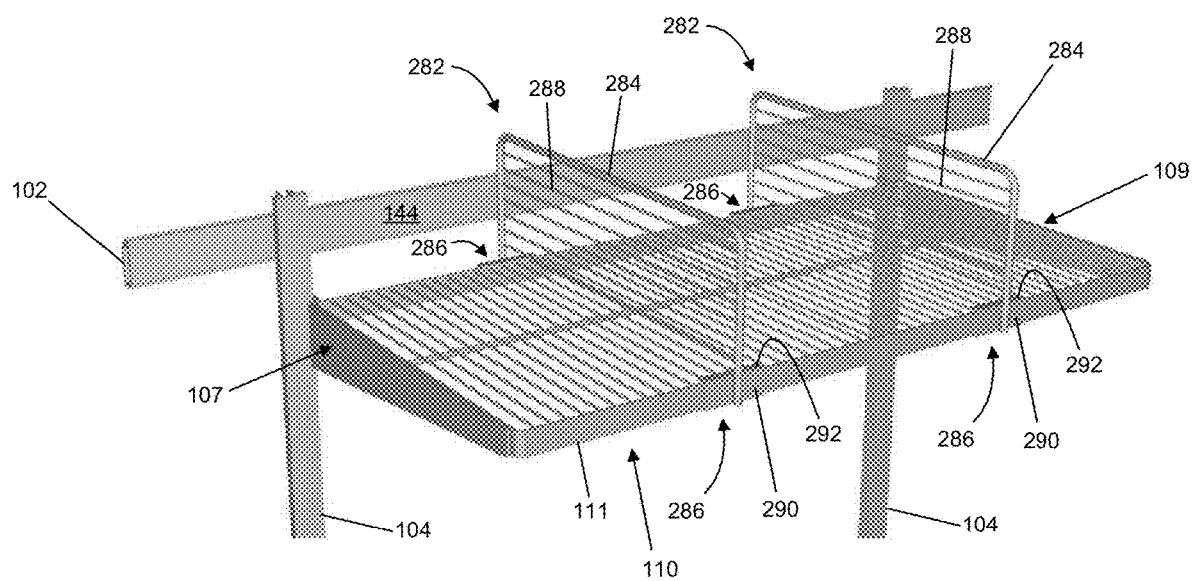
FIG. 34 illustrates a support track, support rails, shelf support brackets, a wire shelf, and wire shelf dividers of the closet organization system of FIG. 1 and FIG. 2.

FIG. 34 illustrates an example assembly, of the closet organization system 100, that includes an instance of the example assembly shown in FIG. 23 and two instances of wire shelf dividers 282. Each of the dividers 282 includes a perimeter frame member 284, interface brackets 286, and cross members 288. One of the interface brackets 286 is attached to an aft end portion of the perimeter frame member 284. The other of the interface brackets 286 is attached to a forward end portion of the perimeter frame member 284. Each of the cross members 288 is attached to and extends between aft and forward vertical portions of the perimeter frame member 284. Each of the interface brackets 286 is configured to interface with one of forward and aft edge members 111 of the wire shelf 110 so as to secure the divider to the wire shelf 110 in a selected location along the wire shelf 110. In the illustrated embodiment, each of the interface brackets 286 includes a vertical panel 290 and a top flange 292. The vertical panel 290 is configured to interface with a side surface of the edge member 111 of the wire shelf 110. The top flange 292 is configured to interface with a top surface of the edge member 111 of the wire shelf 110. In some embodiments, the interface brackets 286 are configured to be selectively mounted to the wire shelf 110 so as to restrain the corresponding end of the perimeter frame member in a selected position and orientation relative to the wire shelf 110, thereby allowing selective repositioning of the divider 282 along the wire shelf 110.

Figure 35:
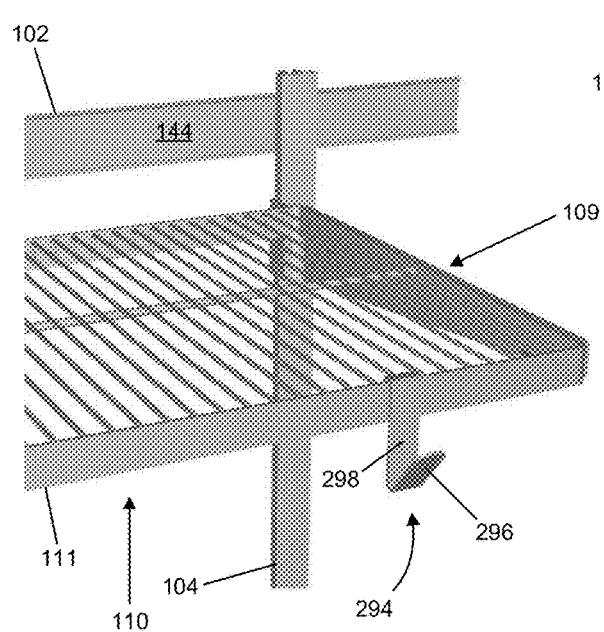
FIG. 35 and FIG. 36 illustrate a utility hook for a wire shelf of the closet organization system of FIG. 1 and FIG. 2.
Figure 36:
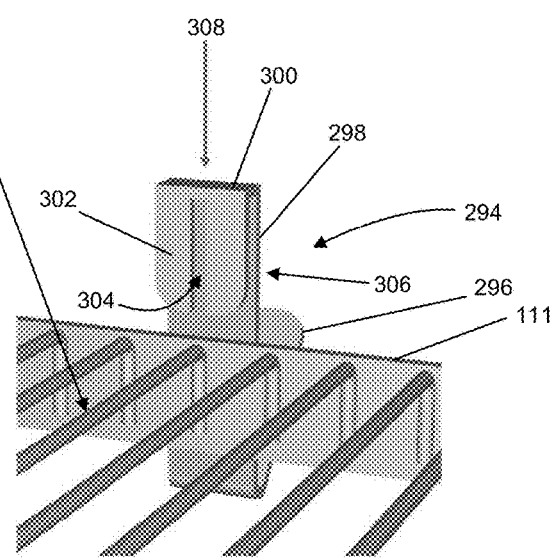

FIG. 35 and FIG. 36 illustrate an example assembly, of the closet organization system 100, that includes an instance of the example assembly shown in FIG. 23 and an instance of a wire shelf utility hook 294. The wire shelf utility hook 294 includes a forward flange 296, a shank panel 298, a top panel 300, and a back flange 302. The back flange 302 includes a wire slot 304. The top panel 300 extends aft of the top of the shank panel 298. The back flange 302 extends down from an aft end of the top panel 300. The back flange 302 is offset aft of the shank flange 298 by a suitable distance so as to form a mounting slot 306 disposed between the shank flange 298 and the back flange 302. The mounting slot 306 is sized to accommodate the edge member 111 of the wire shelf 110. The utility hook 294 is detachably mountable to the wire shelf 110 via downward movement of the utility hook 294 (in direction 308 shown in FIG. 36) so that the edge member 111 of the wire shelf 110 is received into the mounting slot 306 and one of the cross wires 112 of the wire shelf 110 is received into the wire slot 304.

Figure 37:
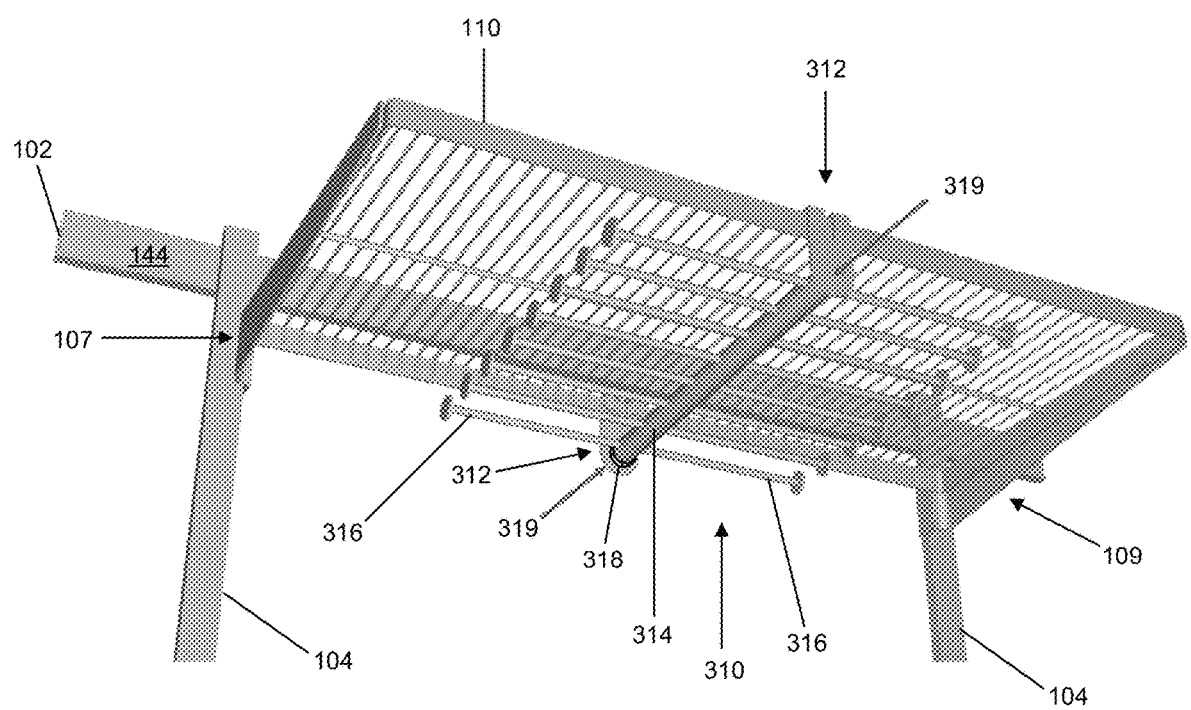
FIG. 37 illustrates a tie/belt rack for a wire shelf of the closet organization system of FIG. 1 and FIG. 2.

FIG. 37 illustrates an example assembly, of the closet organization system 100, that includes an instance of the example assembly shown in FIG. 23 and an instance of a shelf mounted tie/belt rack 310. The tie/belt rack 310 includes end support fittings 312, a center support member 314, and tie/belt support members 316. Each of the tie/belt support members 316 is fixedly attached to, and extends from, the center support member 314. The center support member 314 is suspended from the wire shelf 110 by the end support fittings 312. The center support member 314 can be attached to the end support fittings 312 in any suitable manner. For example, the end support fitting 312 can include any suitable support feature configured to interface with an end of the center support member 314. For example, in the illustrated embodiment, each of the end support fittings 312 includes a support feature 318 that has a cylindrical receptacle sized to receive and interface with an end portion of the center support member 314. The center support member 314 can be secured to the end support fittings 312 to prevent disengagement of the center support member 314 from the end support fittings 312 in any suitable manner. For example, in the illustrated embodiment, the center support member 314 is secured to each of the end support fittings 312 via a single fastener 319. In the illustrated embodiment, each of the end support fittings 312 is configured similar to the wire shelf utility hook 294 (shown in FIG. 36) with respect to including a wire slot 304 and a mounting slot 306 (shown in FIG. 36), and is detachably mountable to the wire shelf 110 in the same manner as with the wire shelf utility hook 294. The end support fittings 312 can, however, be configured for use in mounting the tie/belt rack 310 from any other suitable shelf configuration, including, for example, the wood shelf 130 (shown in FIG. 24).

Figure 38:
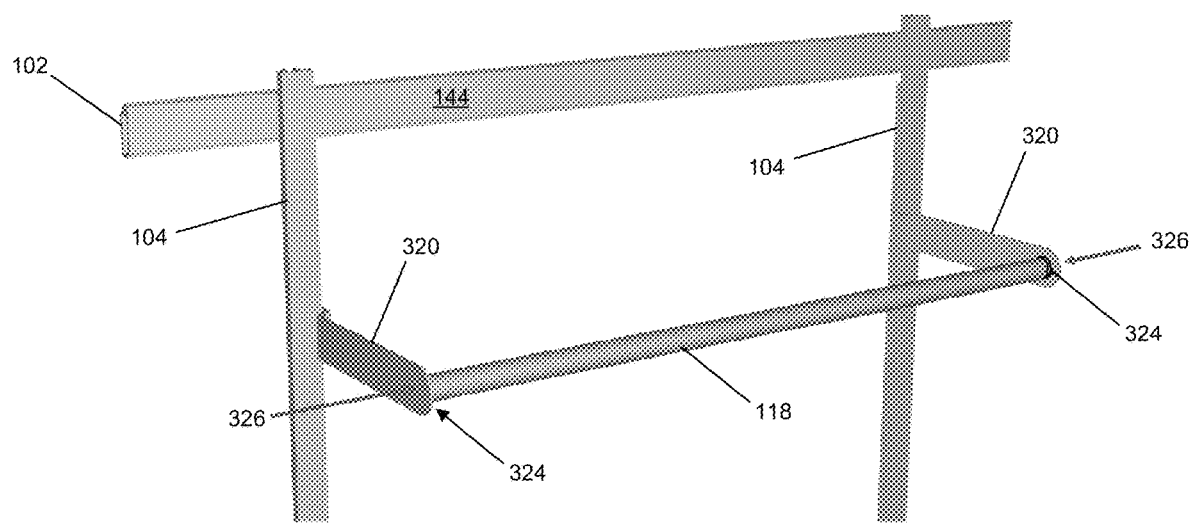
FIG. 38 illustrates a support track, support rails, closet rod support brackets, and a closet rod of the closet organization system of FIG. 1 and FIG. 2.

FIG. 38 illustrates an example assembly, of the closet organization system 100, that includes an instance of the support track 102, an instance of the track cover 144, two instances of the support rail 104, two instances of symmetrical closet rod support brackets 320, and a closet rod 118. Each of the closet rod support brackets 320 includes the shelf support bracket aft portion 146 (shown in FIG. 15), thereby enabling the use of a single configuration of the support bracket 320 to support each end of the closet rod 118. The support bracket 320 can include any suitable support feature configured to interface with an end of the closet rod 118. For example, in the illustrated embodiment, each of the support brackets 320 includes a support feature 324 that has a cylindrical receptacle sized to receive and interface with an end portion of the closet rod 118. The closet rod 118 can be secured to the support brackets 320 to prevent disengagement of the closet rod 118 from the support feature 324 in any suitable manner. For example, in the illustrated embodiment, the closet rod 118 is attached to each of the support brackets 320 via a single fastener 326.

Figure 39:
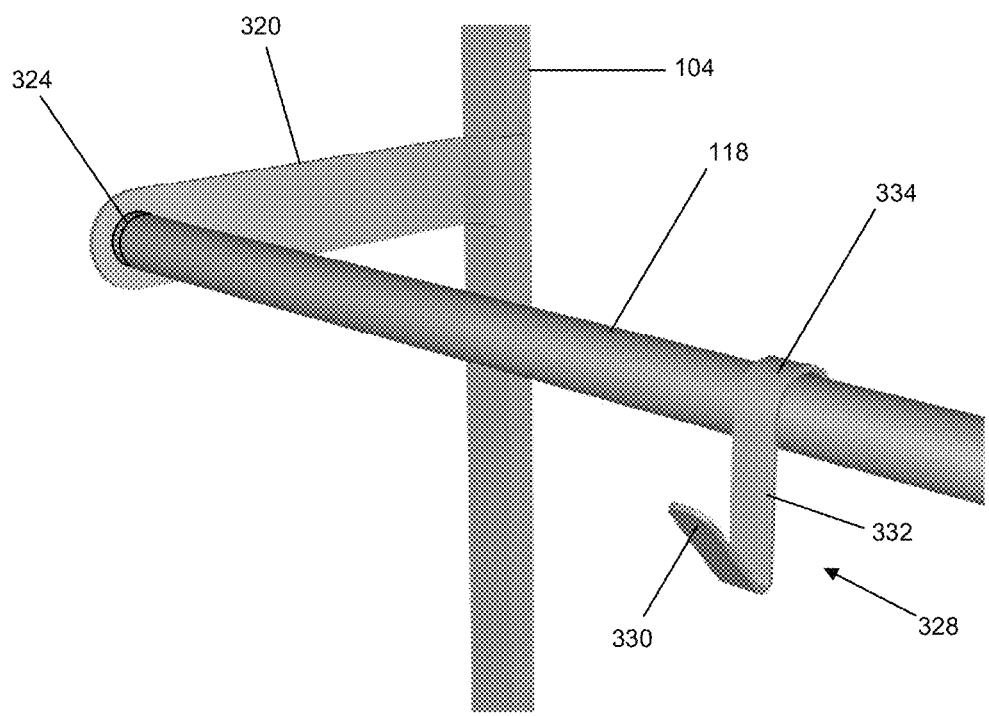
FIG. 39 illustrates a utility hook for the closet rod of FIG. 38.

FIG. 39 illustrates an example assembly, of the closet organization system 100, that includes an instance of the example assembly shown in FIG. 38 and an instance of a closet rod utility hook 328. The closet rod utility hook 328 includes a forward flange 330, a shank 332, and a closet rod flange 334. The closet rod flange 334 is curved and shaped to interface with a top surface of the closet rod 118 to suspend the utility hook 328 from the closet rod 118.

Figure 40:
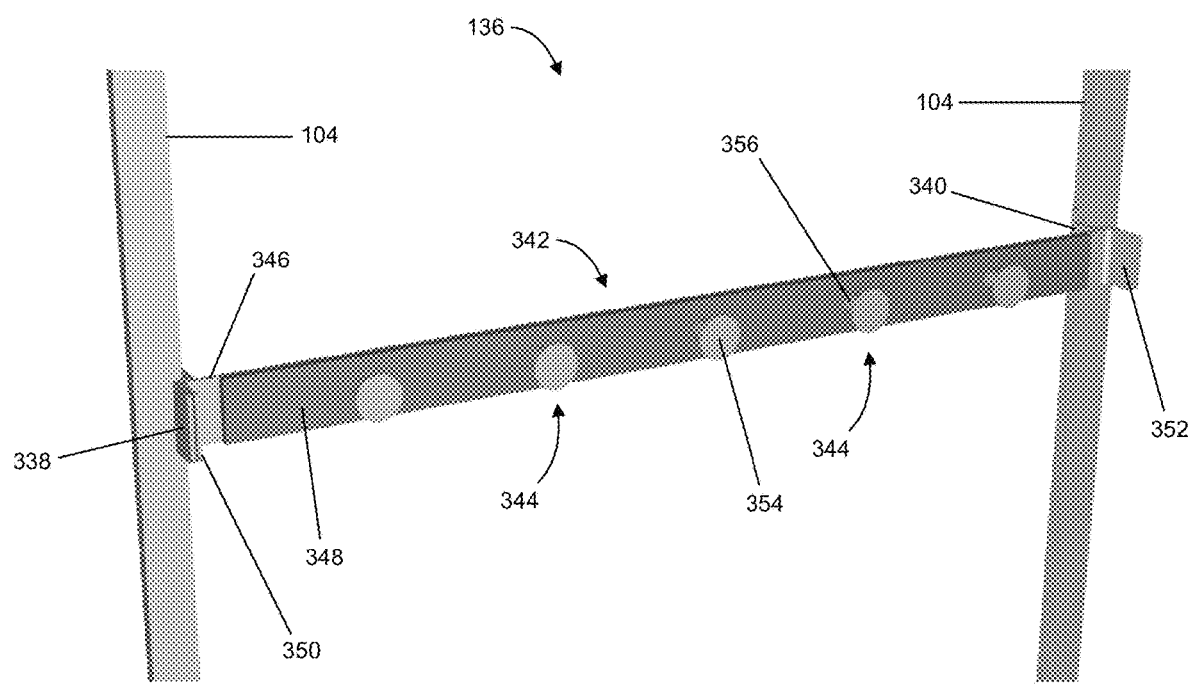
FIG. 40 illustrates support rails, hook rack support brackets, and a hook rack of the closet organization system of FIG. 1 and FIG. 2.

FIG. 40 illustrates an example assembly, of the closet organization system 100, that includes two instances of the support rail 104 and a hook rack 136. The hook rack 136 includes a left-side support bracket 338, a right-side support bracket 340, a support frame 342, and hooks 344. The support frame 342 includes a back-side panel 346, a decorative panel 348, a left-side panel 350, and a right-side panel 352. The hooks 344 are attached to and extend forward from the back-side panel 346. The hooks 344 can have any suitable configuration. In the illustrated embodiment, each of the hooks 344 includes a circular cap panel 354 and a support rod 356. The cap panel 354 is attached to the front end of the support rod 356. The aft end of the support rod 356 is attached to the back-side panel 346. In the illustrated embodiment, the decorative panel 348 covers substantially all of the back-side panel 346 but for apertures through which the support rods 356 extend and short end portions of the back-side panel 346. In many embodiments, the left-side panel 350 is fixedly attached to the left-side support bracket 338 and the right-side panel 352 is fixedly attached to the right-side support bracket 340. Each of the support brackets 338, 340 includes the shelf support bracket aft portion 146 (shown in FIG. 15) for attachment of the support brackets 338, 340 to the respective support rail 104.

Figure 41:
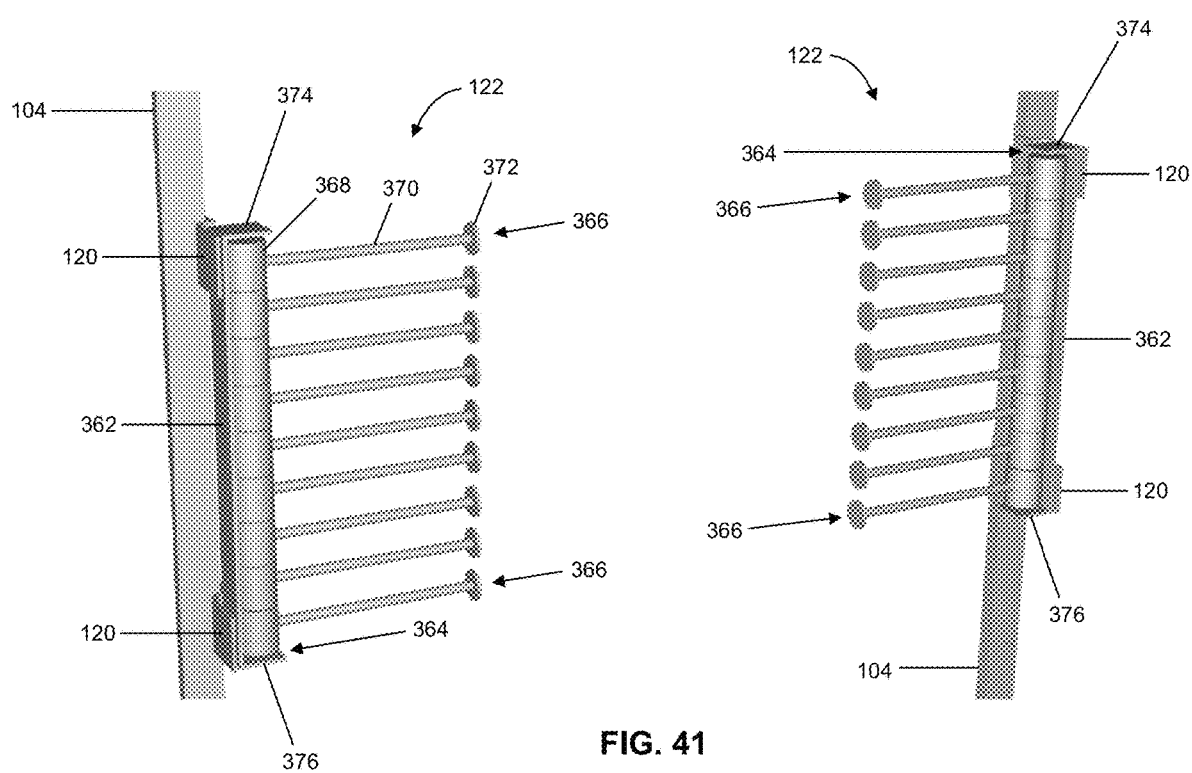
FIG. 41 illustrates support rails, pivoting tie/belt rack support brackets, and pivoting tie/belt racks of the closet organization system of FIG. 1 and FIG. 2.

FIG. 41 illustrates an example assembly, of the closet organization system 100, that includes two instances of the support rail 104 and two instance of a pivoting tie/belt rack 122. Each of the pivoting tie/belt racks 122 includes two support brackets 120, a support frame 362, a pivot shaft 364, and pivoting tie/belt rack assemblies 366. Each of the rack assemblies 366 is pivotally mounted to the pivot shaft 364 for selective rotation around the pivot shaft 364. The pivot shaft 364 is attached to and extends between end caps 374, 376 of the support frame 362. Each of the rack assemblies 366 includes a hub 368, a tie/belt support rod 370, and an end cap 372. In many embodiments, the support frame 362 is fixedly attached to each of the two support brackets 120. Each of the support brackets 120 can include the shelf support bracket aft portion 146 (shown in FIG. 15) for attachment of the support brackets 120 to the support rail 104.

Figure 42:
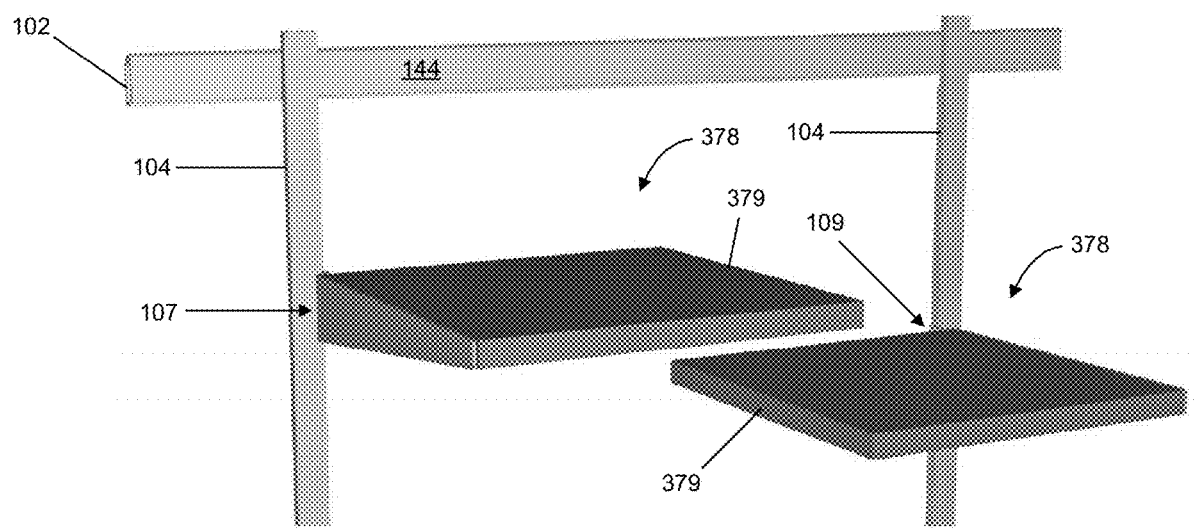
FIG. 42 illustrates a support track, support rails, cantilevered shoe rack support brackets, and cantilevered shoe racks of the closet organization system of FIG. 1 and FIG. 2.

FIG. 42 illustrates an example assembly, of the closet organization system 100, that includes an instance of the support track 102, an instance of the track cover 144, an instance of the left-side asymmetrical shelf support bracket 107, an instance of the right-side asymmetrical shelf support bracket 109, and two instances of cantilevered shelves 378. Each of the shelves 378 is configured similar to the wood shelf 130 (shown in FIG. 24), but is attached to only one of the shelf support brackets 107, 109. To avoid detachment of the shelves 378 or drooping of the distal end 379 of each cantilevered shelf 378, the brackets 107, 109 and/or the shelves 378 can be deployed with a suitable reinforcement structure (e.g., support bars, support tubes, or support plates) that extends into or under the shelves 378 and is rigidly connected to one of the brackets 107 or 109 (e.g., integrally formed with or welded to, or through alternative means of rigid attachment to the respective bracket 107 or 109). The reinforcement structure can extend from its respective bracket 107 or 109 in a direction toward the distal end 379 of the respective shelf 378. In some embodiments, the reinforcement structure can extend 75% to 99% of the distance from the respective bracket 107 or 109 to the distal end 379 of the shelf 378. In some embodiments, the reinforcement structure and shelves 378 can be configured so that the reinforcing structure is not visible below the shelf 378 and/or is not visible when the shelf is viewed by a person from a position at eye-level with the shelf 378. This can be accomplished, for example, by accommodating the reinforcement structure in a recess or other cavity that extends from one side of the shelf 378 toward the distal end 379 or that extends along the bottom of the shelf 378 toward the distal end 379 but is not visible to a person viewing the front edge of the shelf 378 from a position at eye level with the shelf 378).

Alternate Support Tracks, Support Rails, and Shelf Support Brackets

Figure 43:
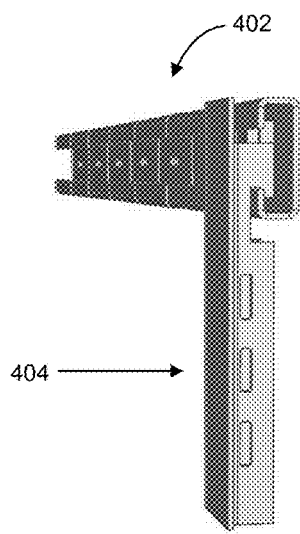
FIG. 43, FIG. 44, and FIG. 46 illustrate alternate embodiments of a support track and a support rail that can be employed in an alternate embodiment of the closet organization system of FIG. 1 and FIG. 2.
Figure 44:
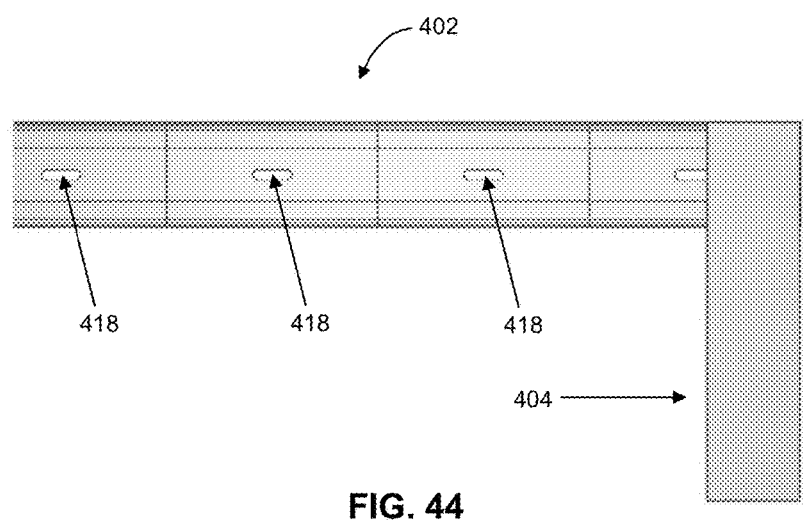
Figures 45, 46:
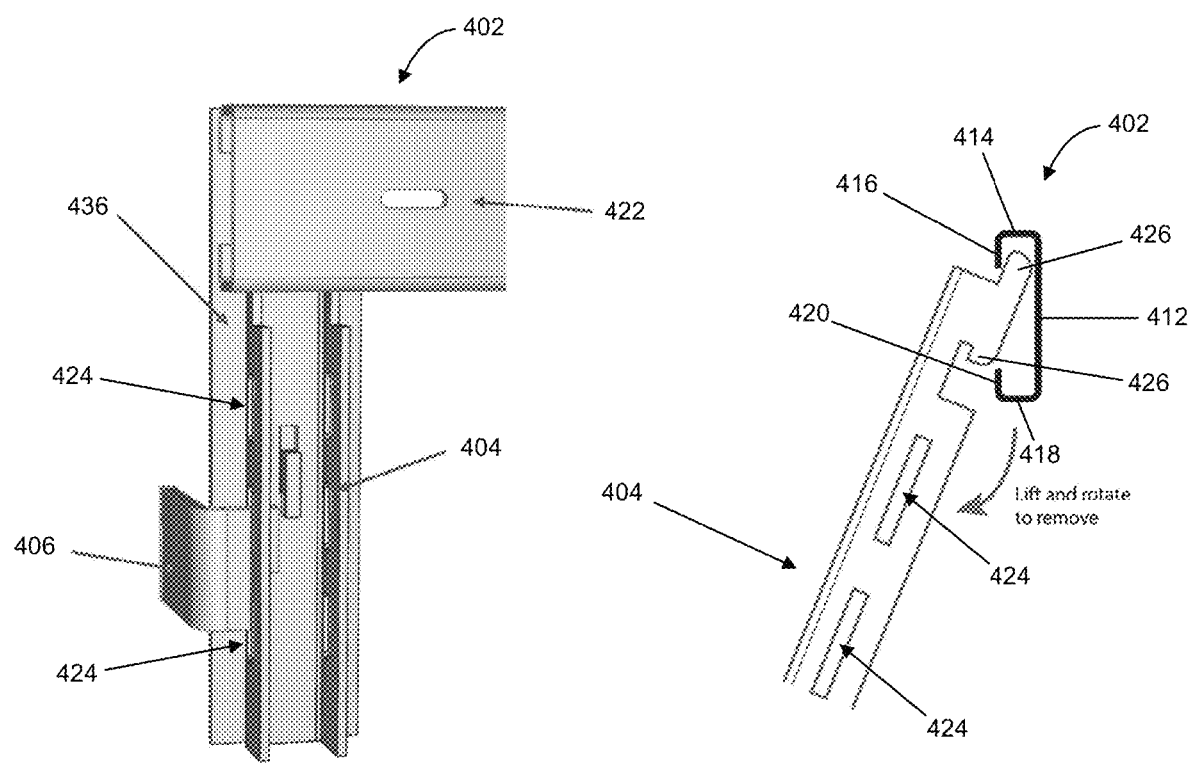
FIG. 45 and FIG. 47 illustrate the support track and the support rail of FIG. 43, FIG. 44, and FIG. 46 along with a rail cover and an aft portion of a shelf support bracket.
Figure 47:
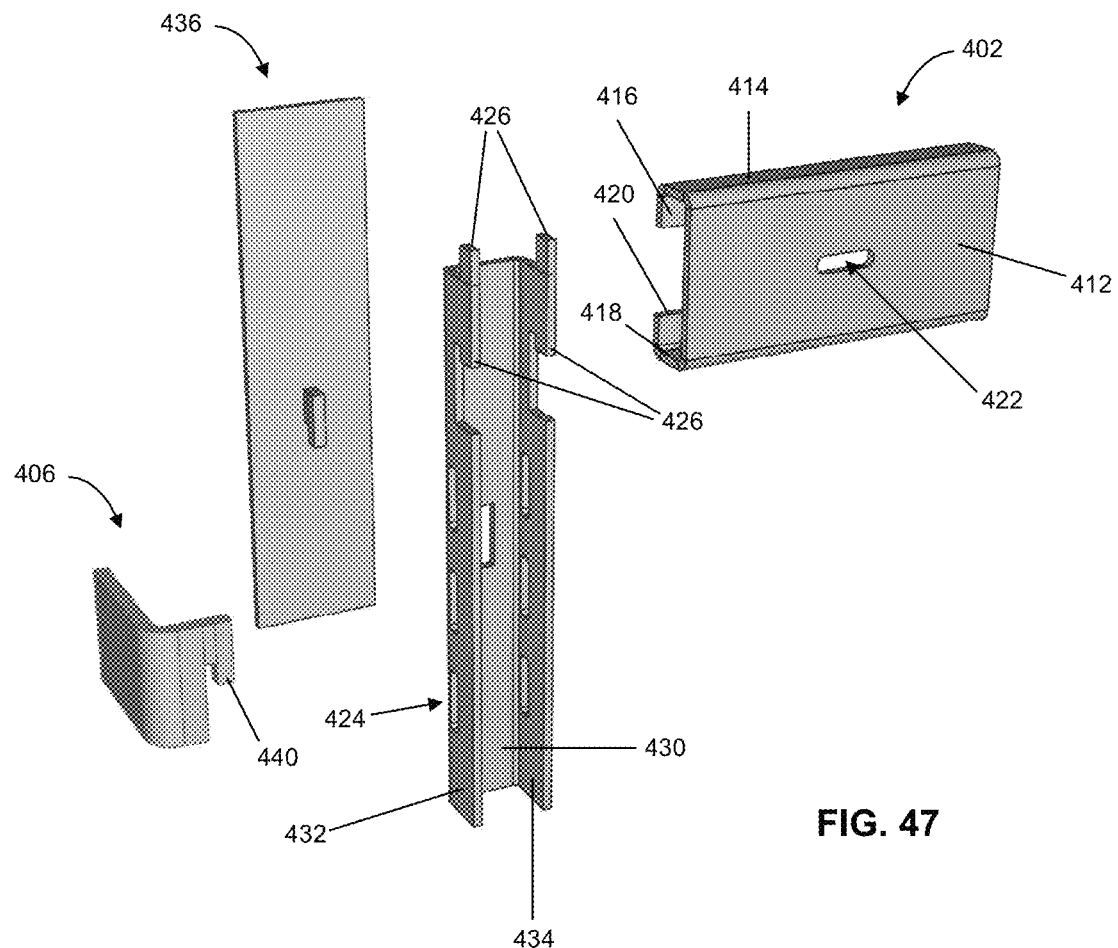
Figure 48:
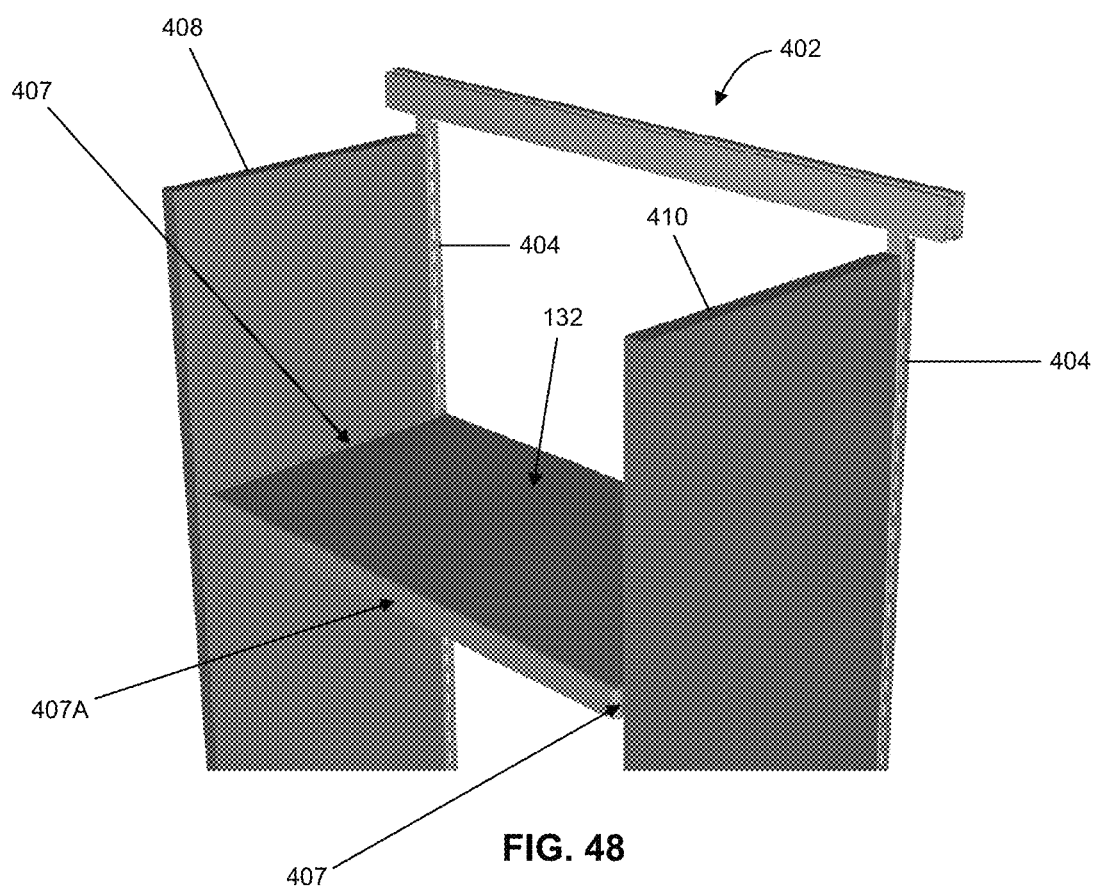
FIG. 48 illustrate the support track and support rails of FIG. 43, FIG. 44, and FIG. 47 along with shelf support brackets, a shelf, and end panels attached to the support rails.
Figures 51, 52:
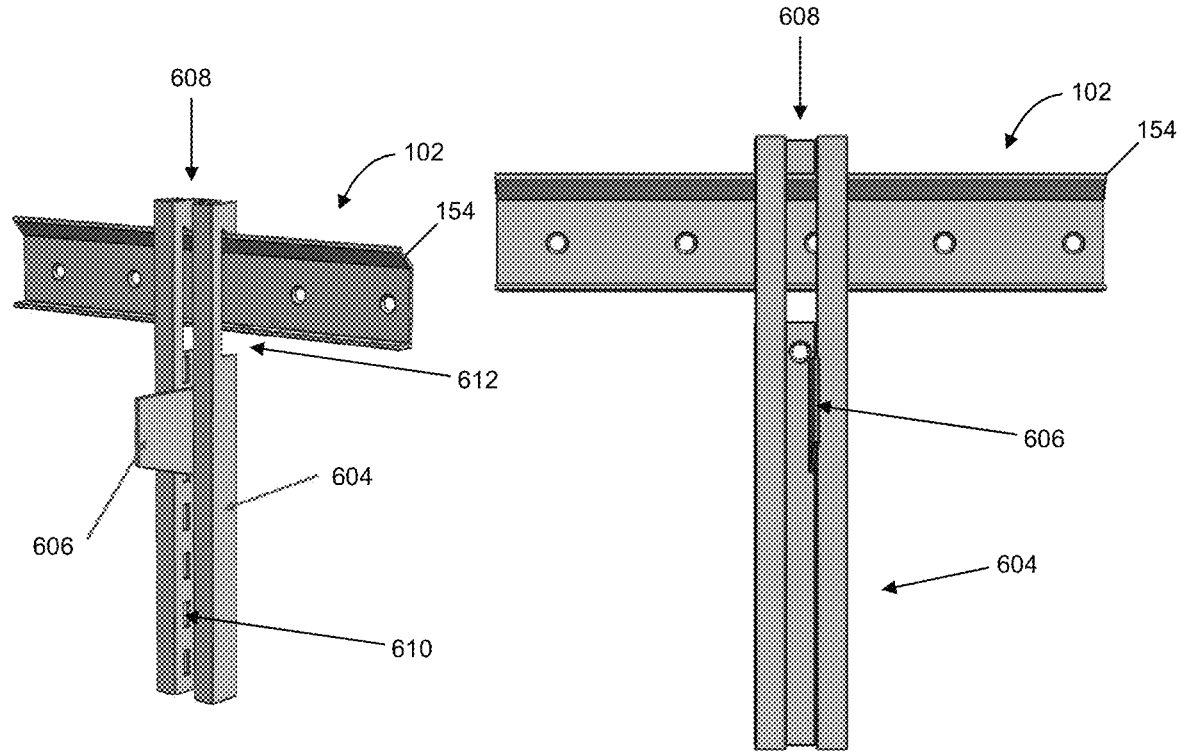
FIG. 51, FIG. 52, FIG. 53, FIG. 54, and FIG. 55 illustrate alternate embodiments of a support rail that can be employed in an alternate embodiment of the closet organization system of FIG. 1 and FIG. 2.
Figure 53:
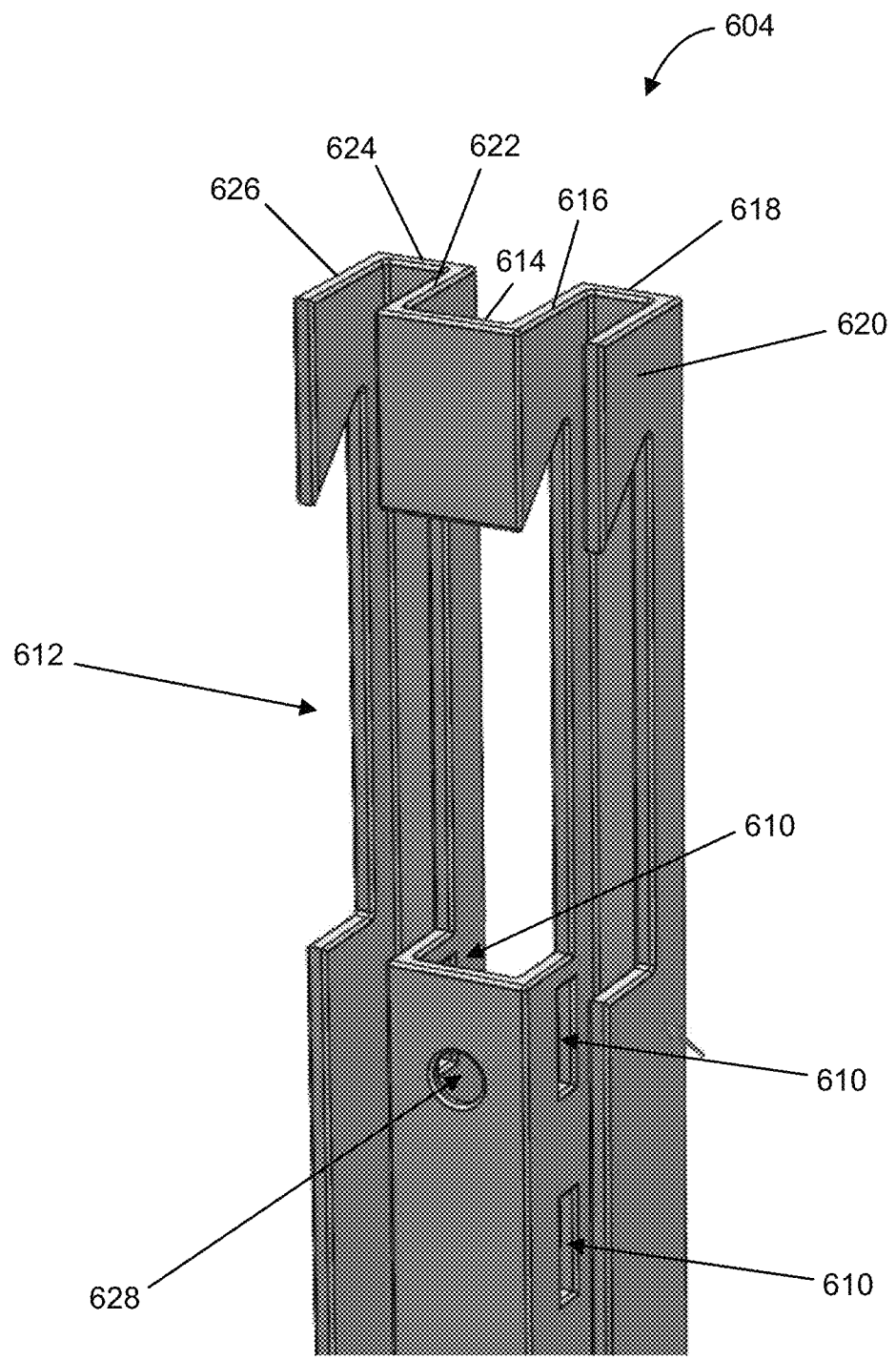
Figures 54, 55:
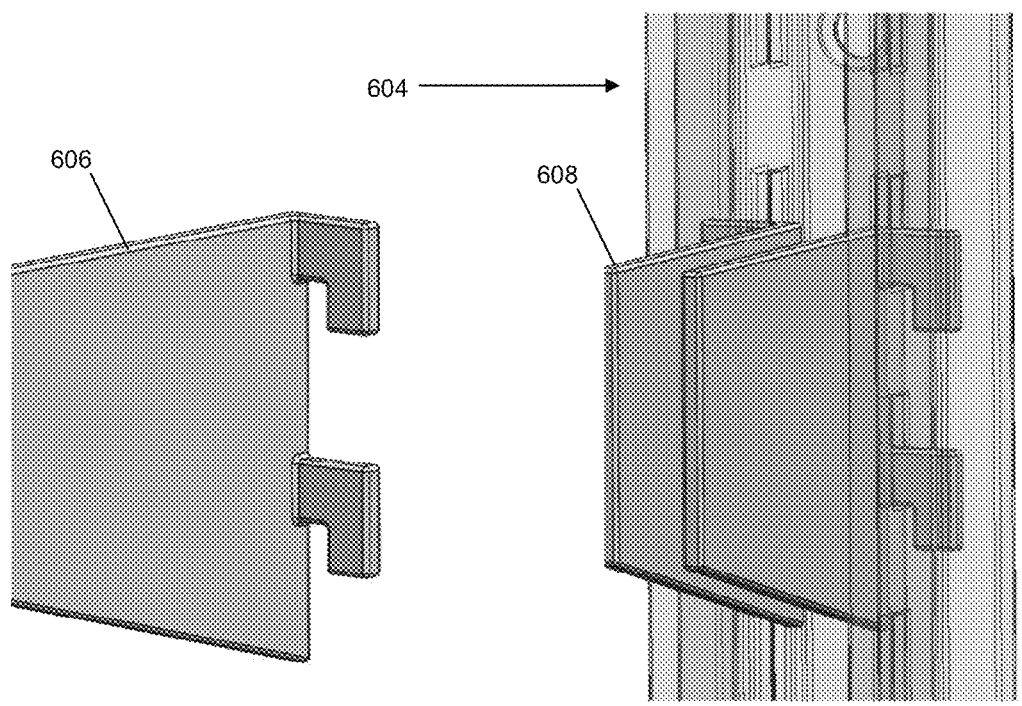

FIG. 43, FIG. 44, FIG. 45, FIG. 46, FIG. 47, and FIG. 48 illustrate a support track 402 and a support rail assembly 404 that can be employed in the closet organization system 100 instead of the support track 102 and the support rail assembly 104. Also illustrated is a support bracket aft portion 406 that can be employed in alternate embodiments of the support brackets 106, 107, 108, 109, 320, 338, 340 that are configured for use with the support rail assembly 404. FIG. 43, FIG. 44, and FIG. 45 show an instance of the support rail assembly 404 suspended from an instance of the support track 402. FIG. 46 illustrates an approach for mounting and demounting of the support rail assembly 404 to and from the support track 402. FIG. 47 shows an exploded view of the support track 402, the support rail assembly 404, and the support bracket aft portion 406. FIG. 48 shows side panels 408, 410 attached to the front of each of two of the support rail assemblies 404 using any suitable attachment mechanism. In some embodiments, the support bracket aft portion 406 is part of a shelf support bracket 407 that includes a shelf support arm configured similarly to any one of shelf support arm 148 (shown in FIG. 3 & FIG. 20), shelf support arm 148 (shown in FIG. 17), or shelf support arms 148 (shown in FIG. 23 & FIG. 24). Forward ends of the shelf support brackets 407 can be connected to (or integrally formed) with a front plate 407A that extends from one shelf support bracket 407 to the other shelf support bracket 407. The shelf support brackets 407 and/or front plate 407A can include mounting features 152 (as shown in FIG. 14 & FIG. 16) or other mounting features suitable for mounting the side panels 408, 410 to respective ones of the shelf support brackets 407 and/or to the front plate 407A and for mounting the shelf 132 to the shelf support brackets 407 and/or the front plate 407A. In some embodiments, such mounting can be achieved by equipping the shelf 132 and side panels 408, 410 with inserts similar to inserts 198 (shown in FIG. 22) or other suitable structures for engaging the mounting features 152 or other suitable mounting features of the shelf support brackets 407 and/or front plate 407A. In some embodiments, multiple instances of the shelf 132 are mounted between the side panels 408, 410, which can help keep the side panels 408, 410 vertical and aligned with respective ones of the side rail assemblies 404 and also help maintain an orthogonal relationship between the multiple instances of the shelf 132 and the side panels 408, 410.

The support track 402 is configured for mounting to a wall in a horizontal orientation and for suspending one or more instances of the support rail assembly 404 from the support track 402. The support track 402 has a squared "C" shaped cross-section. The support track 402 include a back panel 412, an upper panel 414, an upper return flange 416, a lower panel 418, and a lower return flange 420. The back panel 412 includes apertures 422. Each of the apertures 422 is configured to accommodate a mounting fastener for securing the support track 402 to a wall in a mounted configuration of the support track 402 in which the support track 402 is horizontal. The upper panel 414 extends forward from the back panel 412 in a mounted configuration of the support track 402. The upper return flange 416 extends down from the upper panel 414 in the mounted configuration of the support track 402. The lower panel 418 extends forward from the back panel 412 in a mounted configuration of the support track 402. The lower return flange 420 extends up from the lower panel 418 in the mounted configuration of the support track 402. The support track 402 can be formed from any suitable material using any suitable approach. For example, in many embodiments, the support track 402 is formed from a net shape metal extrusion.

The support rail assembly 404 is configured to be suspended from the support track 402 and support one or more shelf support brackets mounted to the support rail assembly 404. The support rail assembly 404 includes bracket mounting slots 424 and support track hooks 426. The support track hooks 426 are configured for engagement with the support track 402 in the mounted configuration of the support track 402 to hang the support rail assembly 404 vertically from the support track 402 with the support rail assembly 404 interfaced with the wall, and the bracket mounting slots 424 extending through the support rail assembly 404 in a horizontal direction that is parallel to the wall in a mounted configuration of the support rail assembly 404 in which the support rail assembly 404 is vertical. The support rail assembly 404 can be formed from any suitable material using any suitable approach. For example, in many embodiments, the support rail assembly 404 is formed from a net shape metal extrusion.

In the illustrated embodiment, the support rail assembly 404 includes a support rail front panel 430, a support rail first side flange 432, and a support rail second side flange 434. The support rail first side flange 432 extends toward the wall from a first side of the support rail front panel 430 in the mounted configuration of the support rail assembly 404. The support rail second side flange 434 extends toward the wall from a second side of the support rail front panel 430 in the mounted configuration of the support rail assembly 404. The bracket mounting slots 424 include a first series of the bracket mounting slots 424 in the support rail first side flange 432 and a second series of the bracket mounting slots 424 in the support rail second side flange 434. The support rail first side flange 432 and the support rail second side flange 434 interface with the wall in the mounted configuration of the support rail assembly 404. Two of the support track hooks 426 are formed in the support rail first side flange 432. Two of the support track hooks 426 are formed in the support rail second side flange 434.

In the illustrated embodiment, the support rail assembly 404 includes a rail assembly cover 436. The rail assembly cover 436 is detachably mountable to the support rail front panel 430. The rail assembly cover 436 is configured to extend past each of the first side of the support rail front panel 430 and the second side of the support rail front panel 430 by enough of a distance that the rail assembly cover 436 obstructs viewing of the mounting slots 424 when the rail assembly cover 436 is installed on the support rail assembly 404 and is viewed from a location directly forward of the rail assembly cover 436 (i.e., looking in a direction perpendicular to the front surface of the cover 436) and also obstructs viewing of the mounting slots 424 when the rail assembly cover 436 is viewed from any other direction within a predetermined angle left or right of the perpendicular direction. In some embodiments, the width of the rail assembly cover 436 is selected so that the predetermined angle is 45 to 60 degrees. In other embodiments, this width can be selected so that the predetermined angle is between 60 and 80 degrees. This results in a more aesthetically pleasing outward appearance than what might be achieved if the mounting slots were more readily visible.

FIG. 49 and FIG. 50 illustrate a support rail 504 that can be employed with the support track 402 and the support brackets 106, 107, 108, 109, 320, 338, 340 in an alternate embodiment of the closet organization system 100. The support rail 504 is configured to be suspended from the support track 402 and support one or more of the support brackets 106, 107, 108, 109, 320, 338, 340 mounted to the support rail assembly 404. The support rail 504 is configured the same as the support rail 104 except for including support track hooks 426 instead of the contoured cut-out 170 of the support rail 104. Two of the support track hooks 426 are formed in the support rail first side aft flange 164. Two of the support track hooks 426 are formed in the support rail second side aft flange 166.

FIG. 51, FIG. 52, FIG. 53, FIG. 54, and FIG. 55 illustrate alternate embodiments of a support rail 604 that can be employed with the support track 102 in an alternate embodiment of the closet organization system 100. Also illustrated are support bracket aft portions 606, 608 that can be employed in alternate embodiments of the support brackets 106, 107, 108, 109, 320, 338, 340 that are configured for use with the support rail 604. The support rail 604 is configured to be suspended from the support track 102. The support rail 604 includes a central slot 608, bracket mounting slots 610, and a contoured cut-out 612. The contoured cut-out 612 is shaped to accommodate the support track 102 in the mounted configuration of the support track 102. The contoured cut-out 612 is interfaced with the upper flange 154 to hang the support rail 604 vertically from the support track 102 with the support rail 604 interfaced with the wall and the bracket mounting slots 610 facing the central slot 608 in a mounted configuration of the support rail 604 in which the support rail 604 is vertical. The support rail 604 can be formed from any suitable material using any suitable approach. For example, in many embodiments, the support rail 604 is formed from a net shape metal extrusion.

In the illustrated embodiment, the support rail 604 includes a support rail back panel 614, a support rail first side center slot panel 616, a support rail first side front panel 618, a support rail first side flange 620, a support rail second side center slot panel 622, a support rail second side front panel 624, and a support rail second side flange 626. The bracket mounting slots 610 include a first series of the bracket mounting slots 610 in the support rail first side center slot panel 616 and a second series of the bracket mounting slots 610 in the support rail second side center slot panel 622. The support rail first side center slot panel 616 extends forward from a first side of the support rail back panel 614 in the mounted configuration of the support rail 604. The support rail first side front panel 618 extends perpendicularly from a front end of the support rail first side center slot panel 616 in the mounted configuration of the support rail 604. The support rail first side flange 620 extends from the support rail first side front panel 618 towards the wall in the mounted configuration of the support rail 604. The support rail second side center slot panel 622 extends forward from a second side of the support rail back panel 614 in the mounted configuration of the support rail 604. The support rail second side front panel 624 extends perpendicularly from a front end of the support rail second side center slot panel 622 in the mounted configuration of the support rail 604. The support rail second side flange 626 extends from the support rail second side front panel 624 towards the wall in the mounted configuration of the support rail 604. The support rail first side flange 620 and the support rail second side flange 626 interface with the wall in the mounted configuration of the support rail 604. The contoured cut-out 612 is formed in each of the support rail first side flange 620, the support rail second side flange 626, the support rail first side center slot panel 616, the support rail second side center slot panel 622, and the support rail back panel 614.

In the illustrated embodiment, the support rail back panel includes fastener apertures 628. Each of the fastener apertures 628 is configured to accommodate a mounting fastener for further securing the support rail 604 to the wall in a mounted configuration of the support rail 604.

Figure 56:
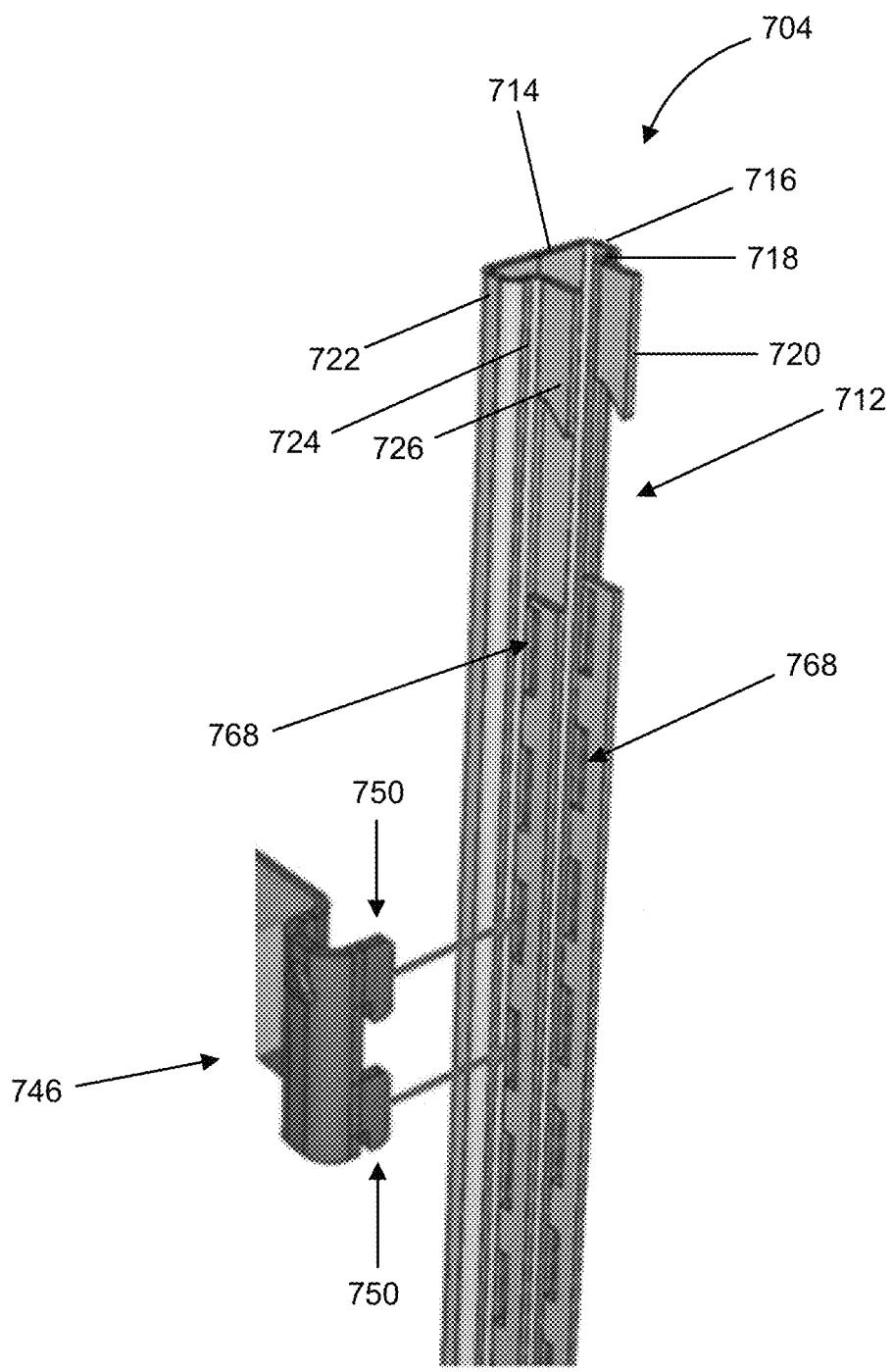
FIG. 56 illustrates a support rail with side facing mounting slots that can be employed in an embodiment of the closet organization system of FIG. 1 and FIG. 2.

FIG. 56 illustrates a support rail 704 with side facing mounting slots 768 that can be employed in combination with the support track 102 in an embodiment of the closet organization system 100. The support rail 704 is configured the same as the support rail 104 except for having side facing mounting slots 768 instead of the aft facing bracket mounting slots 168 in the support rail 104. The support rail 704 includes a support rail front panel 714, a support rail first side side panel 716, a support rail first side aft panel 718, a support rail first side aft flange 720, a support rail second side side panel 722, a support rail second side aft panel 724, a support rail second side aft flange 726, and side facing bracket mounting slots 768. The bracket mounting slots 768 include a first series of the bracket mounting slots 768 in the support rail first side aft flange 720 and a second series of the bracket mounting slots 768 in the support rail second side aft flange 726. The support rail first side aft flange 720 extends aft from the support rail first side aft panel 718. The support rail second side aft flange 726 extends aft from the support rail second side aft panel 724. The support rail first side aft flange 720 and the support rail second side aft flange 726 interface with the wall in the mounted configuration of the support rail 704. The support rail 704 includes a contoured cut-out 712 shaped to accommodate the support track 102 and interface with a top surface of the upper flange 154 of the support track 102 to suspend the support rail 704 from the support track 102.

Figure 57:
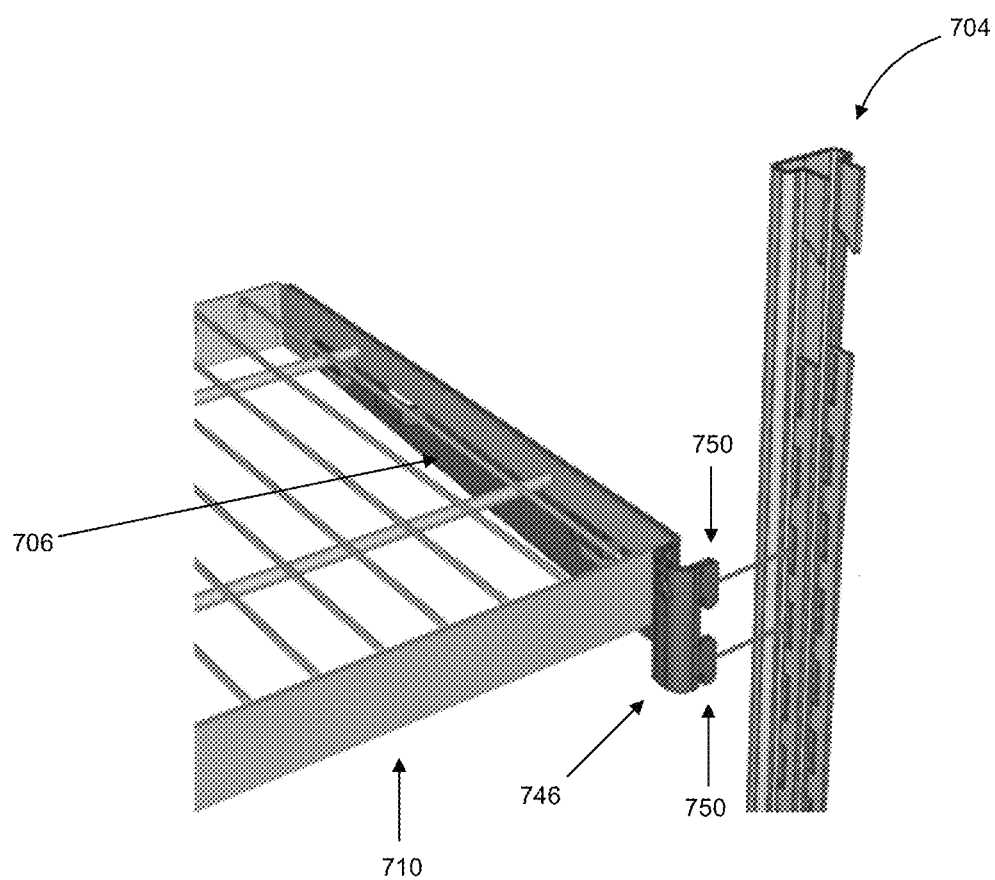
FIG. 57 illustrates an assembly that includes the support rail of FIG. 56, a support arm with side-facing mounting hooks, and a shelf that can be employed in an embodiment of the closet organization system of FIG. 1 and FIG. 2.
Figure 60:
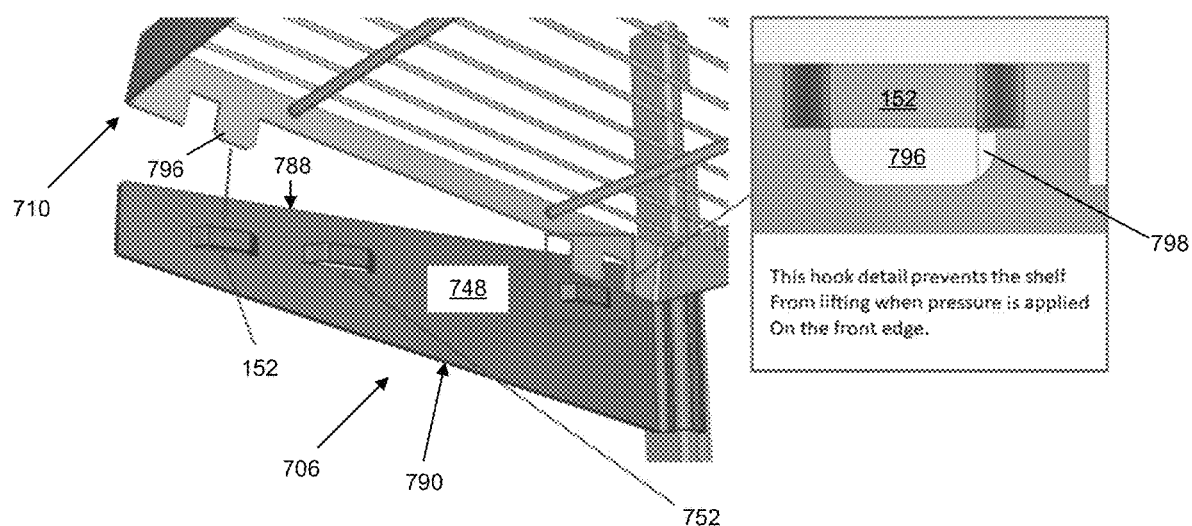
FIG. 60 shows a view of the assembly of FIG. 57 in a partially assembled state that illustrates mounting features of the support arm and the shelf.
Figure 63:
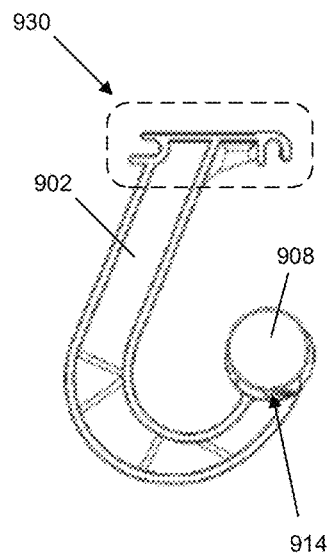
FIG. 63, FIG. 64, FIG. 65, FIG. 66, and FIG. 67 shows views of a closet rod support assembly that include a closet rod support member and closet rod size adapters that can be selectively mounted to the closet rod support member for adapting the closet rod support assembly for use in supporting different diameter closet rods.
Figure 64:
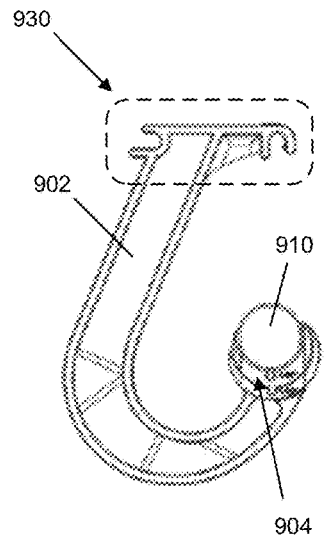
Figure 65:
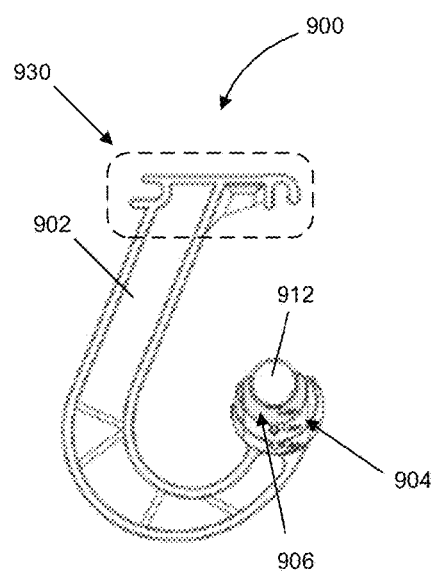
Figure 66:
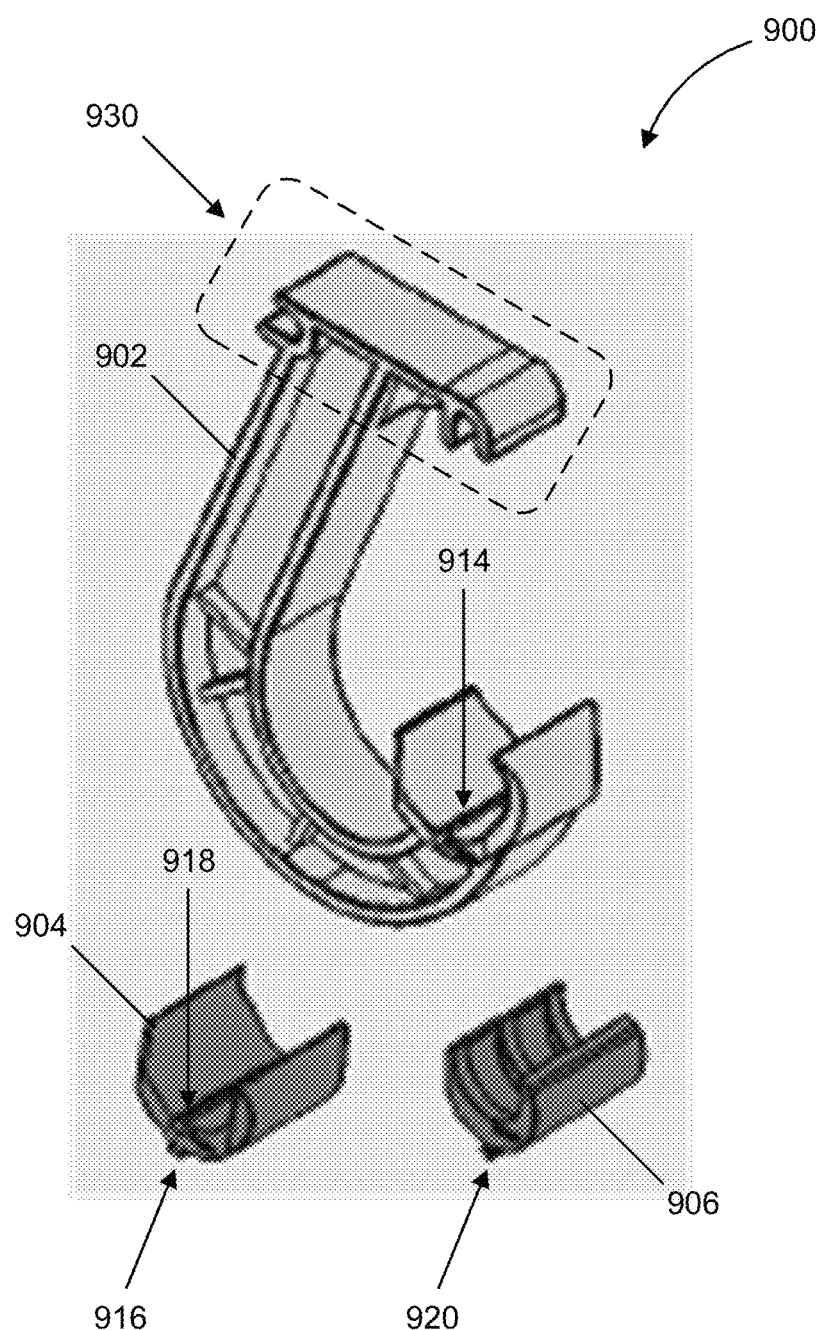

FIG. 56 also illustrates a shelf support bracket aft portion 746 of a shelf support bracket 706 (shown in FIG. 60). The shelf support bracket aft portion 746 includes two side-facing mounting hooks 750. A support arm 748 of the shelf support bracket 706 has a top edge 788 and a bottom edge 790. The shelf support bracket 706 is configured to be mounted to two of the mounting slots 768 located in one of the support rail first side aft flange 720 or the support rail second side aft flange 726 so that the top edge 788 faces up and the bottom edge 790 faces down. FIG. 57 illustrates an assembly that includes the support rail 704, the shelf support bracket 706, and a shelf 710 mounted to the shelf support bracket 706. The shelf 710 can include the features described herein with respect to the shelf 110. Likewise, the shelf 110 can include the additional features described herein with respect to the shelf 710. The two side-facing mounting hooks 750 are insertable into a pair of the mounting slots 768 and then securable to the support rail 704 via downward movement of the support bracket 706 relative to the support rail 704 to engage the mounting hooks 750 with the support rail 704.

Figure 58:
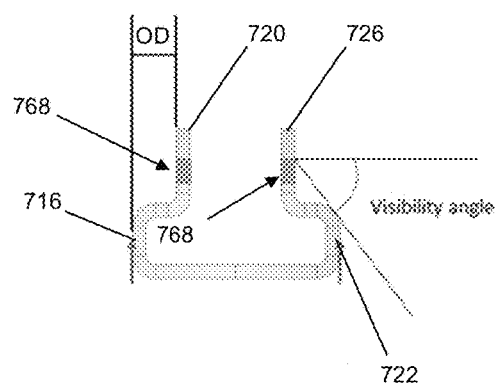
FIG. 58 shows a cross-sectional view of the support rail of FIG. 56 that illustrates limited visibility of mounting slots of the support rail.
Figure 59:
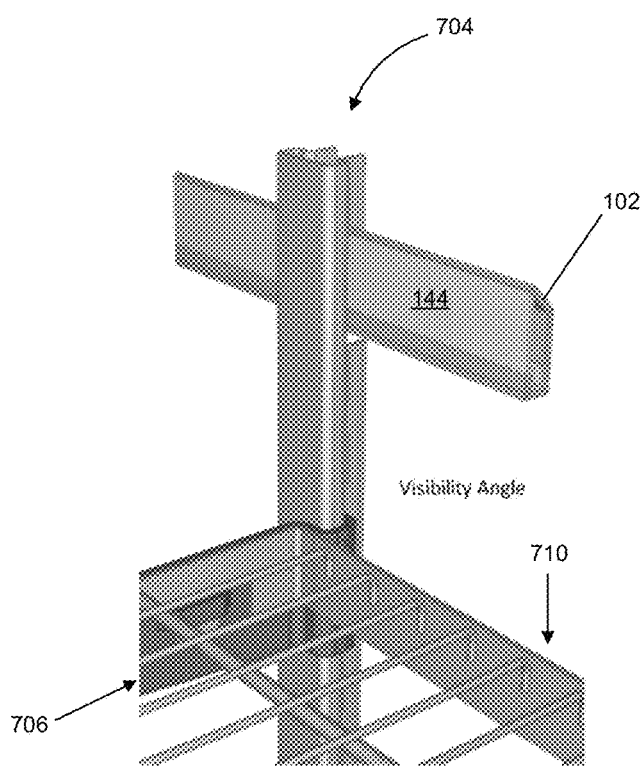
FIG. 59 shows a view of an assembly that includes the assembly of FIG. 56 and the horizontal support track of FIG. 5 through FIG. 9 that further illustrates visibility of mounting slots of the support rail.

FIG. 58 shows a cross-sectional view of the support rail 704 that illustrates limited visibility of mounting slots 768 relative to a viewpoint located in front of the support rail 704. The support rail first side aft flange 720 is offset from the support rail first side side panel 716 by an offset distance (OD), which limits the visibility of the mounting slots 768 in the support rail first side aft flange 720. Likewise, the support rail second side aft flange 726 is offset from the support rail second side side panel 722 by the offset distance (OD), which limits the visibility of the mounting slots 768 in the support rail second side aft flange 726. FIG. 59 shows a view of an assembly that includes the support rail 704 that further illustrates the limited visibility of mounting slots 768. In one embodiment, the offset distance (OD) is greater than or equal to 0.15". In another embodiment, the offset distance (OD) is greater than or equal to 0.20". In another embodiment, the offset distance (OD) is greater than or equal to 0.25". In another embodiment, the offset distance (OD) is greater than or equal to 0.30". In another embodiment, the offset distance (OD) is greater than or equal to 0.35". In another embodiment, the offset distance (OD) is greater than or equal to 0.40". In another embodiment, the offset distance (OD) is greater than or equal to 0.50". In another embodiment, the offset distance (OD) is greater than or equal to 0.60". In another embodiment, the offset distance (OD) is greater than or equal to 0.70".

As illustrated in FIG. 58, the visibility angle represents the angles from the wall plane from which the mounting slots 168 are visible, with a smaller angle being preferable. In one embodiment, the visibility angle is less than or equal to 75 degrees. In an additional embodiment, the visibility angle is less than or equal to 70 degrees. In an additional embodiment, the visibility angle is less than or equal to 65 degrees. In an additional embodiment, the visibility angle is less than or equal to 60 degrees. In an additional embodiment, the visibility angle is less than or equal to 55 degrees. In an additional embodiment, the visibility angle is less than or equal to 50 degrees. In an additional embodiment, the visibility angle is less than or equal to 45 degrees. In an additional embodiment, the visibility angle is less than or equal to 40 degrees.

FIG. 60 shows a view of an assembly that includes the support rail 704, the support arm 706, and the shelf 710. The shelf 710 includes the shelf support mounting features 152 described herein with respect to the shelf 110. In the illustrated embodiment, the shelf 710 further includes a closet rod support mounting feature 752, which can be configured similar to the shelf support mounting feature 152. The shelf 710 includes mounting tabs 796, which can be configured similar to the mounting tabs 196 of the shelf 110. In the illustrated embodiment, the aft mounting tab 796 includes a hook portion 798 configured to engage with the aft shelf support mounting feature 152 to inhibit lifting of the shelf 710 from the support bracket 706 when upward force is applied to the shelf 710.

FIG. 61 and FIG. 62 shows views of the support arm 706 and a closet rod support member 802 mountable to the closet rod support mounting feature 752. The closet rod support member 802 includes a support hook 804 configured for hanging the closet rod support member 802 from the closet rod support mounting feature 752. The closet rod support member 802 includes a closet rod support member 806 with a cylindrical support surface 808 for supporting a round closet rod.

FIG. 63, FIG. 64, FIG. 65, FIG. 66, and FIG. 67 shows views of a closet rod support assembly 900 that includes a closet rod support member 902 and closet rod size adapters 904, 906 that can be selectively mounted to the closet rod support member 902 for adapting the closet rod support assembly 900 for use in supporting a large diameter closet rod 908, a medium diameter closet rod 910, or a small diameter closet rod 912. While the illustrated embodiment of the closet rod support assembly 900 includes the two adapters 904, 906, any suitable number of the adapters can be employed to adapt the support assembly 900 for use in supporting any suitable size of closet rod. The support member 902 includes a retention feature 914 configured to interface with a complementarily shaped retention feature 916 of the adapter 904 to retain the adapter 904 to the support member 902 while accommodating demounting of the adapter 904 from the support member 902 when desired. Likewise, the adapter 904 includes a retention feature 918 configured to interface with a complementarily shaped retention feature 920 of the adapter 906 to retain the adapter 906 to the adapter 904 while accommodating demounting of the adapter 906 from the support member 904 when desired.

Figure 67:
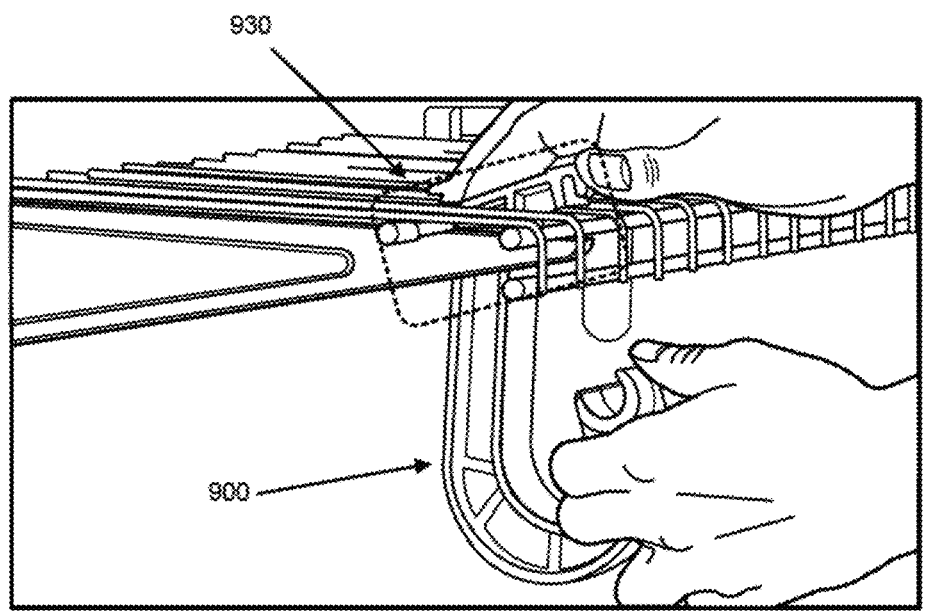

As illustrated in FIG. 67, the closet rod support member 902 can include an attachment feature 930 configured to engage a shelf, and more specifically a wire shelf. In other embodiments (not illustrated), the closet rod support member 902 can include an alternative attachment feature such as the support hook 804 illustrated in FIG. 62.

Figure 68:
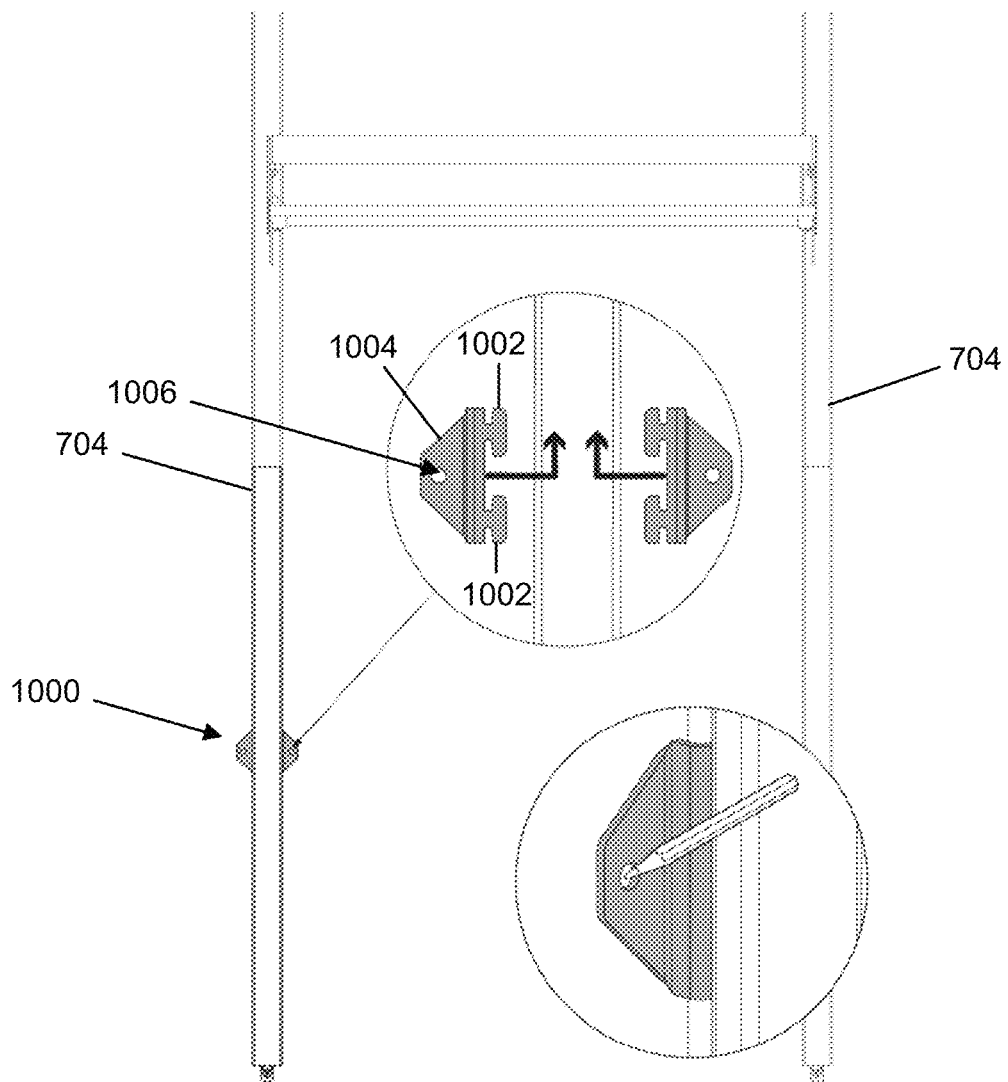
FIG. 68 and FIG. 69 shows views of wall anchor brackets configured for securing the support rail of FIG. 56 to the wall.
Figure 69:
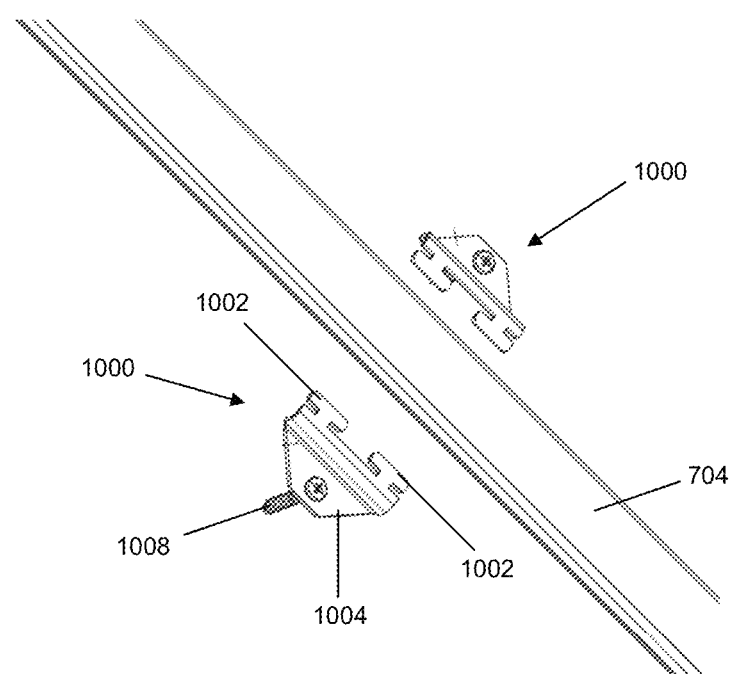

FIG. 68 and FIG. 69 shows views of wall anchor brackets 1000 configured for securing the support rail 704 to the wall. Each of the wall anchor brackets 1000 comprises two wall anchor bracket mounting hooks 1002, a wall attachment flange 1004, and a fastener hole 1006 in the wall attachment flange 1004. The wall anchor bracket mounting hooks 1002 are configured for insertion into the bracket mounting slots 768 to secure the wall anchor bracket 1000 to the support rail 704 in a mounted configuration of the wall anchor bracket 1000 so that the wall attachment flange 1004 extends parallel to the wall. The fastener hole 1006 in the wall attachment flange 1004 is configured to accommodate an anchor fastener 1008 for securing the wall anchor bracket 1000 to the wall in the mounted configuration of the wall anchor bracket 1000. Each of the wall anchor bracket mounting hooks 1002 has a symmetrical configuration that enables the wall anchor bracket 1000 to be secured to the support rail 704 on either side of the support rail 704 via movement of the wall anchor bracket 1000 relative to the support rail 704 in either of a first direction (e.g., up) and a second direction (e.g., down) opposite to the first direction.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A closet organization system comprising:
   a support track comprising apertures, wherein each of the apertures is configured to accommodate a mounting fastener for securing the support track to a wall in a mounted configuration of the support track in which the support track is horizontal;
   a support rail comprising bracket mounting slots, a support rail first side aft-facing panel, a support rail second side aft-facing panel, a support rail first side aft flange, and a support rail second side aft flange, wherein each of a first series of the bracket mounting slots extends through the support rail first side aft-facing panel, wherein each of a second series of the bracket mounting slots extends through the support rail second side aft-facing panel, wherein the support rail first side aft flange extends aft from the support rail first side aft-facing panel, wherein the support rail second side aft flange extends aft from the support rail second side aft-facing panel, wherein the support rail is configured for interfacing with the support track to hang the support rail vertically from the support track with the support rail first side aft flange and the support rail second side aft flange interfaced with the wall in a mounted configuration of the support rail in which the bracket mounting slots face the wall; and
   a shelf support bracket comprising a support arm and a mounting hook, wherein the mounting hook is configured for insertion into one of the bracket mounting slots to secure the shelf support bracket to the support rail so that the support arm extends transversely from the support rail and away from the wall in a mounted configuration of the shelf support bracket.

2. The closet organization system of claim 1, wherein the shelf support bracket comprises a second mounting hook configured for insertion into one of the bracket mounting slots to secure the shelf support bracket to the support rail so that the support arm extends transversely from the support rail and away from the wall in the mounted configuration of the shelf support bracket.

3. The closet organization system of claim 1, wherein:
   the support track comprises a back panel, an upper flange, and a lower flange;
   each of the apertures is disposed in the back panel;
   the upper flange extends transversely from the back panel so as to extend, in the mounted configuration of the support track, upwardly from the back panel and outwardly from the wall;
   the support rail comprises a contoured cut-out shaped to accommodate the support track in the mounted configuration of the support track and interface with the upper flange to hang the support rail vertically from the support track with the support rail interfaced with the wall; and the lower flange extends transversely from the back panel.

4. The closet organization system of claim 3, wherein the upper flange extends from the back panel at an upper flange angle in a range from 35 degrees to 55 degrees.

5. The closet organization system of claim 3, comprising a cover detachably mounted to the support track to conceal the apertures.

6. The closet organization system of claim 5, wherein:
the lower flange of the support track comprises a lower flange base and a lower flange lip;
the lower flange base extends forward from the back panel in the mounted configuration of the support track;
the lower flange lip extends up from the lower flange base in the mounted configuration of the support track; and
the cover comprises a lower portion configured to interface with the back panel, the lower flange base, and the lower flange lip to secure the cover to the support track.

7. The closet organization system of claim 1, wherein the support rail is formed from an extrusion.

8. The closet organization system of claim 1, further comprising:
a second shelf support bracket comprising a second shelf support bracket support arm, a second shelf support bracket mounting hook, and a second shelf support bracket aft portion connecting the second shelf support bracket support arm to the second shelf support bracket mounting hook, and wherein:
the shelf support bracket comprises a shelf support bracket aft portion connecting the support arm of the shelf support bracket to the mounting hook of the shelf support bracket;
the mounting hook of the shelf support bracket is configured for insertion into one of the first series of the bracket mounting slots to secure the shelf support bracket to the support rail so that the shelf support bracket aft portion extends transversely from the support rail and the support arm of the shelf support bracket extends away from the wall in a mounted configuration of the shelf support bracket;
the second shelf support bracket mounting hook is configured for insertion into one of the second series of the bracket mounting slots to secure the second shelf support bracket to the support rail so that the second shelf support bracket aft portion extends transversely from the support rail and the second shelf support bracket support arm extends away from the wall in a mounted configuration of the second shelf support bracket; and
the shelf support bracket and second shelf support bracket are configured so that, when the shelf support bracket is in the mounted configuration of the shelf support bracket and the second shelf support bracket is in the mounted configuration of the second shelf support bracket, the second shelf support bracket aft portion extends transversely in a first direction and the shelf support bracket aft portion extends in a different direction that is substantially opposite to the first direction.

9. The closet organization system of claim 8, wherein the second shelf support bracket aft portion and the shelf support bracket aft portion are configured to include a joggle adapted to accommodate opposite side panels of the support rail.

10. The closet organization system of claim 1, wherein:
the support rail comprises a support rail first side side panel, a support rail second side side panel and a support rail front panel;
the support rail first side aft panel connects the support rail first side side panel to the support rail first side aft flange;
the support rail second side aft panel connects the support rail second side side panel to the support rail second side aft flange; and
the support rail front panel connects the support rail first side side panel to the support rail second side side panel.

11. The closet organization system of claim 10, wherein:
the support rail first side aft flange is offset from the support rail first side side panel towards the support rail second side aft flange by an offset distance of equal to or greater than 0.20 inches;
the first series of the bracket mounting slots are hidden from view for view directions equal to or greater than 60 degrees from the wall in a plane perpendicular to each of the wall and the support rail first side aft flange;
the support rail second side aft flange is offset from the support rail second side side panel towards the support rail first side aft flange by an offset distance of equal to or greater than 0.20 inches; and
the second series of the bracket mounting slots are hidden from view for view directions equal to or greater than 60 degrees from the wall in a plane perpendicular to each of the wall and the support rail second side aft flange.

12. The closet organization system of claim 1, comprising:
a second support rail comprising second bracket mounting slots, wherein the second support rail is configured to interface with the support track to hang the second support rail vertically from the support track with the second support rail interfaced with the wall and the second bracket mounting slots facing the wall in a mounted configuration of the second support rail; and
a second shelf support bracket comprising a second shelf support bracket support arm and second shelf support bracket mounting hooks, wherein each of the second shelf support bracket mounting hooks is configured for insertion into one of the second bracket mounting slots to secure the second shelf support bracket to the second support rail so that the second shelf support bracket support arm extends transversely from the second support rail and away from the wall in a mounted configuration of the second shelf support bracket.

13. The closet organization system of claim 12, wherein:
the shelf support bracket comprises a shelf support bracket aft portion connecting the support arm of the shelf support bracket to the mounting hook of the shelf support bracket; and
the second shelf support bracket further comprises a second shelf support bracket aft portion connecting the support arm of the second shelf support bracket to the mounting hook of the second shelf support bracket.

14. The closet organization system of claim 12, wherein:
the second support rail comprises a second support rail first side aft-facing panel, a second support rail second side aft-facing panel, a second support rail first side aft flange, and a second support rail second side aft flange;
the second bracket mounting slots comprise a first series of the second bracket mounting slots in the second support rail first side aft-facing panel and a second series of the second bracket mounting slots in the second support rail second side aft-facing panel;
the second support rail first side aft flange extends aft from the second support rail first side aft-facing panel;
the second support rail second side aft flange extends aft from the second support rail second side aft-facing panel; and
the second support rail first side aft flange and the second support rail second side aft flange interface with the wall in the mounted configuration of the second support rail.

15. The closet organization system of claim 12, comprising:
a third support rail comprising third bracket mounting slots, wherein the third support rail is configured to be interfaced with the support track to hang the third support rail vertically from the support track with the third support rail interfaced with the wall and the third bracket mounting slots facing the wall in a mounted configuration of the third support rail;
a third shelf support bracket comprising a support arm and a mounting hook, wherein the mounting hook of the third shelf support bracket is configured for insertion into one of the third bracket mounting slots to secure the third shelf support bracket to the third support rail so that the support arm extends transversely from the third support rail and away from the wall in a mounted configuration of the third shelf support bracket; and
a fourth shelf support bracket comprising a support arm and a mounting hook, wherein the mounting hook of the fourth shelf support bracket is configured for insertion into one of the bracket mounting slots to secure the fourth shelf support bracket to the support rail so that the support arm extends transversely from the support rail and away from the wall in a mounted configuration of the fourth shelf support bracket.

16. The closet organization system of claim 15, wherein:
the third shelf support bracket comprises four mounting hooks;
two of the four mounting hooks of the third shelf support bracket are configured to engage two of the bracket mounting slots of the third support rail;
the fourth shelf support bracket comprises four mounting hooks; and
two of the four mounting hooks of the fourth shelf support bracket are configured to engage two of the bracket mounting slots of the support rail.

17. The closet organization system of claim 15, comprising:
a shelf mounted to and supported by each of the support arm of the shelf support bracket and the support arm of the second shelf support bracket; and
a second shelf mounted to and supported by each of the support arm of the third shelf support bracket and the support arm of the fourth shelf support bracket,
wherein the support arm of the shelf support bracket and the support arm of the fourth shelf support bracket are disposed between the shelf and the second shelf.

18. The closet organization system of claim 1, wherein each of the apertures has a width longer than a height of the apertures to accommodate horizontal repositioning of the mounting fastener relative to the support track, when the support track extends horizontally in the mounted configuration against a vertical wall.

19. The closet organization system of claim 18, wherein each of the apertures has a chamfered edge to accommodate a beveled head of a mounting fastener.

20. The closet organization system of claim 1, wherein:
the support track comprises a back panel, an upper panel, an upper return flange, a lower panel, and a lower return flange;
the back panel comprises the apertures;
the upper panel extends forward from the back panel, away from the wall when the support track is in the mounted configuration of the support track;
the upper return flange extends down from the upper panel in the mounted configuration of the support track;
the lower panel extends forward from the back panel, away from the wall when the support track is in a mounted configuration of the support track;
the lower return flange extends up from the lower panel in the mounted configuration of the support track; and
the support rail includes support track hooks configured for engagement with the support track to hang the support rail from the support track.

21. The closet organization system of claim 20, wherein the support track is formed from an extrusion.

22. A closet organization system comprising:
a support track comprising apertures, a back panel, an upper panel, an upper return flange, a lower panel, and a lower return flange, wherein the back panel comprises the apertures, wherein each of the apertures is configured to accommodate a mounting fastener for securing the support track to a wall in a mounted configuration of the support track in which the support track is horizontal, wherein the upper panel extends forward from the back panel, away from the wall when the support track is in the mounted configuration of the support track, wherein the upper return flange extends down from the upper panel in the mounted configuration of the support track, wherein the lower panel extends forward from the back panel, away from the wall when the support track is in a mounted configuration of the support track, and wherein the lower return flange extends up from the lower panel in the mounted configuration of the support track;
a support rail comprising bracket mounting slots, wherein the support rail includes support track hooks configured for engagement with the support track to hang the support rail vertically from the support track with the support rail interfaced with the wall and the bracket mounting slots facing the wall in a mounted configuration of the support rail; and
a shelf support bracket comprising a support arm and a mounting hook, wherein the mounting hook is configured for insertion into one of the bracket mounting slots to secure the shelf support bracket to the support rail so that the support arm extends transversely from the support rail and away from the wall in a mounted configuration of the shelf support bracket.

23. The closet organization system of claim 22, wherein the shelf support bracket comprises a second mounting hook configured for insertion into one of the bracket mounting slots to secure the shelf support bracket to the support rail so that the support arm extends transversely from the support rail and away from the wall in the mounted configuration of the shelf support bracket.

24. The closet organization system of claim 22, wherein:
the support rail comprises a support rail first side aft-facing panel, a support rail second side aft-facing panel, a support rail first side aft flange, and a support rail second side aft flange;
the bracket mounting slots comprise a first series of the bracket mounting slots in the support rail first side aft-facing panel and a second series of the bracket mounting slots in the support rail second side aft-facing panel;

the support rail first side aft flange extends aft from the support rail first side aft-facing panel;

the support rail second side aft flange extends aft from the support rail second side aft-facing panel; and the support rail first side aft flange and the support rail second side aft flange interface with the wall in the mounted configuration of the support rail.

25. The closet organization system of claim 24, further comprising: a second shelf support bracket comprising a second shelf support bracket support arm, a second shelf support bracket mounting hook, and a second shelf support bracket aft portion connecting the second shelf support bracket support arm to the second shelf support bracket mounting hook, and wherein:

the shelf support bracket comprises a shelf support bracket aft portion connecting the support arm of the shelf support bracket to the mounting hook of the shelf support bracket;

the mounting hook of the shelf support bracket is configured for insertion into one of the first series of the bracket mounting slots to secure the shelf support bracket to the support rail so that the shelf support bracket aft portion extends transversely from the support rail and the support arm of the shelf support bracket extends away from the wall in a mounted configuration of the shelf support bracket;

the second shelf support bracket mounting hook is configured for insertion into one of the second series of the bracket mounting slots to secure the second shelf support bracket to the support rail so that the second shelf support bracket aft portion extends transversely from the support rail and the second shelf support bracket support arm extends away from the wall in a mounted configuration of the second shelf support bracket; and the shelf support bracket and second shelf support bracket are configured so that, when the shelf support bracket is in the mounted configuration of the shelf support bracket and the second shelf support bracket is in the mounted configuration of the second shelf support bracket, the second shelf support bracket aft portion extends transversely in a first direction and the shelf support bracket aft portion extends in a different direction that is substantially opposite to the first direction.

26. The closet organization system of claim 25, wherein the second shelf support bracket aft portion and the shelf support bracket aft portion are configured to include a joggle adapted to accommodate opposite side panels of the support rail.

27. The closet organization system of claim 24, wherein:
the support rail comprises a support rail first side side panel, a support rail second side side panel and a support rail front panel;

the support rail first side aft panel connects the support rail first side side panel to the support rail first side aft flange;

the support rail second side aft panel connects the support rail second side side panel to the support rail second side aft flange; and the support rail front panel connects the support rail first side side panel to the support rail second side side panel.

28. The closet organization system of claim 27, wherein:
the support rail first side aft flange is offset from the support rail first side side panel towards the support rail second side aft flange by an offset distance of equal to or greater than 0.20 inches;

the first series of the bracket mounting slots are hidden from view for view directions equal to or greater than 60 degrees from the wall in a plane perpendicular to each of the wall and the support rail first side aft flange;

the support rail second side aft flange is offset from the support rail second side side panel towards the support rail first side aft flange by an offset distance of equal to or greater than 0.20 inches; and the second series of the bracket mounting slots are hidden from view for view directions equal to or greater than 60 degrees from the wall in a plane perpendicular to each of the wall and the support rail second side aft flange.

29. The closet organization system of claim 22, comprising:

a second support rail comprising second bracket mounting slots, wherein the second support rail is configured to interface with the support track to hang the second support rail vertically from the support track with the second support rail interfaced with the wall and the second bracket mounting slots facing the wall in a mounted configuration of the second support rail; and a second shelf support bracket comprising a second shelf support bracket support arm and second shelf support bracket mounting hooks, wherein each of the second shelf support bracket mounting hooks is configured for insertion into one of the second bracket mounting slots to secure the second shelf support bracket to the second support rail so that the second shelf support bracket support arm extends transversely from the second support rail and away from the wall in a mounted configuration of the second shelf support bracket.

30. The closet organization system of claim 29, wherein:
the shelf support bracket comprises a shelf support bracket aft portion connecting the support arm of the shelf support bracket to the mounting hook of the shelf support bracket; and the second shelf support bracket further comprises a second shelf support bracket aft portion connecting the support arm of the second shelf support bracket to the mounting hook of the second shelf support bracket.

31. The closet organization system of claim 29, wherein:
the second support rail comprises a second support rail first side aft-facing panel, a second support rail second side aft-facing panel, a second support rail first side aft flange, and a second support rail second side aft flange;

the second bracket mounting slots comprise a first series of the second bracket mounting slots in the second support rail first side aft-facing panel and a second series of the second bracket mounting slots in the second support rail second side aft-facing panel;

the second support rail first side aft flange extends aft from the second support rail first side aft-facing panel;

the second support rail second side aft flange extends aft from the second support rail second side aft-facing panel; and the second support rail first side aft flange and the second support rail second side aft flange interface with the wall in the mounted configuration of the second support rail.

32. The closet organization system of claim 29, comprising:
- a third support rail comprising third bracket mounting slots, wherein the third support rail is configured to be interfaced with the support track to hang the third support rail vertically from the support track with the third support rail interfaced with the wall and the third bracket mounting slots facing the wall in a mounted configuration of the third support rail;
- a third shelf support bracket comprising a support arm and a mounting hook, wherein the mounting hook of the third shelf support bracket is configured for insertion into one of the third bracket mounting slots to secure the third shelf support bracket to the third support rail so that the support arm extends transversely from the third support rail and away from the wall in a mounted configuration of the third shelf support bracket; and
- a fourth shelf support bracket comprising a support arm and a mounting hook, wherein the mounting hook of the fourth shelf support bracket is configured for insertion into one of the bracket mounting slots to secure the fourth shelf support bracket to the support rail so that the support arm extends transversely from the support rail and away from the wall in a mounted configuration of the fourth shelf support bracket.

33. The closet organization system of claim 32, wherein:
the third shelf support bracket comprises four mounting hooks;
two of the four mounting hooks of the third shelf support bracket are configured to engage two of the bracket mounting slots of the third support rail;
the fourth shelf support bracket comprises four mounting hooks; and
two of the four mounting hooks of the fourth shelf support bracket are configured to engage two of the bracket mounting slots of the support rail.

34. The closet organization system of claim 32, comprising:
- a shelf mounted to and supported by each of the support arm of the shelf support bracket and the support arm of the second shelf support bracket; and
- a second shelf mounted to and supported by each of the support arm of the third shelf support bracket and the support arm of the fourth shelf support bracket,
wherein the support arm of the shelf support bracket and the support arm of the fourth shelf support bracket are disposed between the shelf and the second shelf.

35. The closet organization system of claim 22, wherein each of the apertures has a width longer than a height of the apertures to accommodate horizontal repositioning of the mounting fastener relative to the support track, when the support track extends horizontally in the mounted configuration against a vertical wall.

36. The closet organization system of claim 35, wherein each of the apertures has a chamfered edge to accommodate a beveled head of a mounting fastener.

37. The closet organization system of claim 36, wherein the support track is formed from an extrusion.

* * * * *